(12) United States Patent
Yoshimine et al.

(10) Patent No.: US 7,246,169 B2
(45) Date of Patent: Jul. 17, 2007

(54) CONTENT DISTRIBUTION RESERVATION METHOD, CONTENT DISTRIBUTION METHOD, RESERVATION MANAGEMENT DEVICE, AND PROGRAM

(75) Inventors: Takao Yoshimine, Kanagawa (JP); Keigo Ihara, Chiba (JP); Takanori Nishimura, Kanagawa (JP); Junko Fukuda, Kanagawa (JP); Takahiko Sueyoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 795 days.

(21) Appl. No.: 10/110,213

(22) PCT Filed: Aug. 29, 2001

(86) PCT No.: PCT/JP01/07417

§ 371 (c)(1),
(2), (4) Date: Apr. 19, 2002

(87) PCT Pub. No.: WO02/19711

PCT Pub. Date: Mar. 7, 2002

(65) Prior Publication Data
US 2002/0156648 A1    Oct. 24, 2002

(30) Foreign Application Priority Data
Aug. 31, 2000 (JP) .............................. 2000-264565

(51) Int. Cl.
*G06F 15/16* (2006.01)
(52) U.S. Cl. ..................... 709/228; 709/228; 709/231; 709/232
(58) Field of Classification Search ................ 709/231, 709/232, 225, 226, 203, 219, 227, 228, 238, 709/243; 370/322, 348, 443
See application file for complete search history.

(56) References Cited

U.S. PATENT DOCUMENTS

| | | | | |
|---|---|---|---|---|
| 5,905,736 A | * | 5/1999 | Ronen et al. | 370/352 |
| 5,918,215 A | | 6/1999 | Yoshioka et al. | 705/30 |
| 5,920,701 A | * | 7/1999 | Miller et al. | 709/228 |
| 6,230,205 B1 | * | 5/2001 | Garrity et al. | 709/231 |
| 6,263,201 B1 | * | 7/2001 | Hashimoto et al. | 455/403 |

(Continued)

FOREIGN PATENT DOCUMENTS

CN    1147653    4/1997

(Continued)

OTHER PUBLICATIONS

Patent Abstracts of Japan, JP 2000-115097, Apr. 21, 2000.

(Continued)

*Primary Examiner*—Bunjob Jaroenchonwanit
*Assistant Examiner*—Ramsey Refai
(74) *Attorney, Agent, or Firm*—Oblon, Spivak, McClelland, Maier & Neustadt, P.C.

(57) ABSTRACT

To allow a distributor to take into account the capacity of content distribution targets or service fee when making a reservation for live distribution of content. In a content supply system 100, in order to use a streaming server 102 to perform a live distribution, a user PC 106 used makes a reservation for a time zone, etc. to a server reservation control center 101 over the Internet 103. Here, the streaming server 102 has channels for distribution of a plurality of channels and can carry out distribution processing on the respective channels in the same time zone. The respective channels have a preset service fee and capacity of distribution targets and the user can specify which channel should be used for distribution taking into account these settings when making a reservation.

8 Claims, 42 Drawing Sheets

U.S. PATENT DOCUMENTS

| | | | |
|---|---|---|---|
| 6,324,182 B1 * | 11/2001 | Burns et al. | 370/429 |
| 6,424,704 B1 * | 7/2002 | Lee | 379/112.01 |
| 6,510,556 B1 * | 1/2003 | Kusaba et al. | 725/93 |
| 6,745,237 B1 * | 6/2004 | Garrity et al. | 709/219 |
| 6,748,447 B1 * | 6/2004 | Basani et al. | 709/244 |
| 6,845,229 B2 * | 1/2005 | Notomi | 709/225 |
| 6,882,840 B2 * | 4/2005 | Fujiwara | 455/432.3 |
| 7,171,687 B2 * | 1/2007 | Uemura | 726/18 |
| 2002/0016848 A1 * | 2/2002 | Yoshimine et al. | 709/231 |
| 2002/0077981 A1 * | 6/2002 | Takatori et al. | 705/40 |
| 2002/0152313 A1 | 10/2002 | Nishimura et al. | 709/227 |
| 2002/0194351 A1 | 12/2002 | Nishimura et al. | 709/229 |

FOREIGN PATENT DOCUMENTS

| | | |
|---|---|---|
| EP | 0 762 305 | 3/1997 |
| EP | 1 191 440 | 3/2002 |
| JP | 9-73480 | 3/1997 |
| JP | 9-073480 | 3/1997 |
| JP | 2000-115097 | 4/2000 |
| KR | 10-0202768 | 4/1997 |

OTHER PUBLICATIONS

Patent Abstracts of WIPO, WO 02/19712, Mar. 7, 2002.
U.S. Appl. No. 09/819,965, filed Mar. 28, 2001, unknown.
U.S. Appl. No. 09/821,501, filed Mar. 29, 2001, unknown.
U.S. Appl. No. 09/821,651, filed Mar. 29, 2001, unknown.
U.S. Appl. No. 09/980,301, filed Nov. 28, 2001, unknown.
U.S. Appl. No. 09/930,135, filed Aug. 16, 2001, pending.
U.S. Appl. No. 09/932,968, filed Aug. 21, 2001, pending.
U.S. Appl. No. 09/938,591, filed Aug. 27, 2001, pending.
U.S. Appl. No. 09/938,575, filed Aug. 27, 2001, pending.
U.S. Appl. No. 10/089,096, filed Apr. 12, 2002, pending.
U.S. Appl. No. 10/089,085, filed Apr. 10, 2002, pending.
U.S. Appl. No. 10/110,213, filed Apr. 19, 2002, pending.
U.S. Appl. No. 10/089,083, filed Apr. 10, 2002, pending.

* cited by examiner

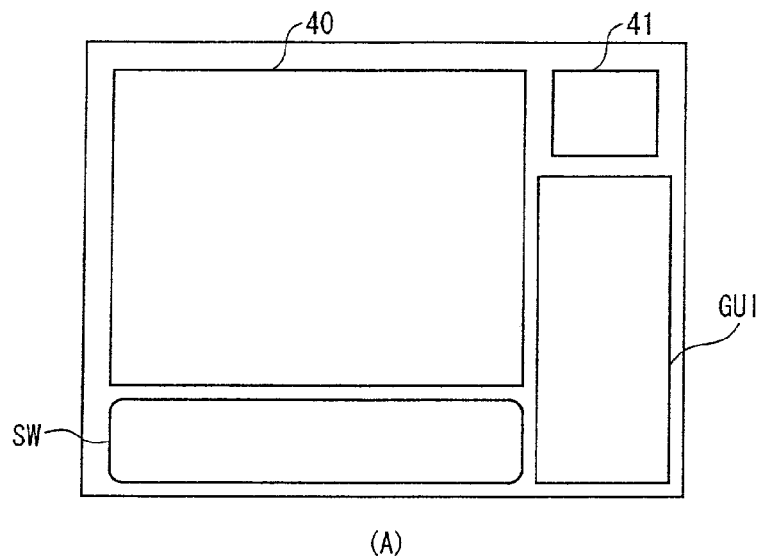
(A)
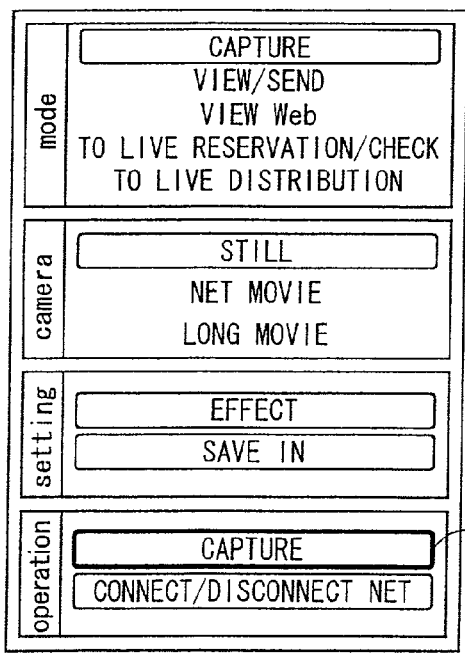
(B)
FIG. 5

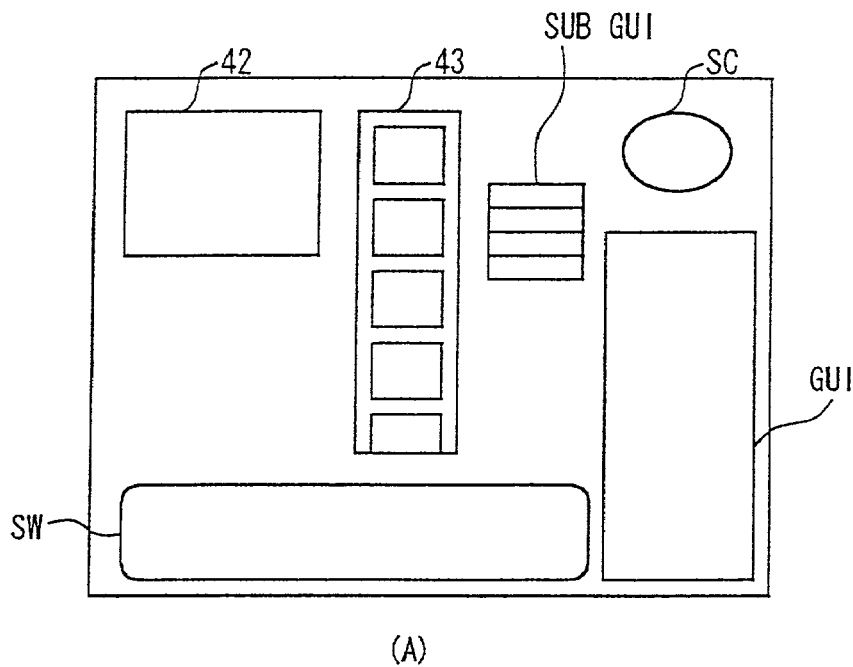
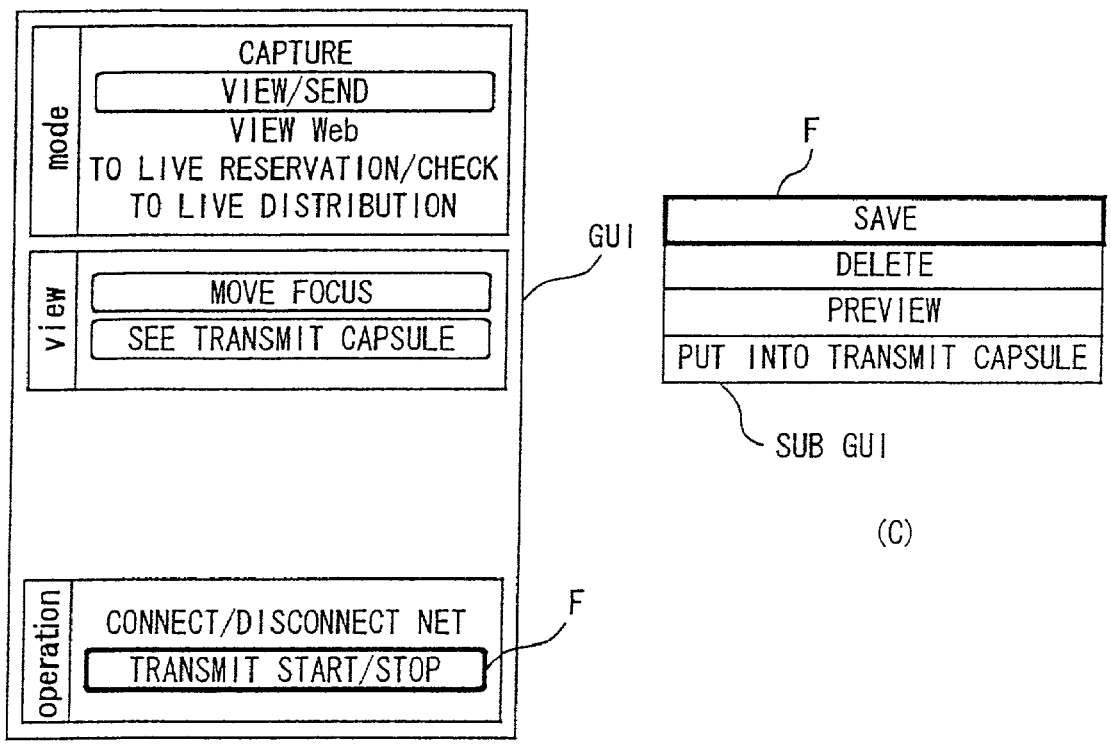
FIG. 6

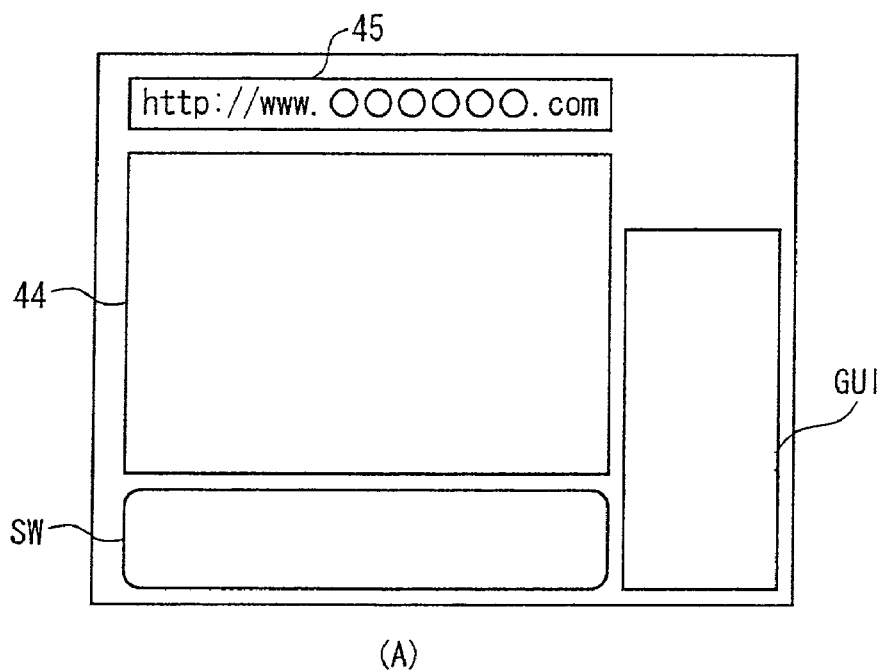
(A)
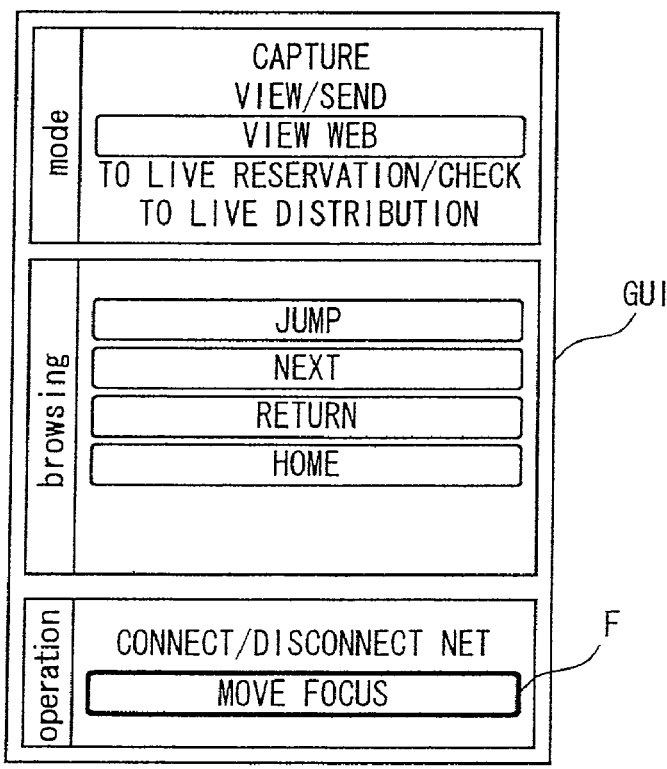
(B)
FIG. 7

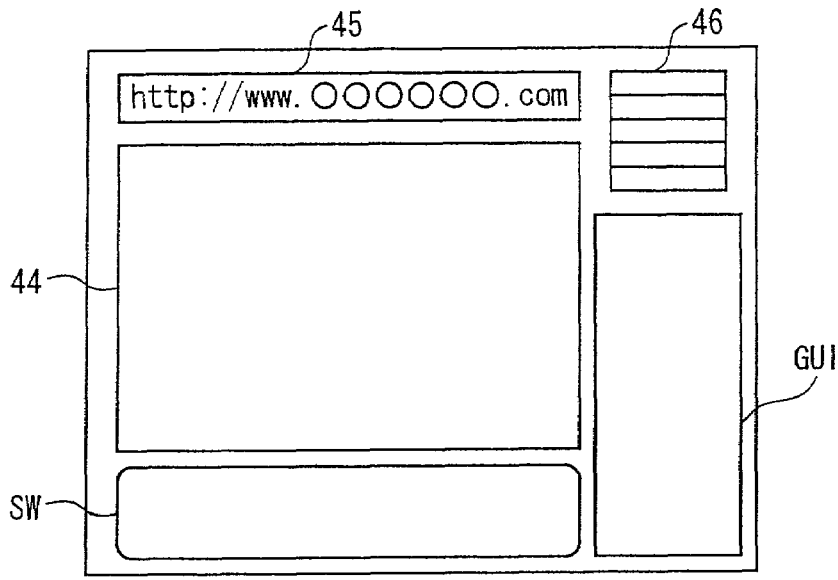
(A)
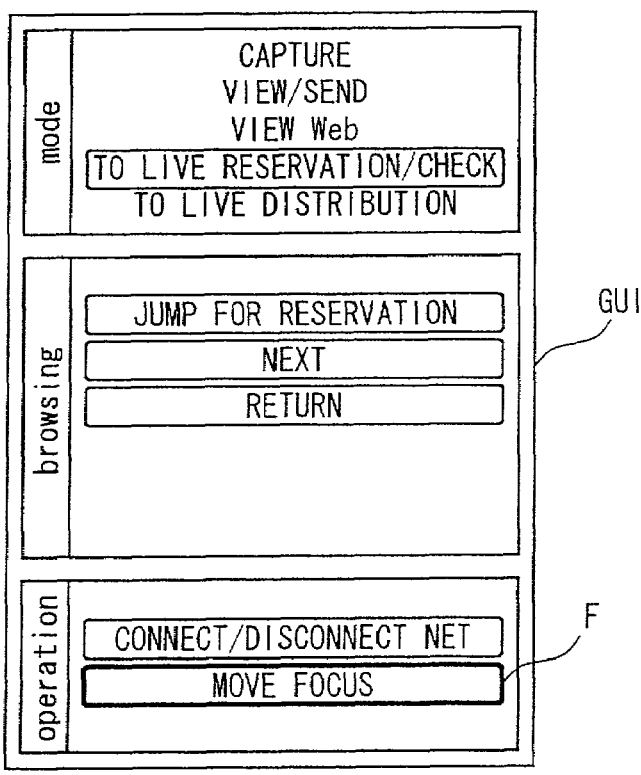
(B)
FIG. 8

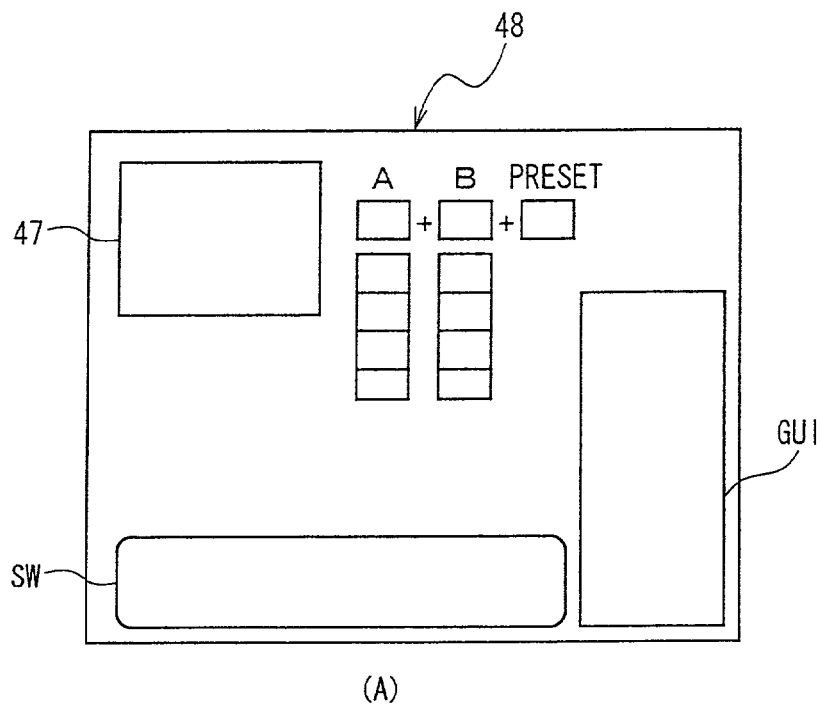
(A)
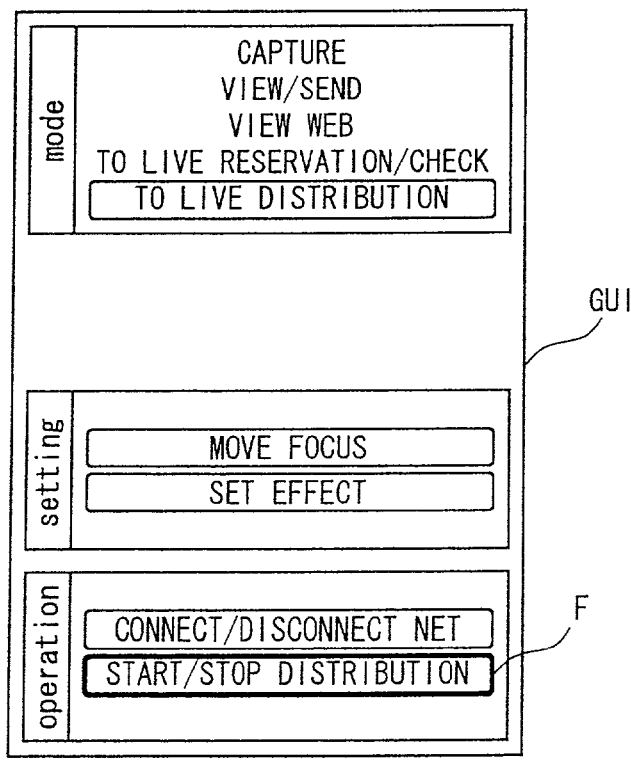
(B)
FIG. 9

WELCOME TO PERSONAL CASTING WORLD

- LOG IN
    USER ID:
    PASSWORD:

- MEMBER REGISTRATION
- WHAT IS PERSONAL CASTING TV?
- TODAY'S LIVE
- PROGRAM GUIDE
- MY CHANNEL
- LIVE DISTRIBUTION RESERVATION
- PROGRAM PICKUP
- IMAGE STATION

FIG. 13

REGISTER YOURSELF AS A MEMBER
    USING THE PERSONAL CASTING SERVICE REQUIRES YOU
    TO BE REGISTERED AS A USER...

CLICK HERE TO REGISTER YOURSELF AS
    A MEMBER >>> LINK TO REGISTRATION PAGE >>>

LIVE DISTRIBUTION ALLOWS YOU TO DO THINGS LIKE
    EXAMPLE OF USE

TO CARRY OUT LIVE DISTRIBUTION
    CARRYING OUT LIVE DISTRIBUTION REQUIRES A CREDIT CARD.

TO VIEW LIVE
    VIEWING LIVE REQUIRES REPLAY SOFTWARE.
    IF YOU HAVE NONE, PRESS THE FOLLOWING
    REPLAY SOFTWARE BUTTON AND DOWNLOAD IT.

LIVE DISTRIBUTION PROVIDERS MAY PUT RESTRICTIONS
    ON PEOPLE WHO CAN VIEW LIVES BY OBLIGING THEM
    TO ENTER PASSWORDS. THESE ARE LIVES THAT THOSE
    PROVIDERS DISTRIBUTE ONLY FOR SPECIFIC PEOPLE AND
    OTHER PEOPLE CANNOT VIEW.

PROCEDURE UP TO LIVE DISTRIBUTION
    PREMIUM MEMBER REGISTRATION
    LIVE PLANNING AND PREPARATION
    DISTRIBUTION RESERVATION
    RESERVATION CHECK
    CONNECTION
    DISTRIBUTION START

FIG. 14

```
·CURRENT TIME  15:05  (FOR SERVICE SUPPLY)

·SPECIAL PROGRAM
     ·GENRE
     ·TIME        LIVE TITLE  PROVIDER  OUTLINE  MODE
     ·ON-DEMAND   MOVIE TITLE  PROVIDER  OUTLINE
                  OPEN OR CLOSE

·PRIVATE PROGRAM
     ·GENRE
     ·TIME  LIVE TITLE   PROVIDER  OUTLINE  CAPACITY  CLOSE
```

FIG. 15

CURRENT TIME 15:08 (FOR SERVICE SUPPLY)

GENRE: ROCK MUSIC
LIVE TITLE: ○○○○
PROVIDER (MAIL ADDRESS): △△△@XX.COM
HOMEPAGE: HTTP://WWW.△O△XXX.COM
CAPACITY: 50 PEOPLE
CLOSE OR OPEN

OUTLINE
 ..........
 ..........
DETAILS
 ..........
 ..........

ENTER PASSWORD:

[ REPLAY ] ~175

NOTE: REPLAYING THE MUSIC REQUIRES REPLAY SOFTWARE.

[ REPLAY SOFTWARE ] ~176
CLICK TO DOWNLOAD

FIG. 16

|   | JULY ▽ | 2000 ⇅ |
|---|---|---|

```
         S  M  T  W  T  F  S
                          1
         2  3  4  5  6  7  8
PROGRAM IN THIS WEEK    9 10 11 12 13 14 15
        16 17 18 19 20 21 22
        23 24 25 26 27 28 29
        30 31
```

·SPECIAL PROGRAM
JULY 5, 2000
    TIME  GENRE  <u>LIVE TITLE</u>  PROVIDER  OUTLINE  OPEN

TIME  GENRE  <u>MOVIE TITLE</u>  PROVIDER  OUTLINE  OPEN

·LIVE CHANNEL
JULY 5, 2000
    GENRE  TIME  <u>LIVE TITLE</u>  PROVIDER  OUTLINE  CAPACITY  PRIVATE

FIG. 17

| THE CONTENTS OF RESERVATION | USER ID | BILLING FLAG INFORMATION | RESERVATION ID |
|---|---|---|---|
| ·DATE/TIME<br>·2ch<br>·64kbps<br>· · · | ○○○○ | ENABLED | ××× × |
| ·DATE/TIME<br>·4ch<br>·28.8kbps<br>· · · | ×△○○ | DISABLED | △△△△ |
| | | | |
| | | | |

FIG. 18

MEMBER REGISTRATION INPUT SCREEN 210

| INPUT ITEM | INPUT COLUMN |
|---|---|
| NAME (KANJI) | △○ 太郎 |
| (ALPHABET) | ○○ TAROU |
| DESIRED USER ID | ○○○○ |
| PASSWORD | ×××× |
| E-MAIL ADDRESS | △△△@○○.COM |
| OPEN MAIL ADDRESS? | YES |

IF YOU WANT TO REGISTER AS A PREMIUM MEMBER, CHECK THE CHECKBOX AND ENTER THE FOLLOWING ITEMS.

PREMIUM MEMBER REGISTRATION ☑   211

| INPUT ITEM | INPUT COLUMN |
|---|---|
| ADDRESS | ○○CITY○○3-5-5 |
| TELEPHONE NUMBER | 03-1234-5670 |
| CREDIT CARD NUMBER | 1234-5678-9102 |
| CREDIT CARD EXPIRATION DATE | MAY 2003 |
| CELLULAR PHONE NUMBER | 090-1000-2000 |
| FACSIMILE NUMBER | 03-1234-5671 |

CANCEL  212    ENTER  213

FIG. 20

| ch NO. | CAPA-CITY | TRANSMIT BAND | SERVICE FEE | 6:00 | | 12:00 | | 18:00 | | 24:00 |
|---|---|---|---|---|---|---|---|---|---|---|
| 1 | 5 | 28.8 | ¥1000 | RESERVED | FREE | | RESERVED | | FREE | RE |
| 2 | 10 | 28.8 | ¥2000 | | | FREE | | | RESERVED | |
| 3 | 15 | 64 | ¥3000 | FREE | | RESERVED | | | FRE | RESERV |
| 4 | 50 | 64 | ¥10000 | | FREE | | RE | FREE | | RESERV |
| 5 | 100 | 64 | ¥15000 | | | RESERVED | | | | FREE |
| 6 | 150 | 64 | ¥20000 | FREE | RESERV | FREE | | RESERVED | | |
| 7 | 100 | 64 | ¥50000 | FREE | | | RESERVED | | | FREE |

- CHANNEL: CHANNEL 1 (CAPACITY: 5)
- RESERVATION DATE/TIME: JULY 5, 15:00 - 17:00
- OPEN LEVEL: PUBLIC  PASSWORD (    )  SECRET (    )
- TITLE: XXXX LIVE
- GENRE: MUSIC
- OPEN OF E-MAIL: YES, NO
- OPEN OF WEB: YES (URL:        ), NO
- PASSWORD: PASSWORD
- FRIEND LIST
  EMAIL ADDRESS(    )(    )(    )
- OUTLINE: 20 CHARACTERS
- DETAIL: 200 CHARACTERS

[RESERVE]  [CANCEL]

FIG. 22

- USER ID: ○○○○
- CHANNEL: CHANNEL 8 (CAPACITY: 5)
- RESERVATION DATE/TIME: JULY 5, 15:00 - 17:00
- OPEN LEVEL: PUBLIC  PASSWORD (XXXXX)  SECRET (XXXXX)
- TITLE: XXXX LIVE
- GENRE: MUSIC
- E-MAIL DISCLOSURE: YES, NO
- WEB DISCLOSURE: YES (URL:          ), NO
- PASSWORD:  PASSWORD 
- FRIEND LIST
   EMAIL ADDRESS (○○@XX.COM) (△△@XX.CO.JP) (XX@○○.COM)
- OUTLINE: UP TO 20 CHARACTERS
- DETAIL: UP TO 200 CHARACTERS

SERVICE FEE: ¥XXXXX
IN ADDITION TO THIS SERVICE FEE, THE CARRIER WILL CHARGE YOU
FOR THE TELEPHONE SERVICE TO THE ACCESS PORT SEPARATELY.

△△△@XX○○○.COM
MAKE SURE THE MAIL ADDRESS ABOVE IS CORRECT.
YOUR RESERVATION ID WILL BE SENT TO THE MAIL ADDRESS ABOVE.
ONCE YOU ACQUIRE THE RESERVATION ID, RECONFIRM THE RESERVATION
WITH "MY CHANNEL" BY 6 HOURS BEFORE THE PROGRAM STARTS.
THE RESERVATION WITHOUT RECONFIRMATION WILL BE CANCELED.

240        241
            [AGREE]   [CANCEL]

FIG. 23

THANK YOU FOR THE RESERVATION.

CHECK THE MAIL AND RECONFIRM THE RESERVATION ON THE "MY CHANNEL" PAGE USING THE CORRESPONDING PC.

245

| O K |

FIG. 24

MY CHANNEL

RESERVATION LIST ⟵ 250
RESERVATION LISTRESERVATION DATE/TIME, CHANNEL, TITLE,
WAITING FOR RECONFIRMATION, CANCEL

TO CHANGE THE DATE/TIME OR CHANNEL, CANCEL THE RESERVATION
AND MAKE A NEW RESERVATION.

NUMBER OF AUDIENCES ⟵ 251
YOU CAN VIEW THE NUMBER OF AUDIENCE DATA OF LIVE PROGRAMS
DISTRIBUTED SO FAR.

CHANGE REGISTRATION INFORMATION FILE ⟵ 252
YOU CAN CHANGE USER INFORMATION HERE.

```
·USER ID:OOOO
·CHANNEL:CHANNEL 1 (CAPACITY: 5)
·RESERVATION DATE/TIME:   JULY 5, 15:00 - 17:00
·OPEN LEVEL:  PUBLIC   PASSWORD (XXXXX)   SECRET (XXXXX)
·TITLE:   XXXX LIVE
·GENRE:  MUSIC
·OPEN OF E-MAIL:   YES, NO
·OPEN OF WEB:   YES (URL:              ), NO
·PASSWORD:   ** PASSWORD **
·FRIEND LIST
   EMAIL ADDRESS  (OO@XX.COM) (△△@XX.CO.JP) (XX@OO.COM)
·OUTLINE:   UP TO 20 CHARACTERS
·DETAIL:   UP TO 200 CHARACTERS

RESERVATION ID:

INPUT THE RESERVATION ID INCLUDED IN THE MAIL.
TO CHANGE THE DATE/TIME OR CHANNEL, CANCEL THIS RESERVATION
AND MAKE A NEW RESERVATION.

PRESSING THE RECONFIRM BUTTON WILL AUTOMATICALLY REGISTER
THE PC CONNECTION SETTING. BE SURE TO RECONFIRM THE
RESERVATION WITH THE CORRESPONDING PC.
```

FIG. 27

USER ID: ○○○○
LIVE DISTRIBUTION RESERVATION DATE/TIME: 2000:07:05:15:00:00-
2000:07:05:17:00:00
SERVER ACCESSIBLE TIME: 2000:07:05:14:55:00-2000:07:05:17:05:00

ACCESS TELEPHONE NUMBER
    CARRIER 01: 03-1234-5670
    CARRIER 02: 03-1234-5671
    CARRIER 03: 03-1234-5672
    CARRIER 04: 03-1234-5673
ACCESS SERVER INFORMATION
    TYPE OF SERVER: REALSERVER5
    SERVER NAME: LIVESERVER.COM
    CONNECTION PORT: 555
    STREAM PATH TO SERVER: /CHANNELL/STREAM.RM
ADDRESS INFORMATION FOR DISTRIBATION REQUEST:
rtsp//liveserver.com:554/channell/stream.rm
TRANSMISSION BAND: 28.8KBPS
TITLE: XXXX LIVE
OUTLINE: ·········
OPEN LEVEL: ·········
FRIEND LIST ADDRESS INFORMATION
    LIST 01: ○○@XX.COM
    LIST 02: △△@XX.CO.JP
    LIST 03: XX@OO.COM
PASSWORD FOR DISTRIBUTION REQUEST: XXXX

FIG. 28

```
16:16 (FOR SERVICE SUPPLY)
16:09 (YOUR PC)

THE RESERVATION HAS BEEN ACCEPTED.
AS SHOWN ABOVE, THERE IS A TIME DIFFERENCE BETWEEN THE SERVICE
SUPPLY TIME AND YOUR PC TIME.
NOTE THAT THE RESERVED DISTRIBUTION WILL BE PERFORMED AT THE
SERVICE SUPPLY TIME.
YOU CAN ACCESS THE SITE FROM 5 MINUTES BEFORE THE RESERVED TIME.

IF YOU USE A DIALUP ROUTER, REGISTER THE FOLLOWING AS THE DIAL
ADDRESS. IN THIS CASE, ONLY CONNECTION VIA ISDN IS AVAILABLE.

ISDN ACCESS PORT NUMBER: 03-1234-5679
LOG IN ID: RESERVATION ID
PASSWORD: XXXXXXX
```

```
SENDER:    PERSONAL CASTING SERVICE
DATE/TIME: JULY 3, 2000, 17:15
ADDRESS:   △△@XX.CO.JP
SUBJECT:   NOTICE OF LIVE DISTRIBUTION
ATTACHMENT: [    ]

LIVE DISTRIBUTION BY OOO (USER NAME) WILL BE CARRIED OUT AS FOLLOWS.

·DISTRIBUTION DATE/TIME: JULY 5 15:00 TO 17:00
·TITLE: XXXX LIVE
·ADDRESS FOR DISTRIBUTION REQUEST:rtsp//liveserver.com:554/channel1/stream.rm
·PASSWORD: XXXXXX
```

- USER ID: ○○○○
- CHANNEL: CHANNEL 1 (CAPACITY: 5)
- RESERVATION DATE/TIME: JULY 5, 15:00 - 17:00
- OPEN LEVEL: PUBLIC   PASSWORD (XXXXX)   SECRET (XXXXX)
- TITLE: XXXX LIVE
- GENRE: MUSIC
- OPEN OF E-MAIL: YES, NO
- OPEN OF WEB: YES (URL:             ), NO
- PASSWORD:  PASSWORD 
- FRIEND LIST
    EMAIL ADDRESS (○○@XX.COM) (△△@XX.CO.JP) (XX@○○.COM)
- OUTLINE: UP TO 20 CHARACTERS
- DETAIL: UP TO 200 CHARACTERS

RESERVATION ID:

INPUT THE RESERVATION ID INCLUDED IN THE MAIL.
TO CHANGE THE DATE/TIME OR CHANNEL, CANCEL THIS RESERVATION
AND MAKE A NEW RESERVATION.

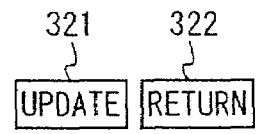

321  322
UPDATE  RETURN

FIG. 32

17:08 (FOR SERVICE SUPPLY)
17:11 (YOUR PC)

THE CHANGE HAS BEEN ACCEPTED.
AS SHOWN ABOVE, THERE IS A TIME DIFFERENCE BETWEEN THE SERVICE SUPPLY TIME AND YOUR PC TIME.
NOTE THAT THE RESERVED DISTRIBUTION WILL BE PERFORMED AT THE SERVICE SUPPLY TIME.
YOU CAN ACCESS THE SITE FROM 5 MINUTES BEFORE THE RESERVED TIME.

IF YOU USE A DIALUP ROUTER, REGISTER THE FOLLOWING AS THE DIAL ADDRESS. IN THIS CASE, ONLY CONNECTION VIA ISDN IS AVAILABLE.

ISDN ACCESS PORT NUMBER:
LOG IN ID: RESERVATION ID
PASSWORD: XXXXXXX

- USER ID: ○○○○
- CHANNEL: CHANNEL 1 (CAPACITY: 5)
- RESERVATION DATE/TIME: JULY 5, 15:00 - 17:00
- OPEN LEVEL: PUBLIC   PASSWORD (XXXXX)   SECRET (XXXXX)
- TITLE: XXXX LIVE
- GENRE: MUSIC
- OPEN OF E-MAIL: YES, NO
- OPEN OF WEB: YES (URL:            ), NO
- PASSWORD:  PASSWORD 
- FRIEND LIST
    EMAIL ADDRESS (○○@XX.COM) (△△@XX.CO.JP) (XX@○○.COM)
- OUTLINE: UP TO 20 CHARACTERS
- DETAIL: UP TO 200 CHARACTERS

THIS RESERVATION WILL BE CANCELED.

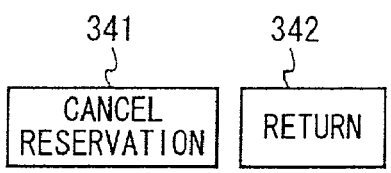

341 CANCEL RESERVATION   342 RETURN

FIG. 34

THE RESERVATION HAS BEEN CANCELED.

```
·USER ID: ○○○○
·CHANNEL:  CHANNEL 1 (CAPACITY: 5)
·RESERVATION DATE/TIME:   JULY 5, 15:00 - 17:00
·OPEN LEVEL:  PUBLIC   PASSWORD (XXXXX)   SECRET (XXXXX)
·TITLE:  XXXX LIVE
·GENRE:  MUSIC
·OPEN OF E-MAIL:  YES, NO
·OPNE OF DISCLOSURE:  YES (URL:              ), NO
·PASSWORD:  ** PASSWORD **
·FRIEND LIST
   EMAIL ADDRESS  (○○@XX.COM) (△△@XX.CO.JP) (XX@○○.COM)
·OUTLINE:  UP TO 20 CHARACTERS
·DETAIL:  UP TO 200 CHARACTERS

RESERVATION ID:

IF YOU USE A DIALUP ROUTER, REGISTER THE FOLLOWING AS THE DIAL
ADDRESS. IN THIS CASE, ONLY CONNECTION VIA ISDN IS AVAILABLE.

ISDN ACCESS PORT NUMBER:
LOG IN ID:  RESERVATION ID
PASSWORD:  XXXXXXX 361                 362
         [REENTER PC CONNECTION SETTING] [RETURN]
```

FIG. 36

CONTENT DISTRIBUTION RESERVATION METHOD, CONTENT DISTRIBUTION METHOD, RESERVATION MANAGEMENT DEVICE, AND PROGRAM

TECHNICAL FIELD

The present invention relates to a content distribution reservation method for making a reservation for content distribution carrying out a live distribution of content using a distribution server that performs a stream distribution of content to a client, a content distribution method, a reservation control apparatus that controls reservations for distribution of the content and a program storage medium that stores a program to be executed by the reservation control apparatus.

BACKGROUND ART

In a computer network system, it is conventionally a common practice that an individual opens a homepage to provide content created over the Internet.

In this way, when a user personally opens a homepage, the user acquires a homepage creation program via a personal computer (hereinafter referred to as "PC"), creates a homepage hyper-linked with a plurality of content based on the homepage creation program and stores the homepage in a server of an Internet service provider (hereinafter referred to as "ISP").

Then, the ISP provides a homepage to a client who accesses it over the Internet from the server and when an anchor on the homepage is clicked, then the ISP provides linked content.

In recent years, content supplied to a client over the Internet include many moving images and voice in addition to still images. To provide content such as these moving images, moving image files and voice files created by the user are uploaded beforehand in a predetermined storage area of a streaming server of the ISP. Then, at the request of the client, the streaming server of the ISP performs stream distribution of the file corresponding to the request to the client over the Internet.

Furthermore, the technique of performing stream distribution of content such as moving images to the client over the Internet also includes a technique called "live distribution" in addition to "on-demand distribution" whereby a moving image file is uploaded in the streaming server beforehand and distributed in response to a request from a client as described above. In live distribution, moving image data created by a content creator, for example, using a digital camera, is encoded in real time and this is sent to the streaming server over the Internet, etc. Then, the streaming server performs streaming reproduction while recording the moving image data supplied in real time from the content creator in a dedicated storage area and can thereby supply the moving image data in real time to the requesting client.

On the other hand, when the above-described live distribution is performed, the content distributor may or may not want the content distributed to be viewed or listened to by many people. Moreover, depending on the content to be distributed, there may be cases where the content distributor may want the content to be viewed or listened to by many people even if live distribution will involve an increase of the expenses, or the content distributor may want to reduce expenses for live distribution even if the content is viewed or listened to by only a few people. That is, the maximum number of viewers or listeners or the expenses that the content distributor desires may vary depending on the content to be distributed, etc., and a service capable of providing live distribution taking into account these situations can be said to be significant to the distributor.

DISCLOSURE OF THE INVENTION

The present invention has been implemented taking into account the above situations and it is an object of the present invention to provide a content distribution reservation method that allows the distributor side to make a reservation for live distribution of content taking into account the capacity of content distribution targets or service fee, a reservation control apparatus that controls reservations for distribution of content, a program storage medium that stores a program to be executed by the reservation control apparatus and a content distribution method capable of carrying out live distribution of content based on the reservation.

To solve the problems above, when, in order to perform live distribution of content using a distribution server capable of receiving content sent from a distributor terminal apparatus via a network and carrying out processing of stream distribution of the content to a client terminal apparatus via the network using a plurality of systems simultaneously, the distributor terminal apparatus makes a reservation for the use of the distribution server to a reservation control apparatus that controls the reservation situation of the distribution server via the network, the present invention carries out the following procedure: First, reservation request information including a desired system indicating which of the plurality of systems of the distribution server is requested to be used and a desired service time to distribute content using the distribution server is sent from the distributor terminal apparatus to the reservation control apparatus via the network. Then, billing processing related to the reservation based on the service fee of the distribution server preset in the desired system is carried out when the reservation for the use of the distribution server using the desired system and during the desired service time included in the reservation request information is accepted and the reservation is established.

When content live distribution is performed using the distribution server in this way, adopting a reservation system allows the content distributor to perform content distribution reliably in a time zone reserved by the content distributor. Furthermore, when making a reservation, sending reservation request information including a desired system indicating which of the plurality of systems of the distribution server is requested to be used from the distributor terminal apparatus to the reservation control apparatus makes it possible to specify which of the plurality of systems of the distribution server is requested to be used. Then, when a reservation according to this request is established, billing processing based on the service fee preset for the desired system is carried out. This allows the distributor to select the system according to the preset service fee taking into account expenses, etc. for content distribution and request the use of the system when making a reservation.

When making a reservation to the reservation control apparatus for the use of a distribution server capable of receiving content sent from the distributor terminal apparatus via a network and carrying out processing of stream distribution of the content to a client terminal apparatus via the network using a plurality of systems simultaneously, and carrying out content distribution by sending the content from the distributor terminal apparatus to the distribution server based on the reservation, another aspect of the present invention carries out the following procedure: First, reservation request information including a desired system indicating which of the plurality of systems of the distribution server is requested to be used and a desired service time to distribute content using the distribution server is sent from the distributor terminal apparatus to the reservation control apparatus via the network. Then, when the reservation for the use of the distribution server using the desired system and during the desired service time included in the reservation request information is accepted, content is sent from the distributor terminal apparatus to the distribution server via the network to carry out content distribution based on the accepted reservation. Then, when the client terminal apparatus sends a request for distributing content to the distribution server via the network, it is judged whether or not to permit the distribution request of the client terminal apparatus based on the capacity of distribution targets preset in the desired system. Then, when the distribution request of the client terminal apparatus is accepted, the content sent from the distributor terminal apparatus is stream-distributed from the distribution server to the client terminal apparatus via the network.

When content live distribution is performed using the distribution server in this way, adopting a reservation system allows the content distributor to perform content distribution reliably in a time zone reserved by the content distributor. Furthermore, when making a reservation, sending reservation request information including a desired system indicating which of the plurality of systems of the distribution server is requested to be used from the distributor terminal apparatus to the reservation control apparatus makes it possible to specify which of the plurality of systems of the distribution server is requested to be used. Then, when a reservation according to this request is established, it is judged whether or not to permit the distribution to the client terminal apparatus requesting for distribution based on the capacity of distribution targets preset in the desired system. This allows the distributor to select the system according to the preset capacity taking into account an approximate number of people to whom the content to be distributed should be viewed or listened to and request the system to be used when making a reservation.

BRIEF DESCRIPTION OF THE DRAWINGS

FIG. 5 is a drawing showing a display screen of the display section of the user PC above in picture taking mode.

FIG. 6 is a drawing showing a display screen of the display section of the user PC above in upload mode.

FIG. 7 is a drawing showing a display screen of the display section of the user PC above in Web check mode.

FIG. 8 is a drawing showing a display screen of the display section of the user PC above in live reservation mode.

FIG. 9 is a drawing showing a display screen of the display section of the user PC above in live distribution mode.

FIG. 13 is a drawing showing the top page of a Web page stored in a hard disk of the live casting server of the server reservation control apparatus above.

FIG. 14 is a drawing showing a Web page stored in the hard disk of the live casting server above.

FIG. 15 is a drawing showing a Web page stored in the hard disk of the live casting server above.

FIG. 16 is a drawing showing a Web page stored in the hard disk of the live casting server above.

FIG. 17 is a drawing showing a Web page stored in the hard disk of the live casting server above.

FIG. 18 is a drawing showing the registration content of the reservation database of the server reservation control apparatus above.

FIG. 20 is a drawing showing a display screen of the display section above of the user PC above during the member registration.

FIG. 22 is a drawing showing a display screen shown on the display section above of the user PC during the distribution reservation.

FIG. 23 is a drawing showing a display screen shown on the display section above of the user PC during the distribution reservation.

FIG. 24 is a drawing showing a display screen shown on the display section above of the user PC during the distribution reservation above.

FIG. 26 is a drawing showing a display screen shown on the display section above of the user PC during the reconfirmation processing above.

FIG. 27 is a drawing showing a display screen shown on the display section above of the user PC during the reconfirmation processing above.

FIG. 28 is a drawing showing a reservation setting information file created by the live casting server above and sent to the user PC during the reconfirmation processing above.

FIG. 29 is a drawing showing a display screen shown on the display section of the user PC during the reconfirmation processing above.

FIG. 30 is a drawing showing the contents of e-mail sent to an e-mail address specified during the reconfirmation processing above.

FIG. 32 is a drawing showing a display screen shown on the display section above of the user PC above when a reservation is changed.

FIG. 33 is a drawing showing a display screen shown on the display section above of the user PC above when a reservation is changed.

FIG. 34 is a drawing showing a display screen shown on the display section above of the user PC above when a reservation is canceled.

FIG. 35 is a drawing showing a display screen shown on the display section above of the user PC above when a reservation is canceled.

FIG. 36 is a drawing showing a display screen shown on the display section above of the user PC above when a reservation is confirmed.

BEST MODE FOR CARRYING OUT THE INVENTION

With reference now to the attached drawings, embodiments of the present invention will be explained.

A. Configuration of Content Supply System

A-1. Configuration Outline of Entire System

Figure 1:
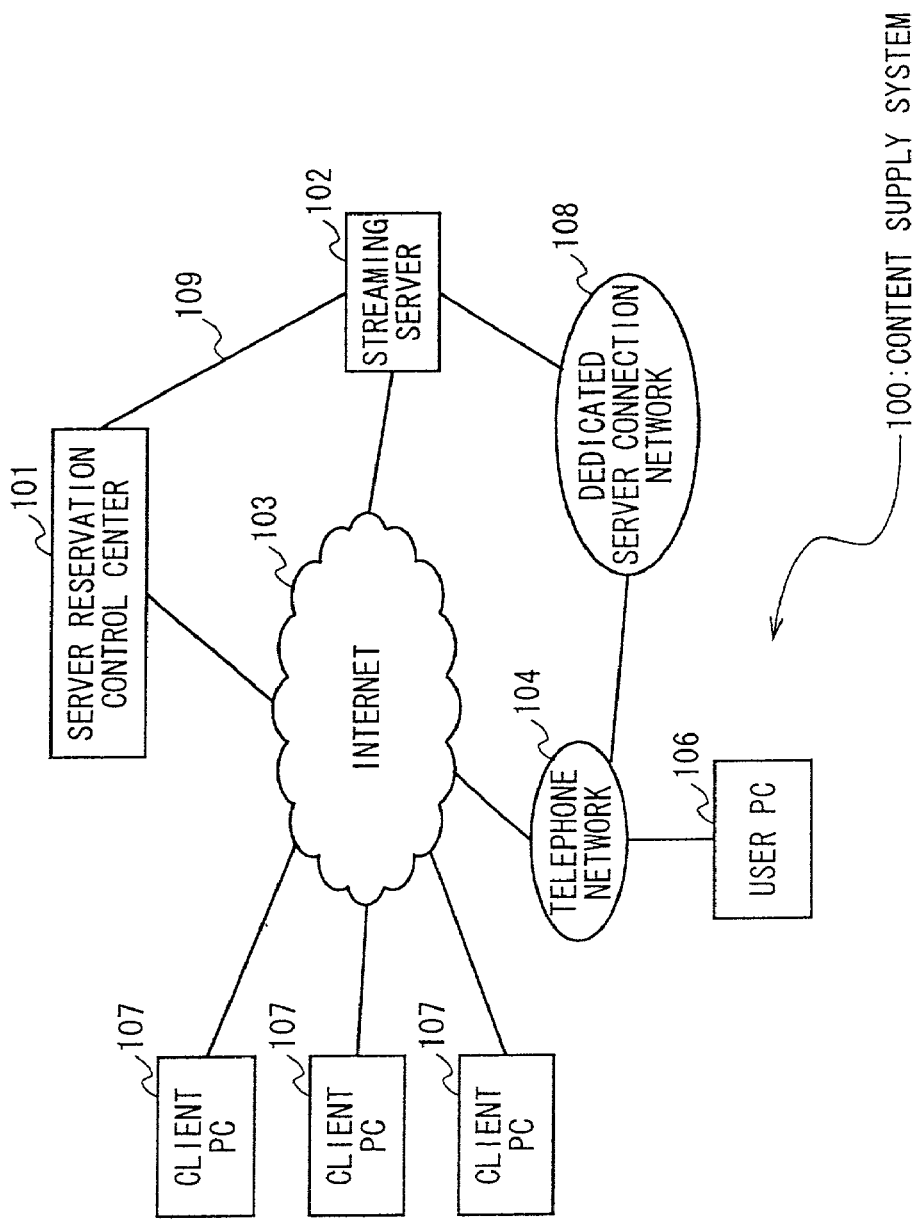
FIG. 1 is a block diagram showing an outlined overall configuration of a content supply system to which a content distribution notification method according to an embodiment of the present invention is applied.

First, FIG. 1 is a block diagram showing an overall configuration of a content supply system 100 that provides a personal casting service using a content distribution notification method according to an embodiment of the present invention.

As shown in FIG. 1, this content supply system 100 comprises a user PC (distributor terminal apparatus) 106 connected to the Internet 103 via an Internet service provider (not shown) and telephone network 104, a server reservation control center 101 connected to the Internet 103, a streaming server (processing server) 102 and a plurality (3 in the figure) of client PCs 107 connected to the Internet 103 via a telephone line (not shown) or dedicated line (not shown). Here, the streaming server 102 is connected to a dedicated server connection network 108, and when data is sent from the user PC 106 to the streaming server 102 during live distribution, which will be described later, the user PC 106 connects to an access port of the dedicated server connection network 108 using PPP (Point-to-Point Protocol) via the telephone network 104. Connection using PPP is realized via an analog public network, an ISDN (Integrated Service Digital Network), a PHS (PIAFS (Personal Handyphone System Internet Access Forum Standard)), a portable telephone, a dial-up router or the like. This establishes a communication path between the user PC 106 and streaming server 102 and the content data can be sent using this communication path. A dedicated line 109 is also laid between the streaming server 102 and server reservation control center 101 and data is transferred between both parties using the dedicated line 109 in the case of authentication processing, etc. which will be described later.

In this content supply system 100, the user of the user PC 106 sends content data (e.g., video data, etc. taken from music live) taken by a digital camera, etc. to the streaming server 102 in a reserved time zone (e.g., 15:00 to 16:00), while the streaming server 102 performs stream-distribution of the above content data to the client PC 107 that sent a request. In this way, the content supply system 100 can provide a personal casting service that implements personal broadcasting such that content data taken by the user of the user PC 106 using a digital camera, etc. is received and reproduced by the client PC 107 in real time.

Furthermore, this content supply system 100 adopts a reservation system whereby each user makes a reservation for using or accessing the streaming server 102 in order to implement a personal casting service that allows the user to reliably transmit personal broadcasting in a desired time zone. That is, the user requests the server reservation control center 101 over the Internet 103 for a reservation of a time zone during which the user wants to carry out personal broadcasting, that is, a time zone during which the user (PC) wants to access the streaming server 102 and use the stream distribution function by the streaming server 102. Then, when the reservation is permitted by the server reservation control center 101, the user PC 106 can access the streaming server 102 in the time zone based on this reservation and perform live distribution.

The content supply system 100 is a system that provides the personal casting service, which introduces the above-described reservation system, and the components of this content supply system 100 will be explained in detail below.

A-2. User PC

First, the user PC 106 will be explained. In this embodiment, the user PC 106 refers to a PC used to transmit content data by a user who has acquired the right to become a broadcasting party who creates and transmits content data after completing a registration procedure, etc. which will be described later in a personal casting service by the content supply system 100.

Figure 2:
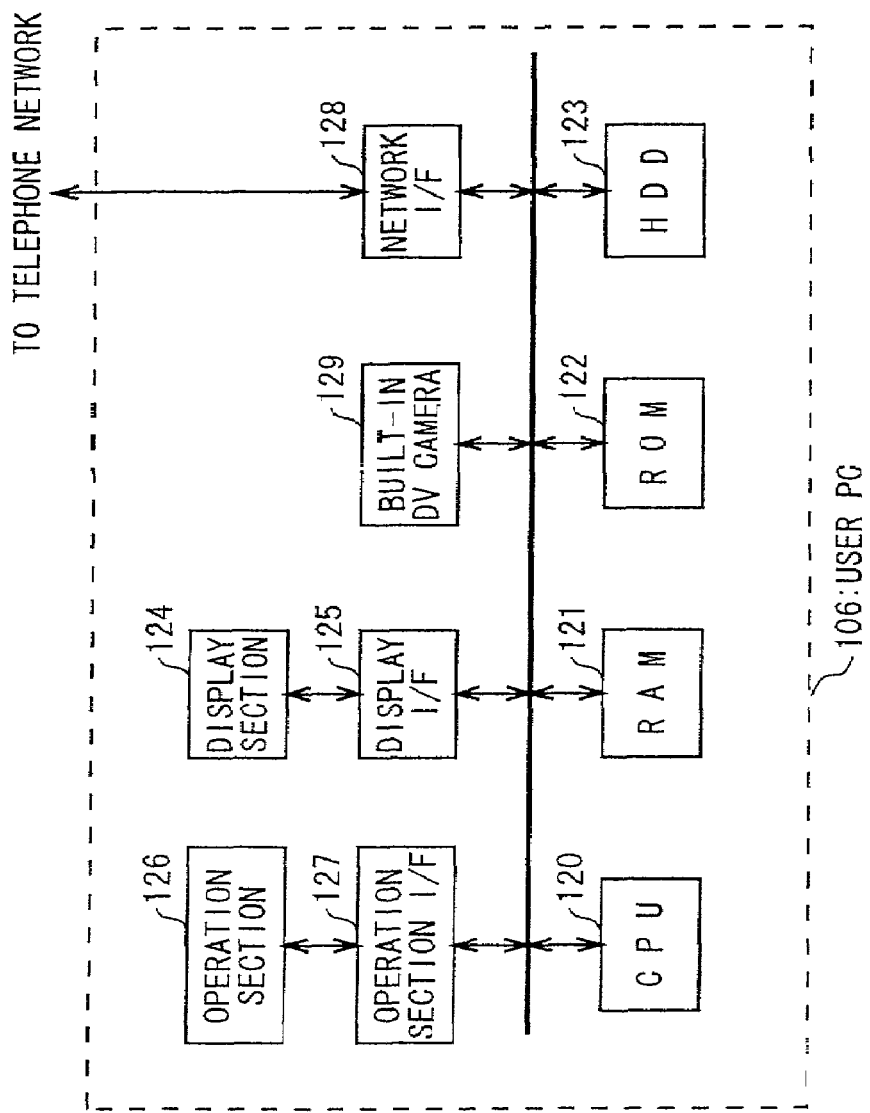
FIG. 2 is a block diagram showing a configuration of a user PC that receives a personal casting service from the content supply system above.

As shown in FIG. 2, the user PC 106 comprises a CPU (central processing unit) 120 that performs various kinds of operation processing and controls sections, a RAM (Random Access Memory) 121 used as a work memory of the CPU 120, a ROM (Read Only Memory) 122 that stores a program group read and executed by the CPU 120, a hard disk 123 that stores a program group read and executed by the CPU 120 such as an operating system (e.g., "Windows 95/98/2000" (Microsoft Corporation)) and application programs, etc., a display section 124 such as a liquid crystal display that displays an image to the user, a display interface 125 to display an image corresponding to data supplied from the CPU 120 on the display section 124, an operation section 126 such as a keyboard, mouse and rotary dial and operation button which will be described later used for the user to enter instructions, an operation section interface 127 that supplies data indicating instructions entered via the operation section 126 to the CPU 120, a network interface 128 that transmits/receives data to/from devices connected to the internet 103 (see FIG. 1) and the dedicated server connection network 108 (see FIG. 1) via a telephone network 104 (see FIG. 1) and a digital video camera 129 incorporated in the user PC 106. By the way, the hard disk 123 is read by/written to the CPU 120 and also used to store moving image data and various kinds of control data.

Figure 3:
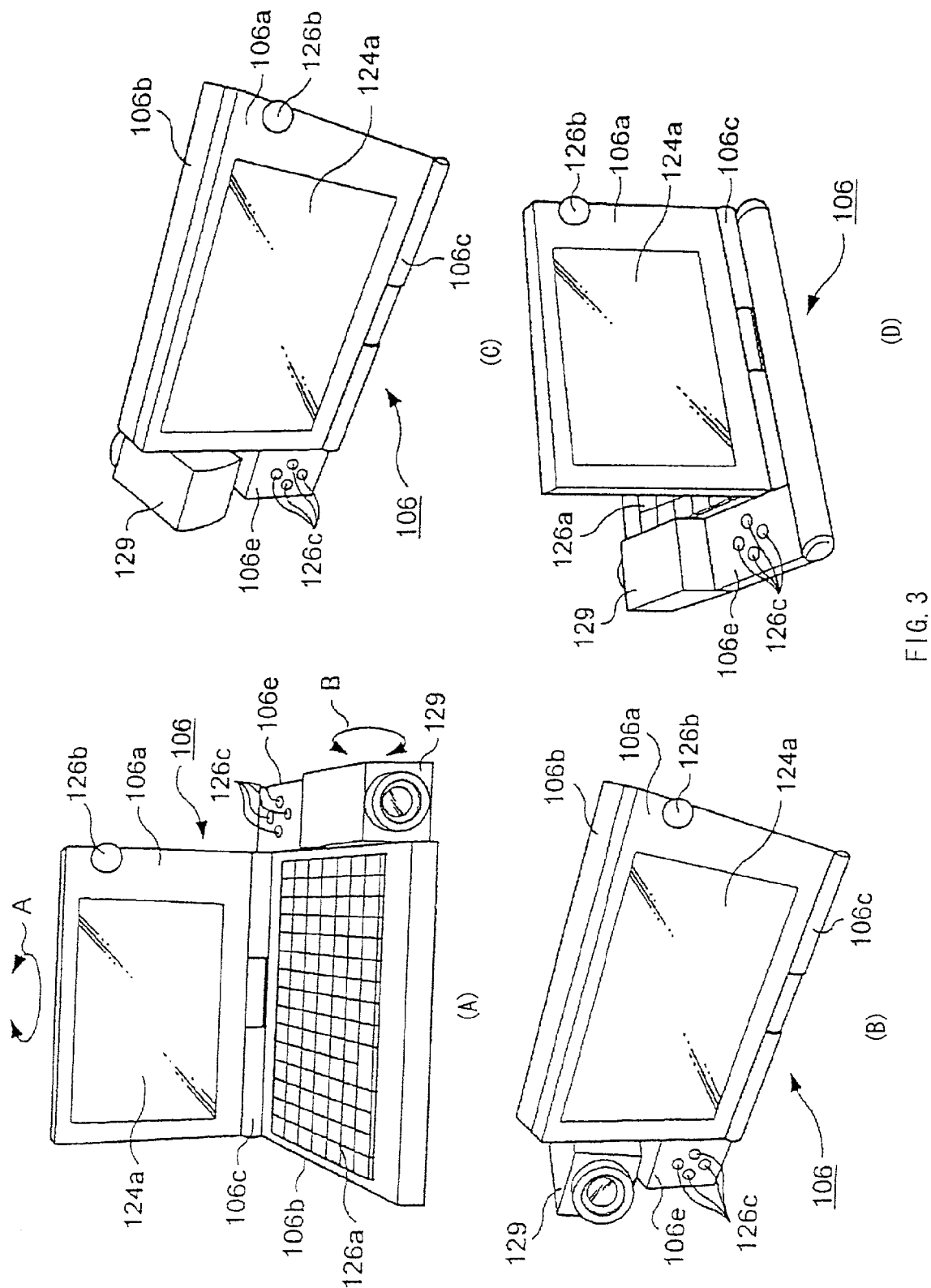
FIG. 3 is a perspective view showing a configuration example of appearance of the user PC above.

Here, FIG. 3 illustrates configuration examples of appearance of the user PC 106 with the built-in digital video camera 129 above. As shown in FIG. 3(a), the user PC 106 shown in this example comprises, as in the case of a general notebook personal computer, a display side cabinet 106a provided with a liquid crystal screen 124a and a keyboard side cabinet 106b provided with a keyboard 126a and both are connected in a relatively pivotable manner by means of a hinge section 106c. Furthermore, the display side cabinet 106a is also made relatively pivotable with respect to the keyboard side cabinet 106b in the direction indicated by an arrow A in the figure. Furthermore, a rotary operation dial 126b is provided on one side of the display side cabinet 106a. This operation dial 126b can perform not only a rotation operation but also a pressing operation.

On one end face of the keyboard side cabinet 106b are attached a button cabinet 106e with a plurality (4 in the figure) of operation buttons 126c and the above-described digital video camera 129. Here, the button cabinet 106e is fixed to the keyboard side cabinet 106b as illustrated. On the other hand, the digital video camera 129 is supported at one point on the lateral end face of the keyboard side cabinet 106b in a pivotable manner, which allows the digital video camera 129 to rotate freely in the direction shown by an arrow B in the figure.

With such a structure, the user PC 106 can be used not only in the mode similar to a general notebook personal computer shown in FIG. 3(a) but also in modes shown in FIGS. 3(b) to 3(d). For example, when used in the mode shown in FIG. 3(b), the user can hold the user PC 106 to take pictures of the user himself/herself using the digital video camera 129. In this case, since a liquid crystal screen 124a is provided on the user side as illustrated, the user can take pictures while checking the video. When used in this mode, the keyboard 126a is located on the side opposite to the user, and it is difficult for the user to operate the keyboard correctly. Taking into account this point, operations related to picture taking and processing of video, etc. of the digital video camera 129 (e.g., operations to instruct start and stop of picture taking, zooming, addition of effects, saving of moving image data and transmission, etc.) in a processing according to an application program described later can be performed by operating the above-described operation dial 126b and operation buttons 126c as appropriate. Furthermore, when used in the mode shown in FIG. 3(c), the user can hold the user PC 106 to take pictures of a target in front while watching the LCD screen 124a.

Returning to FIG. 2, the user PC 106 is configured to perform various kinds of processing such as moving image data distribution processing serviced from the above-described content supply system 100, creation/processing of moving image data and WWW (World-Wide Web) browsing by the CPU 120 executing an application program stored in the ROM 122 and hard disk 123 based on turning ON of a power supply (not shown) and instructions from the user input form the operation section 126. Hereinafter, focused on various functions realized by the CPU 120 executing the processing according to this application program, the functions of the user PC 106 will be explained with reference to the display screen, etc.

Figure 4:
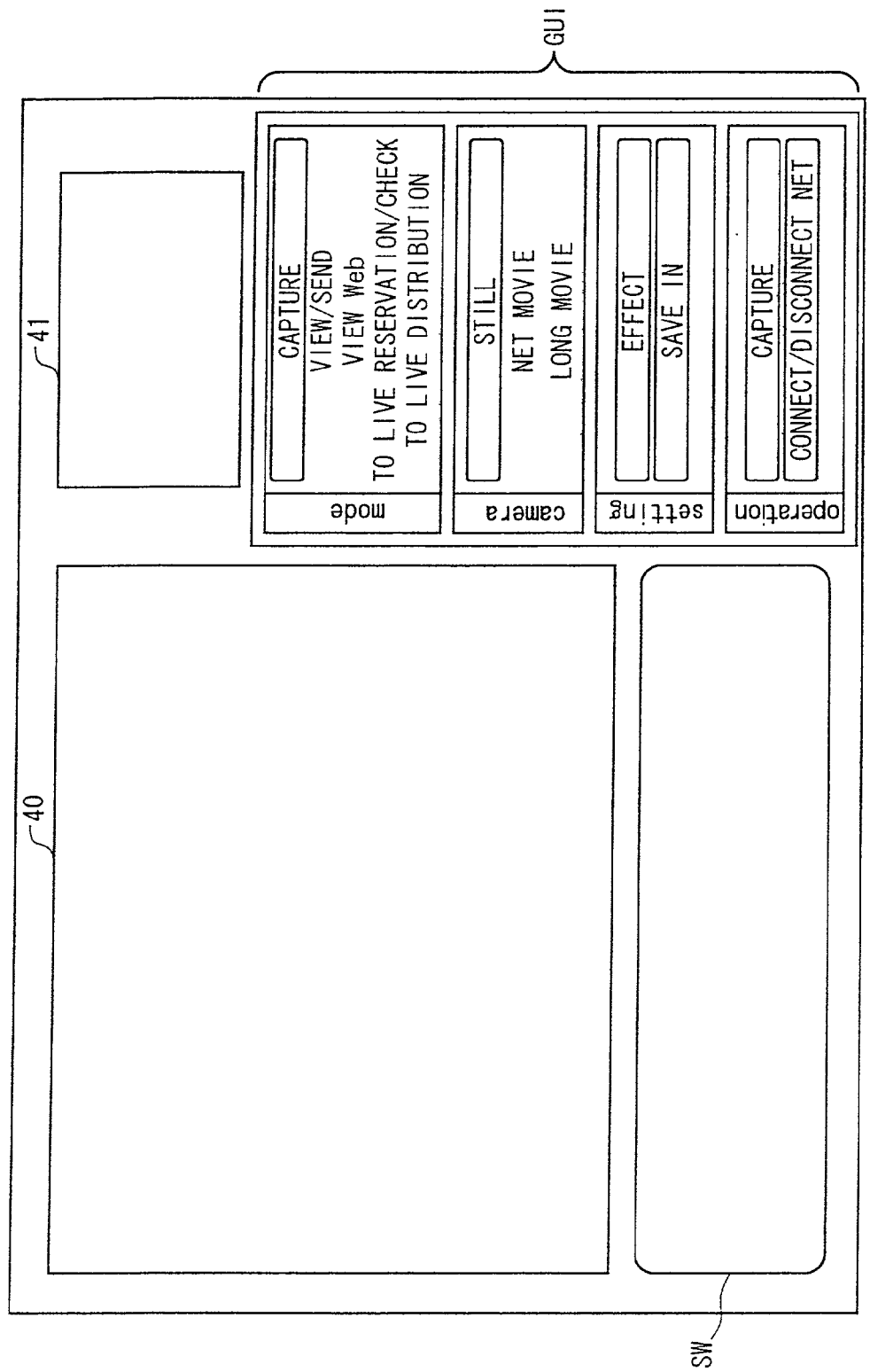
FIG. 4 is a drawing showing an initial screen at the start of an application program by the user PC above.

First, when the user PC 106 executes the above application program, an initial screen as shown in FIG. 4 appears on the display section 124 under the control of the CPU 120. As shown in the same figure, this initial screen shows a large-size main screen display area 40 displaying an image taken by the digital video camera 129, etc. and a small-size sub image display area 41 displaying a preview of the last image taken when the application program was executed previously on the top right side of the screen. Furthermore, below the sub image display area 41 a GUI (Graphical User Interface) to select a mode, type of image (camera), setting and instruction content (operation) is displayed. By selecting/setting these items as appropriate, the user can select a mode, select the type of image such as still screen (STILL) or moving image (MOVIE), change the settings and enter instructions, etc.

Here, in this application, the user can select from five modes such as capture mode (mode when "Capture" on the GUI is selected), upload mode (mode when "View/send" on the GUI is selected), Web check mode (mode when "View Web" on the GUI is selected), live reservation mode (mode when "To live reservation/check" on the GUI is selected) and live distribution mode (mode when "To live distribution" on the GUI is selected). By the way, the capture mode is selected in the initial state when the application program is started.

The capture mode is a mode in which pictures are taken by the digital video camera 129 incorporated in the user PC 106 and when this mode is selected or in the initial state, a screen as shown in FIG. 5(a) is displayed under the control of the CPU 120. As shown in the same figure, the display screen in the capture mode shows the main image display area 40 and sub image display area 41 in the same way as in the above-described initial screen (see FIG. 4), and the main image display area 40 shows the picture currently being taken and sub image display area 41 shows a preview of the last image taken before the current capture.

In this mode, too, the above-described GUI is shown below the sub image display area 41. As shown in FIG. 5(b), the GUI in this mode shows selection items such as "mode", "camera", "setting" and "operation". The selection item "operation" in this mode includes an item ("capture") to instruct a capture of an image and an item to instruct connection/disconnection with the Internet ("net connect/disconnect), etc. and it is possible to select and decide a desired item by rotating the operation dial 126b, moving the focus F (shown with bold line) to the desired item and then pressing the operation dial 126b.

Furthermore, in this capture mode, if a command, etc. which is required for capture (e.g., command to instruct a selection of an effect to be given to an image) is assigned to the operation button 126c (see FIG. 3) provided on the button cabinet 106e, the user can perform operations in the capture mode only through operations of the operation dial 126b and operation buttons 126c without using the keyboard 126a (see FIG. 3) making it possible to easily perform a capture operation in the mode when the keyboard 126a is in a position that makes it difficult to operate the keyboard as shown in FIG. 3(b) and FIG. 3(c). By the way, the above-described command can be assigned to the operation buttons 126c by default, but in this capture mode and other modes which will be explained below, it is also possible to allow the user to freely select a command to be assigned to the operation buttons 126c for each mode. In this way, the user sets so that commands frequently used in each mode are assigned to the operation buttons 126c and can thereby reduce the necessity of operating the keyboard 126a and improve the operability in each mode.

The status window SW shown at the bottom of the screen in FIG. 5(a) shows the current condition of the user PC 106 (e.g., the residual amount of the battery and the residual storage space of the hard disk drive, etc.), processing condition in the selected mode (e.g., data size of the image being taken, specified saving destination (hard disk and network, etc.) and information on the command assignment of the operation buttons 126c.

Then, the upload mode is a mode in which the image data taken in the above-described capture mode is displayed or referenced or the image data is selected and transmitted to a server (not shown) at a predetermined upload destination connected to the Internet 103 (see FIG. 1). When this mode is selected, a screen as shown in FIG. 6(a) is displayed on the display section 124 under the control of the CPU 120. As shown in the same figure, the display screen in the upload mode shows a preview area 42, a list display area 43 that shows images taken in a tile form (lined vertically in the example in the figure), a GUI, a status window SW and a transmission capsule icon SC.

As shown in FIG. 6(b), "operation" of the GUI in the upload mode includes an item to instruct connection/disconnection with the Internet ("connect/disconnect Net"), item to instruct start/end of transmission of image data ("transmit start/stop"), item to instruct movement of the focus F to the list display area 43 ("Move focus"), item to instruct a view inside the transmission capsule icon SC, that is, a view of the list of image data selected to be sent (see "transmission capsule"), etc. and it is possible to select a desired item by rotating the operation dial 126b to move the focus F to the desired item and then pressing the operation dial 126b.

Furthermore, in the upload mode, the operation buttons 126c are assigned commands to instruct replay/stop of a moving image toward the preview area 42 and display of a still image, etc. Furthermore, the status window SW in this mode shows the file name of image data, file size, format (JPEG (Joint Photographic Experts Group) and MPEG (Moving Picture Experts Group), etc.) and information indicating the transmission destination currently specified (the name of the server to be uploaded and its URL (Uniform Resource Locator)).

Here, when an item instructing the move of the focus F to the list display area 43 ("Move focus") is selected, the focus F moves onto the list display area 43. When the focus F moves onto the list display area 43, the focus F sequentially moves from one listed image to another according to the rotation operation of the operation dial 126b. When the user wants to send some image data, the user rotates the operation button 126c and moves the focus F onto the relevant image data. Then, pressing the operation dial 126b shows a SUB-GUI to instruct processing on the image data as shown in FIG. 6(a) and the focus F moves onto an item of this SUBGUI. As shown in FIG. 6(c), the SUBGUI includes instruction items such as "Save", "Delete", "Preview" and "Enter into transmission capsule". Here, when the user rotates the operation dial 126b to move the focus F onto "Enter into transmission capsule" which is desired processing and presses the operation dial 126b, the relevant image data is added to the list of image data to be sent. When the user selects image data to be sent and sends the image data in this way, the user returns the focus F onto an item of the GUI and selects "transmit start/stop". When "transmit start/stop" is selected, the processing of transmission of the image data selected by the CPU 120 of the user PC 106 is executed.

Next, the Web check mode is a mode for connecting to a network such as the Internet and carrying out browsing. When the Web check mode is selected, a screen as shown in FIG. 7(a) is displayed on the display section 124 under the control of the CPU 120. As shown in the same figure, the Web check mode shows a browser display screen 44 that shows a Web browser, a URL display field 45 that shows URLs entered to display resources on the browser display screen 44, a GUI and a status window SW. Here, when the Web check mode is selected, the CPU 120 executes browser software stored in the hard disk 123 (e.g., Internet Explorer (Microsoft Corporation) and Netscape Navigator (registered trademark of Netscape Communications Inc.)) and the display screen is shown on the browser display screen 44 by the browser software above.

As shown in FIG. 7(b), the GUI in the Web check mode shows "browsing" to select an instruction item when browsing and "browsing" shows an item to instruct a jump to a predetermined Web page ("Jump") and an item to operate the browser (e.g., "Next" or "Return", etc.). "operation" in this mode includes an item to instruct connection/disconnection with the Internet ("Connect/disconnect Net"), an item to instruct movement of the focus F to the browser display screen 44 ("Move focus"), etc. and it is possible to select a desired item by rotating the operation dial 126b to move the focus F to a desired item and then pressing the operation dial 126b.

This "Web check" allows the user to perform general browsing processing such as entering a URL and performing browsing.

Then, the live reservation mode is a mode to reserve a time zone, etc. to be connected to the server reservation control center 101 (see FIG. 1) over the Internet 103 and carry out personal broadcasting using the above personal casting service. When the live reservation mode is selected, a screen as shown in FIG. 8(a) is displayed on the display section 124 under the control of the CPU 120. As shown in the same figure, the live reservation mode shows the browser display screen 44, URL display field 45, GUI and status window SW in the same way as in the above Web check mode and a reservation list display area 46 as well.

As shown in FIG. 8(b), "operation" of the GUI in the live reservation mode includes an item to instruct connection/disconnection with the Internet ("connect/disconnect net") and item to instruct movement of the focus F to the browser display screen 44 ("Move focus"), etc. The GUI in this mode shows "browsing" as in the case of the above Web check mode and "browsing" shows an item to instruct a jump to a Web page to make a live reservation ("Reservation jump") and an item to operate the browser (e.g., "Next" or "Return", etc.) etc. It is possible for the user to select a desired item by rotating the operation dial 126b to move the focus F to a desired item and then pressing the operation dial 126b. By the way, the Web page to make a live reservation refers to a Web page that the live casting server, which will be described later, in the server reservation control center 101 stores in its hard disk.

Here, when the user makes a reservation for live distribution using the personal casting service, the user selects and decides the item to instruct a jump to the Web page to make a reservation for distribution. Then, the CPU 120 accesses the above live casting server over the Internet 103 to make a live reservation and can thereby exchange reservation-related information such as sending reservation request information to the relevant live casting server and downloading the reservation setting information from the live casting server.

The reservation list display area 46 shows a list of contents of reservations made-by the user to the above server reservation control center 101 and displays outlined information such as a reservation time zone, etc. for each reservation. When the user rotates the operation dial 126b to move the focus F onto the reservation list display area 46, presses the operation dial 126b and thereby selects the item on the reservation list display area 46 which shows the desired reservation outlined information, then the CPU 120 controls such as jumping to the Web page to check the reservation of the live casting server of the above server reservation control center 101. Details about the reservation-related processing between the user PC 106 and server reservation control center 101 will be described later.

Then, the live distribution mode is a mode for connecting to the streaming server 102 (see FIG. 1) via the telephone network 104 and dedicated server connection network 108 and transmitting content data such as moving image data, etc. taken by the digital video camera 129 to the streaming server 102 in real time and the content data sent in this mode is stream-distributed by the streaming server 102 to the client PC 107 that sent a request. This allows the user to distribute personal broadcasting in real time.

When such a live distribution mode is selected, a screen as shown in FIG. 9(a) appears on the display section 124 under the control of the CPU 120. As shown in the same figure, the live reservation mode shows an effect display field 48, a preview screen 47 that displays an image to be sent to the streaming server 102, that is, an image which is the image taken by the digital video camera 129 with predetermined effects, etc. added, the GUI and status window SW.

The status window SW in the live distribution mode shows on-air information that indicates that distribution is in progress, distribution elapsed time information indicating the elapsed time after distribution is started, time information on the service provider side, time information on the user PC 106 side, reserved time zone information that indicates reservation start time and reservation end time, image size information, bit rate information indicating the distribution data transmission rate (bit rate), distributed image data title name information, connection destination information indicating the connected streaming server 102 and its channel and audience number information indicating the number of clients who receive content data stream-distributed by the streaming server 102, etc.

As shown in FIG. 9(b), "operation" of the GUI in the live distribution mode includes an item to instruct connection/disconnection with the Internet ("Connect/disconnect Net"), an item to instruct the start/end of live distribution ("Start/finish distribution"), an effect setting item to set effects shown in the effect display field 48 ("Set effect"), an item to instruct the movement of the focus F to the effect display field 48 ("Move focus"), etc. and it is possible to select a desired item by rotating the operation dial 126b to move the focus F to a desired item and pressing the operation dial 126b.

Here, when the user selects and decides an item to instruct the start/end of live distribution, the CPU 120 connects to the streaming server 102 via the telephone network 104 and dedicated server connection network 108 according to the reservation setting information supplied from the live casting server in the above live reservation mode. Then, when the connection with the streaming server 102 is established, the CPU 120 sends moving image data taken by the digital video camera 129 to the streaming server 102 in real time according to the content (e.g., data transfer rate, etc.) set in the above reservation setting information. The processing of communication/connection with the streaming server 102 and moving image data transmission processing, etc. after communication/connection will be described later in detail.

Figure 10:
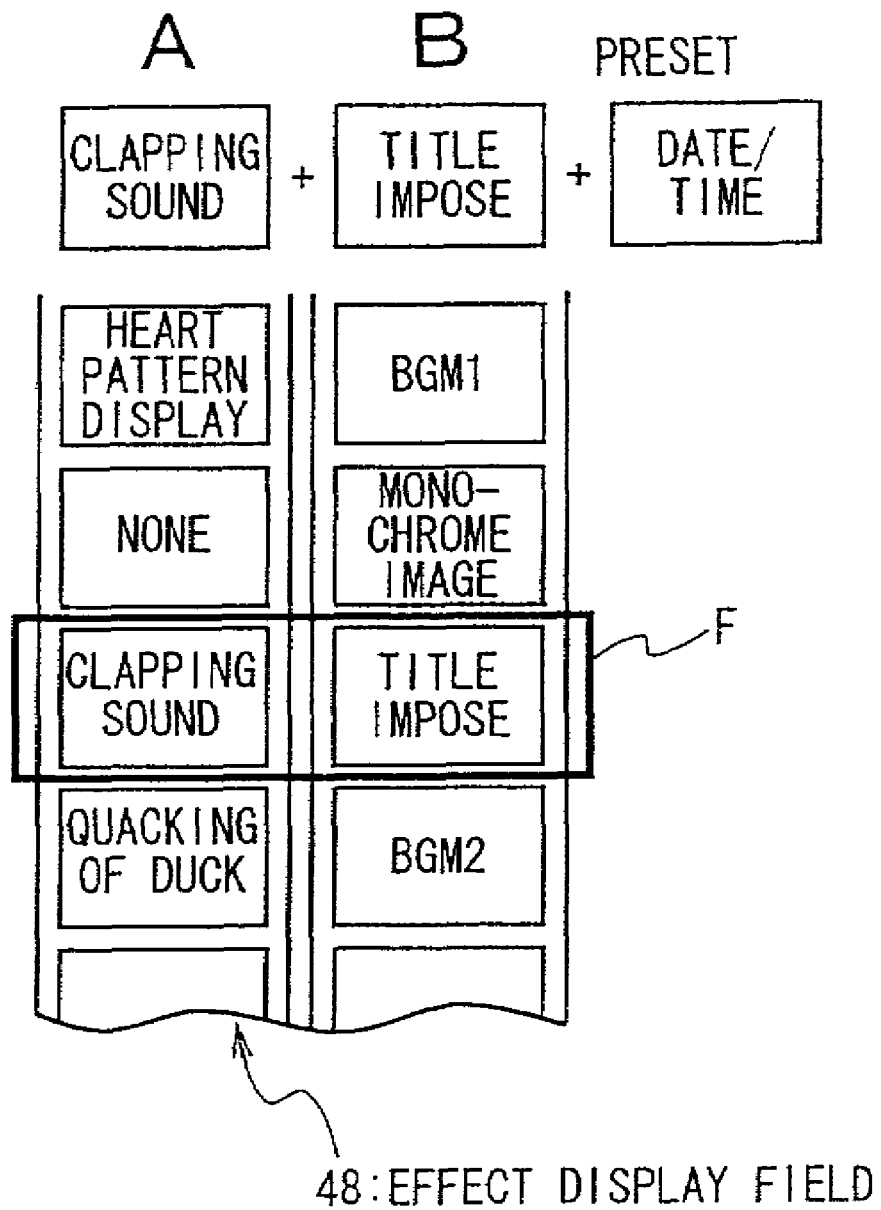
FIG. 10 is a drawing showing an effect display field in the live distribution mode above.

As shown in FIG. 10, the effect display field 48 in the live distribution mode displays effect names in order in the vertical direction for each of button A and button B (marked "A" and "B" on the upper surface of the button, etc.) in the operation buttons 126c. Here, the topmost effect name is the effect name currently selected. In the example of the figure, button A shows selection candidates such as "Heart pattern display", "None", "clapping sound" . . . starting from the top. These are used to instruct assignment of an effect corresponding to the effect name enclosed by the focus F that relatively moves when the user rotates the operation dial 126b, that is, the currently selected effect name shown at the top and when the user presses the button A in the operation buttons 126c, the effect corresponding to the effect name selected and enclosed by focus F is added to the image taken by the digital video camera 129. For example, in the figure, when button A is pressed, processing of adding a clapping sound which is the effect corresponding to the "Clapping sound" to the moving image data taken by the digital video camera 129 is executed. That the above focus F moves relatively means that the operation of the rotary dial 126b does not cause the focus F to move but causes the display string of the effect name to scroll and as a result the focus F moves on the "effect name" displayed on the display string.

Button B shows an effect name "Title impose" currently enclosed by the focus F, that is, selected and below this shows effect names such as "BGM1", "Monochrome image", "Title impose" . . . sequentially starting from the top. These are used to instruct that an effect corresponding to the effect name enclosed by the focus F be added and by the user pressing the button B in the operation buttons 126c, the effect corresponding to the effect name enclosed by the focus F is added to the image taken by the digital video camera 129. For example, in the figure, when button B is pressed, processing of superimposing the title name which is the effect corresponding to "Title impose" is executed on the moving image data taken by the digital video camera 129. Here, the effect processing corresponding to button A is the addition of "clapping sound" which is processing temporarily added, while the effect processing corresponding to button B is processing added continuously. Therefore, a toggle button is used as button B in the operation buttons 126c in the user PC 106 and once pressed, effect adding processing such as "monochrome image", etc. is continued until the button is pressed the next time.

Furthermore, a preset effect name preset by the user is shown to the right of the effect names corresponding to button B on the screen. The effect shown here is added continuously unless the effect to be preset is changed in the effect setting, which will be described later, irrespective of button operations. In the example in the figure, "Date/time" is set and in this case, the date/time is always superimposed in the moving image data to be distributed.

The above effect processing is implemented assuming that live distribution will be performed, that is, moving image data taken by the digital video camera 129 will be sent in real time. That is, when live distribution is performed, the user PC 106 sends images taken in real time and the operation when adding effects, etc. to the images taken is required to be simple, and therefore it is designed that processing can be executed by a single operation of pressing button A or button B as described above. However, while it is possible to instruct the processing of adding an effect by a single operation of pressing button A or button B, when button A or button B is depressed, the processing of the effect corresponding to the effect name enclosed by the focus F in the effect display field 48 is executed. Therefore, if the effect name and its display sequence shown in the effect display field 48 do not match the intention of the user, the amount that the focus F must be moved increases relatively to add the desired effect, which will take much time to rotate the operation dial 126*b*, preventing the user from adding the desired effect at desired timing.

Figure 11:
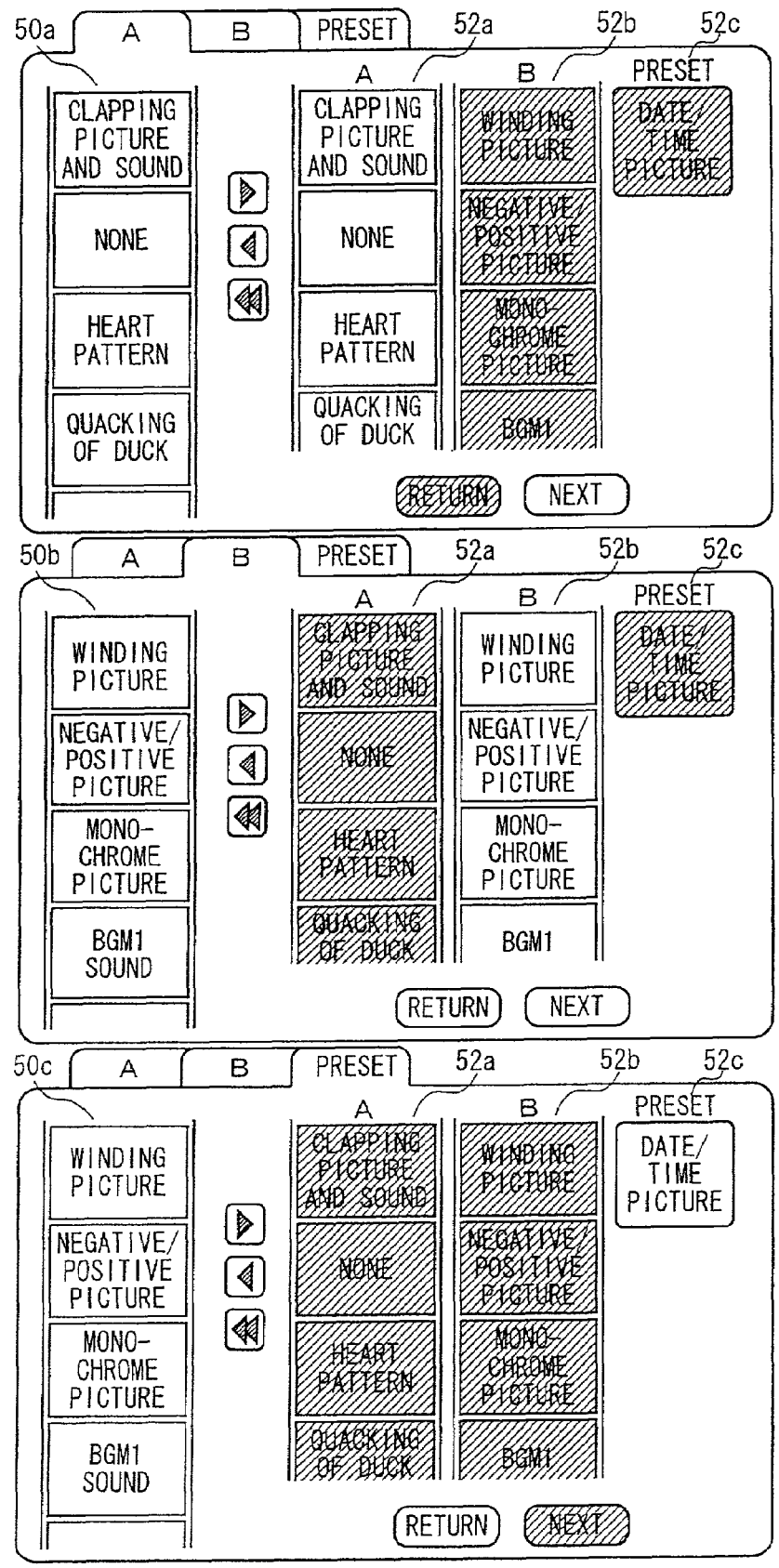
FIG. 11 is a drawing showing a display screen during effect setting processing in the live distribution mode above.

Thus, selecting "Set effect" from the GUI above (see FIG. 9(*b*)) in the live distribution mode makes it possible to set what effect from among many effects provided beforehand should be displayed in the above effect field 48 in what order. Here, FIG. 11 shows a screen displayed on the display section 124 when "Set effect" (see FIG. 9(*b*)) of the above GUI is selected. As shown in (a), (b) and (c) of the same figure, three setting screens, button A, button B and preset button, are provided. The screen to perform the effect setting corresponding to button A in FIG. 11(*a*) shows a button A effect list field 50*a* that lists many effect names provided and to be temporarily assigned, that is, effect names corresponding to button A on the left side of the screen and a registration list field 52 to be displayed in the above effect display field 48 on the right side of the screen. The registration list field 52 displays button A registration list field 52*a*, button B registration list field 52*b* and preset registration field 52*c*. On the button A setting screen, the display colors of the button B registration list field 52*b* and the preset registration field 52*c* are different from the display color of button A registration list field 52*a*, which allows the user to easily recognize the currently settable registration field. In the button A effect list field 50*a*, the user can scroll up and down many provided and executable effect names for effect processing.

On such a display screen, the user selects an effect to be displayed in the effect display field 48 from among the effects displayed in the button A effect list field 50*a* and drags the selected effect into the button A registration list field 52*a*. Thus, the user can make a setting in such a way that desired effects corresponding to button A are displayed in the effect display field 48 in a desired order.

When effects corresponding to button B are set, the screen shown in FIG. 11(*b*) is displayed. On the right side of this screen, a button B effect list 50*b* that displays many effect names provided and consecutively added, that is, effect names corresponding to button B is displayed. In the button B effect list 50*b*, the user can scroll up and down many provided and executable effect names for effect processing.

On such a display screen, the user selects an effect to be displayed in the effect display field 48 from among the effects displayed in the button B effect list field 50*b* and drags the selected effect into the button B registration list field 52*b*. Thus, the user can make a setting in such a way that desired effects corresponding to button B are displayed in the effect display field 48 in a desired order.

When preset effects are set, the screen shown in FIG. 11(*c*) is displayed. On the right side of this screen, a preset effect list 50*c* that displays many effect names provided and consecutively added is displayed. In this preset effect list 50*c*, the user can scroll up and down many provided and executable effect names for effect processing.

On such a display screen, the user selects an effect to be displayed in the effect display field 48 from among the effects displayed in the preset effect list field 50*c* and drags the selected effect into the preset registration list field 52*c*. Thus, the user can set preset effects.

When carrying out live distribution, the user generally has an established concept of the types of effects to be added, timing and order of adding those effects, etc. Therefore, if a setting is made with consideration given to the types of effects to be added and order in which effects are added based on the user's concept, it is possible to perform effect processing that will reproduce the user's concept more faithfully through simple operations in live distribution.

The user PC 106 can store an application program provided with the five functions of the capture mode, upload mode, Web check mode, live reservation mode and live distribution mode as described above in the hard disk 123 and execute the above processing function. In addition, the user PC 106 also stores a program to execute processing for automatically incorporating a reservation setting information file, which will be described later, when a reservation for live distribution is made and a program to execute processing for communication/connection with the streaming server 102. The functions obtained by executing these programs will be described in detail later.

A-3. Server Reservation Control Apparatus

Figure 12:
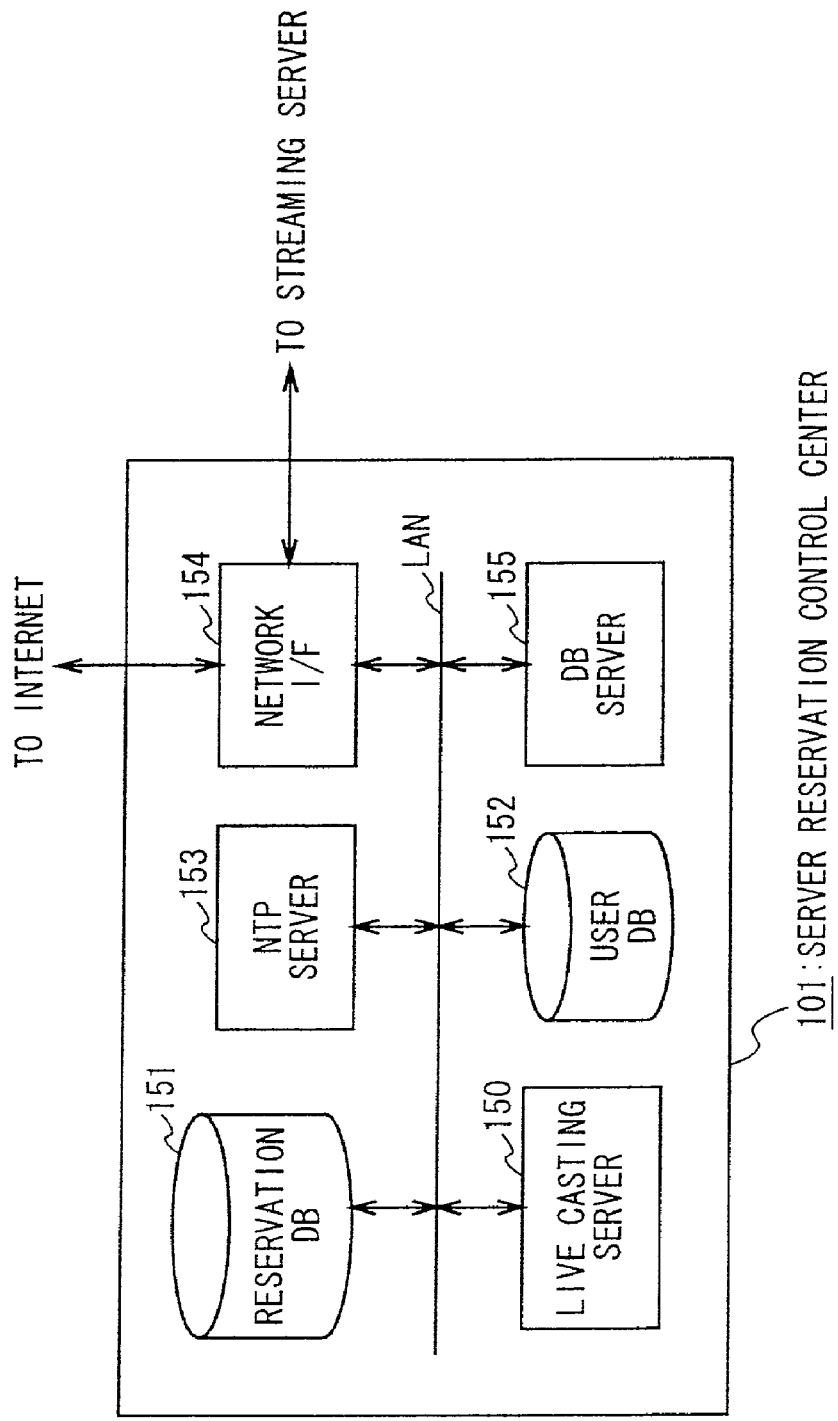
FIG. 12 is a block diagram showing a configuration of a server reservation control apparatus of the content supply system above.

As described above, when the user PC 106 performs live distribution as a broadcaster, it is necessary to make a reservation for use of the streaming server 102 in the time zone for carrying out live distribution in a personal casting service provided from the content supply system 100. Next, the server reservation control center 101 on the service provider side who controls the reservation for use of the streaming server 102 will be explained with reference to FIG. 12.

As shown in the same figure, the server reservation control center 101 comprises a live casting server 150, a reservation database 151, a user database 152, an NTP (Network Time Protocol) server 153, a network interface 154 and a database server 155, all of which are mutually connected to a LAN (Local Area Network). Here, each component above of the server reservation control center 101 exchanges various kinds of data with the user PC 106 and client PC 107 connected to the Internet 103 via the network interface 154 and the streaming server 102 connected to a dedicated line 109 (see FIG. 1).

The live casting server 150 is a server that performs processing to control the overall service such as live distribution reservation processing, billing processing, service member registration processing in a personal casting service. The live casting server 150 stores Web pages for registration for the user to acquire the right to receive this service, for reservation reception to receive the reservation from the user, for reservation confirmation for the user to confirm or change the reservation and for referencing a program table to reference program table, etc. live-distributed to the client PC 107 in the hard disk and upon receipt of a request from the user PC 106 or client PC 107, the user PC 106 or client PC 107 is allowed to browse the Web page corresponding to this request. The Web page provided for the live casting server 150 will be explained with reference to the display screen displayed on the browser screen on the PC side that requested the browsing of the relevant Web page.

Here, when using a PC connectable to the Internet 103 such as the user PC 106 and client PC 107, the user enters a URL to identify the top page (homepage) of the Web page of the live casting server 150 and makes a request for browsing, FIG. 13 shows a Web page display screen that appears on the requesting PC side. By the way, when requesting the browsing of the top page of the Web page of the live casting server 150, there is also another method of jumping to the relevant page by clicking on a link button on another homepage in addition to the method of entering the URL as shown above.

As shown in FIG. 13, this homepage shows link buttons such as "Member registration", "What is personal casting TV?", "Today's live", "Program guide", "My channel", "Live distribution reservation", "Program pickup", "Image Station", in addition to the fields to enter a user ID and password to log in. When these link buttons are clicked, a Web page hyper-linked to each link button is sent to the PC side and displayed.

When "Member registration" is clicked, a Web page to register members eligible to the relevant personal casting service appears on the display screen on the PC side, which will be described in detail later.

Then, when "What is personal casting TV?" is clicked, a screen as shown in FIG. 14 appears on the display screen on the PC side. As shown in the same figure, this Web page screen shows a description urging member registration of the personal casting service and a link button "To registration page" to jump to the above "Member registration" Web page. Moreover, this display screen contains outlined descriptions of the personal casting service and processing procedure, etc.

Then, when "Today's live" is clicked, a screen as shown in FIG. 15 appears on the display screen on the PC side. As shown in the same figure, this Web page screen shows live programs to be distributed today and shows the current time on the service provider side (a reservation is executed based on this time) at the top and a list of information of items such as distribution times, title, distributor and outline, etc. of a special program and a private program to be distributed today below (the example in the figure describes the names of items displayed, but the contents of the above items (distributor name and title name, etc.) are actually displayed)). Here, the "special program" means content supplied by a company and the "private program" means content supplied by an individual user such as the user PC 106. Furthermore, a program described as "On-demand" instead of distribution time is not live-distributed but an on-demand distribution program for which distribution data is stored on the live casting server 150 side beforehand and distributed at the request of the client PC 107, etc. Furthermore, "Capacity" in a private program is information indicating the capacity of the number of clients who can receive a distribution of the content of the relevant program and "OPEN" and "CLOSE" are information indicating whether the content can be distributed at present at the request of the client or not in consideration of restrictions such as the above capacity ("OPEN": distributable, "CLOSE": not distributable).

Here, "Title" in the list of the program above is a link button and when this button is clicked, detailed information of the live program of the clicked "Title" appears as shown in FIG. 16. On this screen, if the user enters a correct password and clicks on the "Replay" button 175 during the time for distribution of the relevant program, a distribution request for the relevant live program is sent to the streaming server 102 over the Internet 103. This allows the client PC 107 that has sent the distribution request to receive a stream distribution of the relevant live program content by the streaming server 102 and reproduce this in real time. By the way, reproducing the content streaming-distributed by the streaming sever 102 in real time requires replay software to perform this real-time replay processing (e.g., "Real player" (Real Networks Co., Ltd.) and "Windows Media Player" (Microsoft Corporation), etc.). Therefore, if the PC that sends a distribution request does not store the above replay software, the "Replay software" button 176 is clicked. This makes it possible to download the above Replay software to the PC and reproduce and view the content stream-distributed by the streaming server 102 in real time by the relevant PC.

Then, when "Program guide" is clicked, a screen as shown in FIG. 17 appears on the display screen on the PC side. As shown in the same figure, this Web page screen shows a monthly calendar including the current day and shows a list of programs distributed on the date indicated by the outline characters on a colored background of the calendar. Here, the list of programs displayed is the same as "Today's live" described above (see FIG. 16). On this display screen, clicking on a desired date on the monthly calendar above shows a program list for the relevant date. The screens displayed for "Today's live" and "Program guide" are not limited to those shown in FIG. 16 and FIG. 17, but can be provided in a display format such as a TV column of a newspaper in which a matrix-like program display column is provided showing the time on the vertical axis and a channel on the horizontal axis and a title name, contents and distributor name, etc. are displayed in the relevant matrix, and this display format can be set arbitrarily.

Then, "My channel" is a Web page provided for each user who is granted the right to become the transmitter of live distribution (user registered as a premium member, which will be described later) and when "My channel" is clicked, a Web page, etc. to confirm the reservation content of live distribution at the actual point in time is displayed. Furthermore, when "Live distribution reservation" is clicked, a Web page to make a reservation for live distribution is displayed, but this will be described in detail later. By the way, users who are not registered as members have no user ID or password, and cannot perform log in processing such as entering the above-described user ID and password. When "My channel" or "Live distribution reservation" is clicked on the PC of the user who has not proceeded with such log in processing, a jump is not made to the corresponding Web page but to "What is personal casting TV?" where the user is urged to register as a member.

Then, "Program pick up" is a Web page to present a program, etc. recommended by the service provider and when this is clicked, detailed information (see FIG. 16) on the program recommended by the service provider appears.

The live casting server 15 stores the above-described Web pages in its hard disk.

Returning to FIG. 12, the reservation database 151 stores information on the reservation situation of live distribution and billing resulting from the reservation. As shown in FIG. 18, the reservation database 151 stores the reservation content information including the reservation time zone, channel used, band used (bps (bit per second)), etc. for every reservation in association with user ID to identify the user, billing flag information to indicate whether the reservation is established and billing is possible at that point in time or not and reservation ID used for authentication when the relevant reservation is completed. Each of these information pieces will be written during reservation processing, etc. by the live casting server 150 which will be described later and each information piece stored in the authentication processing by the database server 155 which will be described later will be referenced.

The user database 152 stores information on registered users who have the right to receive the personal casting service and stores information such as the name, user ID, password, e-mail address, address, telephone number (cellular phone and facsimile number), credit card number and expiration date of the credit card for billing for every registered user. Each of these information pieces will be written during member registration processing by the live casting server 150 which will be described later and referenced during reservation processing by the live casting server 150 which will be described later.

The NTP server 153 controls time information in the apparatus on the service provider side such as this server reservation control center 101 and streaming server 102 in a centralized manner and the live casting server 150 and streaming server 102 acquire the time information from the NTP server 153 and control the live distribution start time and end time based on the acquired time information. This reflects consideration that a service like live distribution must operate under precise time control and unifying the reference times on the service provider side prevents the server reservation control center 101, which is the apparatus on the service provider side, and the streaming server 102 from operating using mutually different times as reference. Furthermore, the time of the user PC 106, which is the user side apparatus, may be different from the time of the service provider, and if the user of the user PC 106 fails to recognize this time difference, there may be a difference between the start time and end time of live distribution specified by the service provider and the start time and end time of live distribution recognized by the user. Therefore, the reservation processing by the live casting server 150 notifies the user PC 106 of this time difference, and this time difference is calculated based on the time information acquired by the live casting server 150 from the NTP server 153.

When the user PC 106 or another illegal PC sends a connection request to use the streaming server 102 to the access port of the dedicated server connection network 108, the database server 155 receives the request from an access server (not shown) of the dedicated server connection network 108 and performs authentication processing as to whether the accessing PC is a PC that has made a valid reservation (that is, user PC 106) or not. If that PC has been authenticated to be the valid PC in the above authentication processing, a communication/connection between the streaming server 102 and the user PC 106 is established and the user PC 106 requests the streaming server 102 to execute stream distribution processing. In this case, the streaming server 102 requests the database server 155 for authentication processing to authenticate whether the PC sending the distribution request is a PC that has a valid reservation or not. Upon reception of such a request from the streaming server 102, the database server 155 performs authentication processing to authenticate whether it is a PC that has a valid reservation or not. This authentication processing is performed by referencing the reservation database 151. The two kinds of authentication processing above will be explained in detail later.

A-4. Streaming Server

Then, the streaming server 102 shown in FIG. 1 receives content data such as moving image data sent from the user PC 106 having the above-described valid reservation via the dedicated server connection network 108, etc. and performs a stream distribution of this content data to the client PC 107 that has sent a distribution request over the Internet 103.

The streaming server 102 can perform a stream distribution of a plurality of content simultaneously. That is, the streaming server 102 has a configuration of having a plurality of channels so that a plurality of distributors in the same time zone can perform live distribution of content using the streaming server 102. This streaming server 102 has a preset number of people who can receive distribution, transmission band (64 kbps or 28.8 kbps, etc.) and service fee, etc. for every channel and the user who receive content distribution using the streaming server 102 can select a channel to be reserved taking into account the above settings.

Furthermore, the streaming server 102 performs stream distribution processing of content sent from the live distributor such as the user PC 106 as described above and stores commercial content, etc. distributed during a free time zone with no reservation or intervals between programs and performs distribution processing of commercial content in the free time zones above.

Furthermore, the streaming server 102 controls the distribution time zone and restriction on the number of client PCs 107 to which content is distributed according to the reservation content permitted to the user PC 106 by the server reservation control center 101. This processing will be described later.

A-5. Communication Path Between Streaming Server and User PC for Live Distribution As shown in FIG. 1, the streaming server 102 is connected to the dedicated server connection network 108 and when live distribution described above is performed, the user PC 106 is connected to the streaming server 102 via the telephone network 104 and dedicated server connection network 108. The dedicated server connection network 108 is a dedicated network provided to carry out live distribution in the personal casting service supplied by this content supply system 100.

Here, while communication/connection between the streaming server 102 and user PC 106 is possible via the Internet 103, this content supply system 100 provides the dedicated server connection network 108 to be connected to the streaming server 102 in order to secure the transmission path and transmission band of content data from the user PC 106 to the streaming server 102. Such a dedicated network is used for the following reasons. In order for the user PC 106 to be connected to the Internet 103, the user PC 106 needs to be connected to an Internet service provider (hereinafter referred to as "ISP") with which the user PC 106 has contracted via the telephone network 104. Such an ISP receives connections not only from registered members of this personal casting service but also from PCs of a multitude of Internet users. Therefore, when a multitude of Internet users connects to the ISP and Internet 103, the user PC 106 can no longer secure a transmission band necessary for live distribution. Moreover, the user PC 106 may not be able to be connected to the ISP for reasons such as that the line is busy. Data transmission using the Internet 103 has the problem of a deteriorated connection environment as described above, while carrying out live distribution requires a communication path with the streaming server 102 at a desired bit rate to be secured within a desired time and the above problem prevents a normal service from being supplied. Therefore, the content supply system 100 prevents the above problem by providing the dedicated server connection network 108 without using the Internet 103.

Here, the dedicated server connection network 108 is provided with a multitude of lines to be connected to the streaming server 102. The number of lines provided for the dedicated server connection network 108 is greater than the maximum number of users connected to the streaming server 102 in the same time zone (e.g., if the maximum number of users for whom connection is permitted is 10, the number of lines is 20). This is for the following reason. As described above, the access server of the dedicated server connection network 108 requests the database server 155

(see FIG. 12) to perform authentication processing on the PC that requests for a connection and authenticate whether the PC that requests for the connection has a legal reservation or not. If the PC is judged to have no legal reservation in this authentication processing, the call from the PC requesting for the connection is immediately cut. Therefore, while any illegal PC cannot use the line of the dedicated server connection network 108, one line remains busy while the above authentication processing is in progress. For this reason, if the maximum number of users allowed to connect is equal to the number of lines provided, an illegal user may make a multitude of calls simultaneously to the access port of the dedicated server connection network 108 for the purpose of interference with the personal casting service, etc., which will prevent PCs of users with a legal reservation from connecting. Therefore, providing lines exceeding the maximum number of users as shown above reduces the possibility that the service will be interfered by illegal users.

Furthermore, this personal casting service allows connection to the streaming server 102 a predetermined time before the distribution is started based on the reservation, making it possible to complete connection processing such as authentication before the time at which the distribution starts and perform live distribution at the time at which the reserved distribution starts. Therefore, if reservation times of different users are continuous, the following problem may occur. That is, the connection of a user receiving a distribution who reserved a previous time zone may overlap the connection by the user who reserved a posterior time zone after a lapse of time after a predetermined time at which distribution is started and lines corresponding to the maximum number of users who can receive distribution alone are not enough. Thus, providing lines twice the maximum number of users above can even handle the case above where the connection by the user who reserves the preceding time zone overlaps the connection by the user who reserves the posterior time zone.

Furthermore, the dedicated server connection network 108 to be connected to the streaming server 102 can provide not only access ports for a network (e.g., public switched telephone network) of one carrier but also access ports accessible from networks (e.g., ISDN (Integrated Services Digital Network) or mobile telephone network) of a plurality of carriers. In this case, the user PC 106 selects a carrier to be connected, calls an access port corresponding to the network of the relevant carrier and establishes a communication/connection with the streaming server 102 via the dedicated server connection network 108.

A-6. Client PC

As described above, the content data sent from the user PC 106 to the streaming server 102 in real time is stream-distributed over the Internet 103 to the client PC 107 that sent a request for distribution to the streaming server 102. The client PC 107 can send a distribution request from the Web page (see FIG. 16) of the above-described live casting server 150 and also directly send a distribution request to the streaming server 102 by entering the URL of the streaming server 102. This embodiment refers to the PC that sends a distribution request to the streaming server 102 and receives streaming distribution from the streaming server 102 and these client PCs 107 store an application program to reproduce stream-distributed content data in real time (e.g., "Real player" (Real Networks Co. Ltd.), "Windows Media Player" (Microsoft Corporation), etc.) and can replay and view the distributed content data in real time by executing the application program when distribution is received.

B. Operation of Content Supply System

Then, the various processing operations of the content supply system 100 in the above configuration to implement a live casting service will be explained.

B-1. Member Registration

Figure 19:
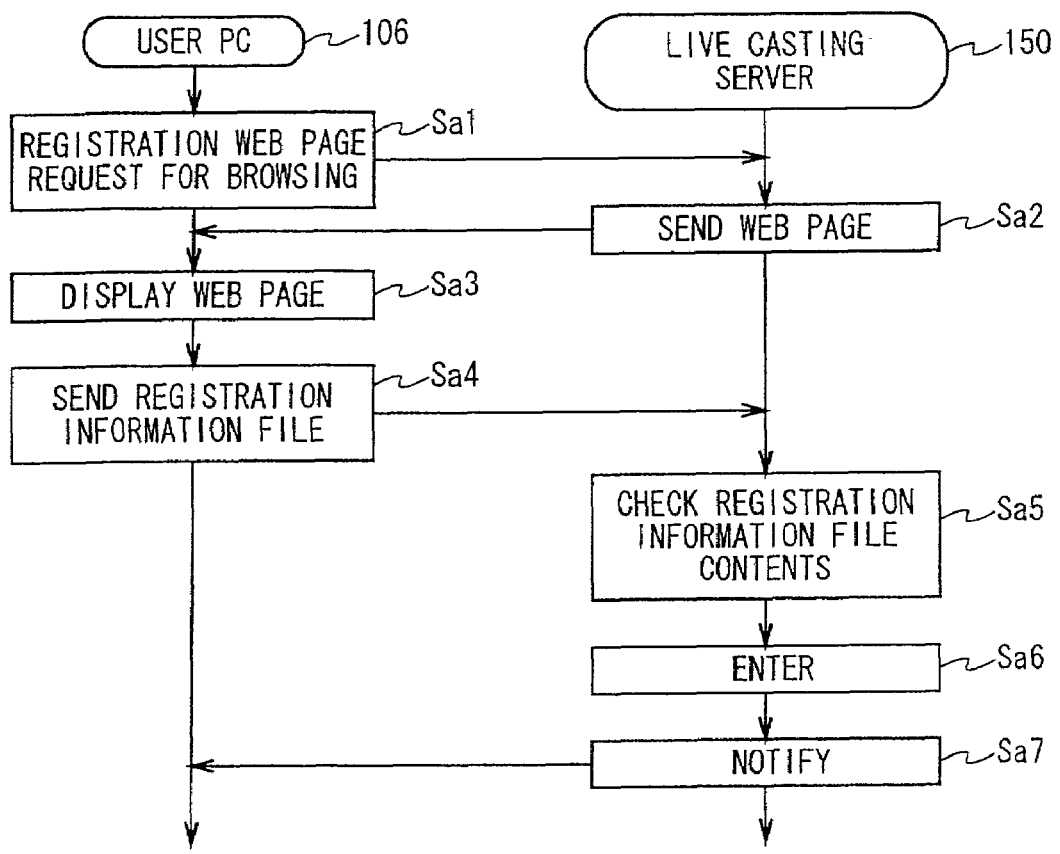
FIG. 19 is a sequence flow chart showing the processing operation of the user PC and the live casting server above during member registration.

First, when the user of the user PC 106 performs a live distribution using the personal casting service, it is necessary to apply for member registration to the live casting server 150 of the server reservation control center 101 to acquire the right to perform a live distribution under this service. Here, FIG. 19 shows a sequence flow chart of the processing operation of the user PC 106 and live casting server 150 when applying for this member registration. As shown in the same figure, to apply for member registration, the user PC 106 connects to the Internet 103 and sends a request for browsing a Web page to the live casting server 150 (see FIG. 12) (step Sa1). Here, when the user PC 106 connects to the Internet 103, power to the user PC 106 is turned on first and then the above-described application program is started. Then, by the user selecting the Web check mode, the screen as shown in FIG. 7(a) is displayed on the display section 124. In this Web check mode, the user enters a URL to identify the Web page of the live casting server 150 and requests for browsing.

When the user PC 106 sends a request for browsing a Web page to the live casting server 150 in this way, the live casting server 150 sends the Web page via the Internet 103 to the user PC 106 (step Sa2). The user PC 106 that has received the Web page sent displays the Web page on the browser display screen 44 (step Sa3).

In the case of such a browsing request or Web page transmission, the user PC 106 and live casting server 150 carry out the following operation and processing. First, when the user PC 106 enters the URL of the live casting server 150 and sends a browsing request, the browser display screen 44 displays the top page of the Web page stored in the live casting server 150 as shown in FIG. 13. Here, the user clicks on "Member registration" to apply for member registration. This makes the CPU 120 of the user PC 106 send a request for browsing the Web page to apply for member registration to the live casting server 150 via the Internet 103. Then, the live casting server 150 sends the member registration Web page and upon reception of this, the CPU 120 of the user PC 106 displays the member registration screen as shown in FIG. 20 on the browser display screen 44.

As shown in FIG. 20, the member registration screen shows the names of the items to be entered for member registration and the entry field to enter the relevant item. Here, this personal casting service provides the above described function of the client PC 107, that is, two kinds of member registration, a general member who receives a service of receiving content live-distributed by the streaming server 102 and a premium member who can use the service as a distributor who performs a live distribution in addition to the service of receiving the above content and the member registration screen shows an input field 210 for general/premium members and an input field 211 only for a premium member.

In this display screen, the user who registers only as a general member such as the user of the client PC 107 enters items of the input field 210. Here, the member registration input screen displays a Cancel button 212 that cancels the content entered and an Enter button 213 that instructs the content entered to be registered and when the user clicks on the Enter button 213, the CPU 120 instructs the content entered in the input field 210 to be sent as registration information to the live casting server 150 via the Internet 103.

On the other hand, when the user registers as a premium member, the user checks the checkbox and enters items of the input field 210 and input field 211. When the user completes entries of these items and clicks on the Enter button 213, the CPU 120 of the user PC 106 creates a registration information file of the same content as that entered in the above member registration input screen and sends this to the live casting server 150 via the Internet 103 (step Sa4) and at the same time writes and stores the registration information file in the hard disk 123 in the user PC 106.

The live casting server 150 receives the registration information file created according to the content entered of the user of the user PC 106 over the Internet 103 as shown above, checks the content of the registration information file received and decides whether or not to allow it to be registered (step Sa5). The processing content here is as follows. First, when there is no information on a certain item, that is, the user has entered nothing in that item, etc., this is informed to the user PC 106 prompting for a reentry. Furthermore, the live casting server 150 accesses a credit check server of a credit company via the Internet 103 to check whether the credit card in the registration information file is valid or not and permits the registration only when the credit card is valid.

When the registration is permitted, the live casting server 150 writes the information of the items in the registration information file in the user database 152 and in this way carries out registration processing (step Sa6). Furthermore, in the premium member registration processing, the live casting server 150 creates a "My channel" Web page corresponding to the relevant registered user and stores in the hard disk.

When this registration processing is completed, the live casting server 150 notifies the user PC 106 over the Internet 103 that the registration processing has been completed (step Sa7) and this completes the member registration processing.

B-2. Distribution Reservation

When the above described member registration processing is completed, the user of the user PC 106 can become the distributor who carries out a live distribution using the personal casting service and makes a reservation for a distribution to the live casting server 150 to actually carry out the live distribution. In this personal casting service, a reservation is established by the user making a reservation for registration to the live casting server 150 and reconfirming the reservation to the live casting server 150 by a predetermined time before the reserved live distribution time (e.g., 6 hours before). Obliging the user who made the reservation to reconfirm the reservation promotes the fulfillment and establishment of reservations and reduces fictitious reservations. Furthermore, this personal casting service sets a maximum number of frames (e.g., 1 frame corresponds to 10 minutes) that a registered user can reserve a month and this prevents a few users from monopolizing this service.

B-2-1. Reservation Registration

Figure 21:
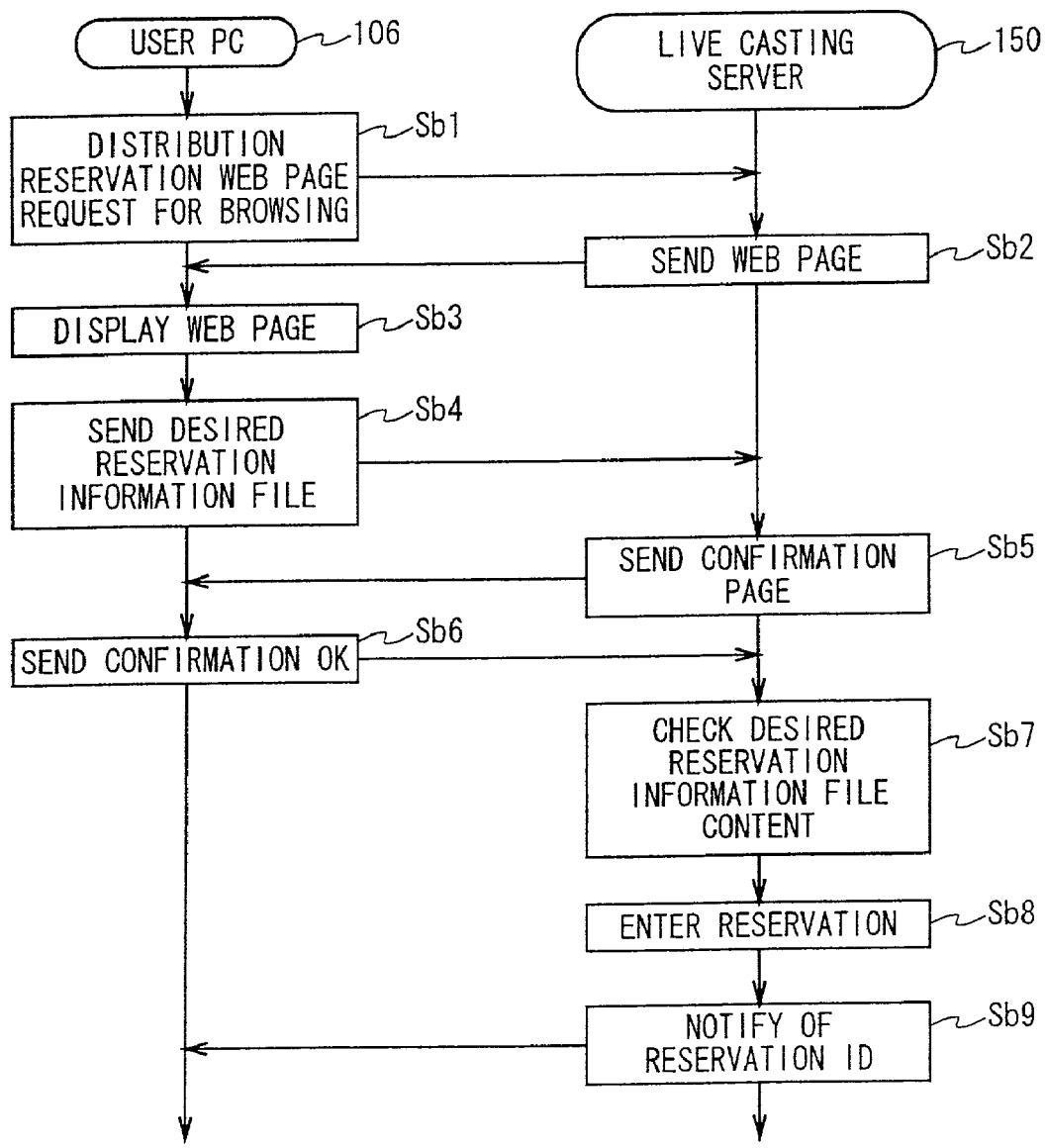
FIG. 21 is a sequence flow chart showing the processing operation of the user PC and the live casting server above during distribution reservation.

Hereinafter, the processing operation of the user PC 106 and the live casting server 150 when reservation registration is performed with such a distribution reservation will be explained with reference to FIG. 21 that shows a sequence flow chart of the processing operation and display screens, etc. of the user PC 106.

As shown in the same figure, when a distribution reservation is made, the user turns on the power to the user PC 106 and starts the application program above. Then, the user selects the live reservation mode and opens the screen shown in FIG. 8(a) on the display section 124. In this live reservation mode, the user operates the operation dial 126b, etc. to select/determine "Reservation jump", which is a selection item of the GUI. This allows the CPU 120 of the user PC 106 to perform processing of connection to the Internet 103 and requests for browsing of the Web page to make a reservation for a distribution (Web page when "Live distribution reservation" in FIG. 13 is clicked) to the live casting server 150 (step Sb1). In this way, the user PC 106 can request for browsing of the Web page to make a reservation for a distribution by selecting/determining "Reservation jump" using the function provided by the application program above, but the user PC 106 can also request for browsing of the Web page by entering a URL. More specifically, the user PC 106 can request for browsing of the Web page by entering a URL and requesting for browsing of the homepage shown in FIG. 13, logging in by entering the user ID and password and clicking on the link button of "Live distribution reservation".

Once the user PC 106 requests for browsing the Web page for distribution reservation to the live casting server 150, the Web page is sent from the live casting server 150 to the user PC 106 over the Internet 103 (step Sb2). The user PC 106 that has received the Web page sent shows the Web page on the browser display screen 44 (step Sb3).

Here, FIG. 22 shows a distribution reservation Web page displayed on the browser display screen 44. As shown in the same figure, this display screen shows a monthly calendar field 220, a reservation situation display field 221 that indicates the reservation situation on the date expressed in outline characters on a colored background on the calendar, a reservation input field 222 that shows items to be entered for the user to make a reservation and the input field, a reservation button 223 to instruct an application for a reservation and a cancel button 224 to cancel the input content of the reservation input field 222.

On this display screen, the user clicks on a desired date of reservation in the monthly calendar field 220. This allows the CPU 120 of the user PC 106 to instruct to display the clicked date in outline characters on a colored background on the calendar and request the live casting server 150 over the Internet 103 for the data to display the reservation situation on the relevant date. Upon reception of this request, the live casting server 150 creates the data to display the reservation situation on the relevant date at the point in time by referencing the registered content of the reservation database 151 and sends the data to display the reservation situation on the requested date to the user PC 106 over the Internet 103. The CPU 120 of the user PC 106 displays the reservation situation display field 221 based on this data.

As illustrated, the reservation situation display field 221 displays the capacity of distribution, transmission band used, service fee, reservation situation per time ("Free" or "Reserved") for every channel and the user determines the channel and time zone, etc. and enters items of the reservation input field 222 with reference to this reservation situation display field 221. Here, the capacity of distribution, transmission band used and service fee above are set for each channel beforehand and the user of the user PC 106, who is the content distributor, can select a channel that matches the desired service fee and capacity, etc. by referencing the preset information for each channel displayed in the reservation situation display field 221.

Here, the items to be entered in the reservation input field 222 are "channel" to select a channel to be used, "reservation date/time" to specify the date/time of reservation, "disclosure level", "title" to enter the title name of the content, "genre" to enter the genre to which the content belong, "e-mail disclosure" to select whether or not to disclose the e-mail address of the content provider, "WEB disclosure" to select whether or not to disclose the URL of the Web page of the content provider, "password" to enter a password, "friend list", "outline" to write an outline of the content in up to a predetermined number of characters (e.g., 20 characters) and "detail" to write the detail of the content in up to a predetermined number of characters (e.g., 200 characters).

The input item "disclosure level" in the reservation input field 222 is the item for the user who is the content provider to specify the disclosure level of the content supply distributed based on this reservation, that is, restrictions on the content receivers and it is possible to specify one of three levels "Public", "Password" and "Secret" here.

"Public" specifies that the content is totally disclosed and when "Public" is specified, users who have registered as general members can receive the content through content distribution based on a relevant reservation (however, should be within the capacity).

"Password" restricts users who can receive the content supply based on a relevant reservation and is the disclosure level that only allows the users who have entered a valid password to receive content distribution. When the user selects "Password", the user needs to have already entered a password to be used at this time.

Then, "Secret" is also the disclosure level that allows the users who have entered a valid password to receive content distribution as in the case of "Password". When the user selects "Secret", too, the user needs to have already entered a password to be used. Here, when "Password" or "Secret" is selected, information on the distribution time of the relevant program and the password, etc. is notified to the e-mail addresses specified in "friend list" which will be described later.

Furthermore, "Password" and "Secret" are the same in that both allow the content to be supplied to only specific users, but different in that when "Password" is selected, the program based on this reservation is included in the Web pages of "Today's live" and "Program guide" above, while in the case of "Secret", the program is not shown on the above Web pages and the fact that the content is supplied itself is not disclosed. When "Secret" is selected, the fact that the content is distributed is notified only to those who have e-mail addresses included in the "Friend list" which will be described later.

The user can select any one of the three disclosure levels "Public", "Password" or "Secret" above taking into account the content to be distributed. For example, when the user wants to perform a content distribution to a specific few people, it is desirable to select a channel with, small capacity (low fee) from the economical standpoint, but if this is fully disclosed, when a distribution request is received from a person other than the above specific people, the above specific people cannot receive the content distribution because of the capacity restriction. Therefore, in this case, selecting "Password" or "Secret" makes it possible to perform content distribution to specific people reliably and economically.

The input item "Friend list" in the reservation input field 222 is the field to enter e-mail addresses of people who the user of the user PC 106 wants to be notified that the content will be distributed in a time zone and with a channel based on the relevant reservation. Here, the live casting server 150 sends e-mail including various kinds of information to receive a supply of the content distribution based on the relevant reservation to the entered e-mail addresses, which will be described later.

When the entries of the items of the reservation input field 222 above are completed and the reservation button 223 is clicked, the CPU 120 of the user PC 106 creates a desired reservation information file with the same content as the input content of the reservation input field 222 and sends this desired reservation information file to the live casting server 150 over the Internet 103 (step Sb4). In the example shown in FIG. 22, the user performs input operation by entering characters, etc. in each field of the reservation input field 222 using the keyboard, etc., but for the items with predetermined input contents such as "channel", "reservation date/time" and "genre", the user may be allowed to perform an input operation by selecting/specifying from a list of candidates from a pull-down menu.

The live casting server 150 receives the desired reservation information file created according to the input content of the user of the user PC 106 above over the Internet 103 and sends a Web page to reconfirm whether the content of the received desired reservation information file is acceptable or not (step Sb5). In this way, the display screen of the user PC 106 shows a display prompting to confirm the desired reservation information as shown in FIG. 23. In this case, the live casting server 150 also shows displays prompting to confirm the service fee of the service based on the reservation, the e-mail address of the sender of the reservation setting information to be sent from the live casting server 150 to the user PC 106 later (this e-mail address is the e-mail address entered by the user at the time of member registration), etc. Moreover, as described above, the user who reserved live distribution is obliged to reconfirm the reservation a predetermined time before the distribution time (e.g., 6 hours before) based on the reservation and the live casting server 150 also shows messages to notify the user of this and reconfirmations execution procedure.

Here, if the user agrees to the content displayed on the confirmation screen above, the user clicks on the Agree button 240 and if the user does not agree to the content displayed on the confirmation screen above, the user clicks on the Cancel button 241. Once the Cancel button 241 is clicked, this is sent to the live casting server 150, and the live casting server 150 discards the desired reservation information file and displays a reservation input screen shown in FIG. 22 on the display screen of the user PC 106 and prompts for a reentry. On the other hand, if the Agree button 240 is clicked, the CPU 120 instructs this to be sent to the live casting server 150 over the Internet 103 (step Sb6).

If the Agree button 240 is clicked, the live casting server 150 checks the content of the desired reservation information file and judges whether the reservation should be permitted or not (step Sb7). Here, the live casting server 150 checks whether there is any omission in the input content and confirms whether there is any free space in the desired reservation time zone of the desired channel and further checks whether the user who requested the reservation has made a reservation exceeding the set number of frames or not. More specifically, it has already been mentioned above that this live casting service has a setting of the maximum number of frames (e.g., 1 frame corresponds to 10 minutes) that each registered user can reserve a month. Therefore, in checking as to whether the reservation should be permitted or not, it is judged whether the number of frames already reserved by the user for one month exceeds the set number of frames above or not, and if it exceeds the set number of frames, the reservation is not permitted. On the other hand, if the number of frames already reserved by the user for one month is smaller than the set number of frames, it is judged that the check result has no problem and if other check results have no problem, the reservation is permitted. In this way, in order to check the number of frames reserved-by the user for one month, the user database 152 stores the reservation situation from at least one month ago until the present day for every user registered as a premium member.

When a reservation is permitted, the live casting server 150 creates a reservation ID only used for authentication when the reservation is executed based on the reservation and writes and registers the reservation time zone, channel used, band used (bps (bit per second)), reservation content information including mail addresses of the friend list, etc., user ID to identify the user who reserved and the created reservation ID in the reservation database 151 (see FIG. 18) based on the content of the desired reservation information file (step Sb8). By the way, at the time of this reservation registration, the billing flag information indicating whether billing is possible or not indicates that billing is "not possible" and when a reconfirmation is made and the reservation is established later, this billing flag is rewritten as "possible". Moreover, the live casting server 150 adds and writes the information on the reservation to the Web page of "my channel" corresponding to the user who made the reservation. Furthermore if the disclosure level in the reservation is "Public" or "Password", the live casting server 150 updates the Web page to include the program based on this reservation on the Web pages of "Today's live" and "Program guide" above. That is, the information that the content distribution based on the reservation will be performed is stored in a browsable manner. In this case, it is possible to browse the Web page from the client terminal apparatus 107, etc. over the Internet 103 and know that the live distribution will be performed based on the reservation. That is, not only when "Public" is set but also when "Password" is set, it is possible to browse the Web page containing the information that the live distribution based on the reservation will be performed and any third party can know that the live distribution exists. On the other hand, when "Secret" is set, the live casting server 150 does not include any information on the live distribution carried out based on this reservation on the Web pages of "Today's live" and "Program guide" above. Therefore, for the live distribution for which "Secret" is set, only specific people such as people who have received e-mail transmitted which will be described later and who have browsed are allowed to know that the live distribution has been performed.

Once such reservation registration processing is completed, a Web page urging the user to agree by displaying copyright control and prohibitions, etc. when the relevant service is used is sent to the user PC 106 and displayed on the display screen of the user PC 106. Then, upon reception of an instruction of agreement from the user PC 106, the live casting server 150 sends a Web page informing the completion of the reservation procedure except reconfirmation to the user PC 106. Here, FIG. 24 shows a reservation procedure completion screen displayed on the display screen of the user PC 106. As shown in the same figure, this reservation procedure completion screen displays a message urging the user to reconfirm. Here, if the "OK" button 245 is clicked, the reservation procedure except reconfirmation is completed and hereinafter, the live casting server 150 sends e-mail about the reservation containing the reservation ID created to the user PC 106 (step Sb9).

B-2-2. Reconfirmation

Figure 25:
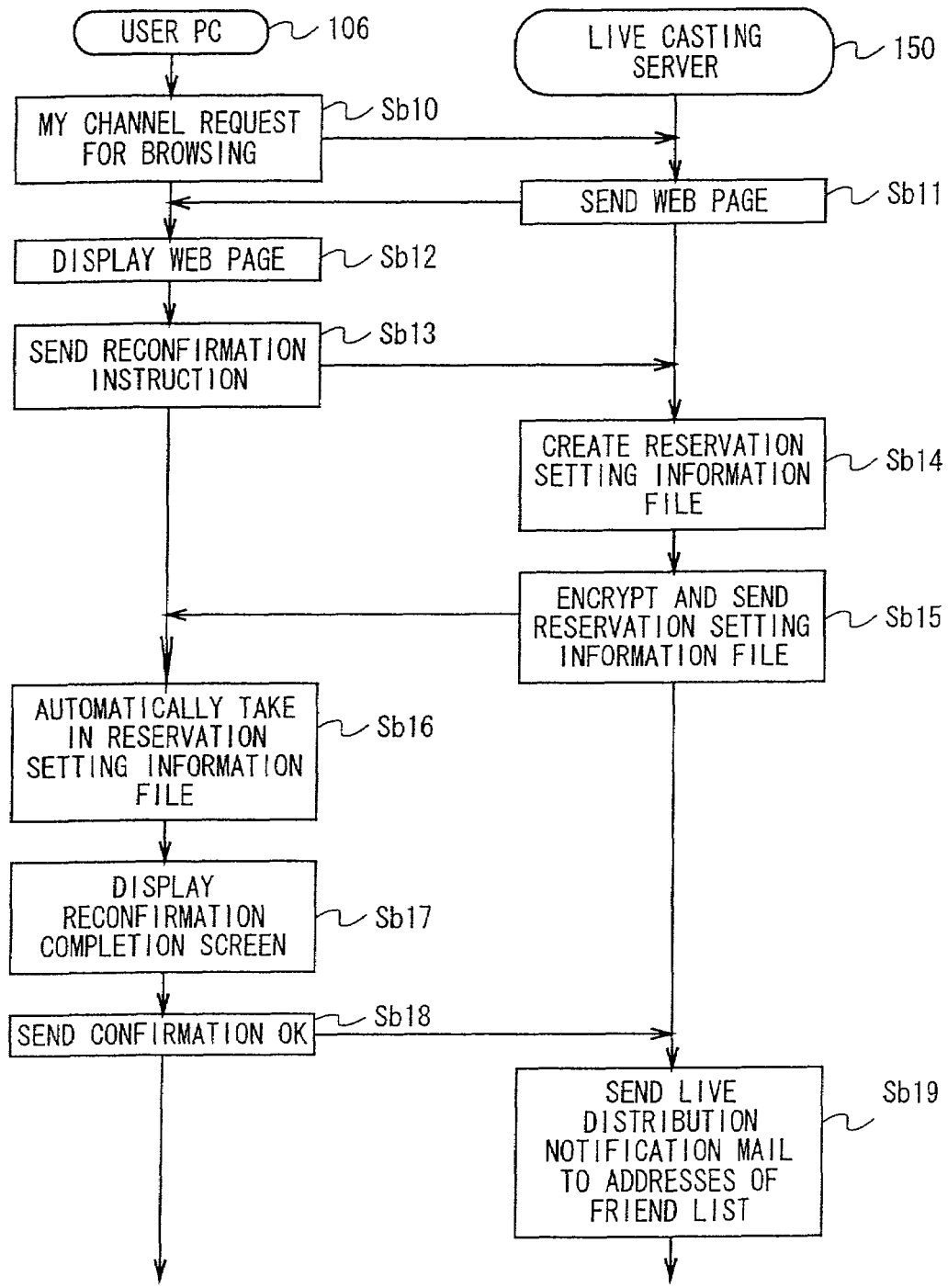
FIG. 25 is a sequence flow chart showing the processing operation of the user PC and the live casting server above during reconfirmation processing in the distribution reservation above.

As described above, this personal casting service requires the user to reconfirm the reservation 6 hours before the reservation is executed and if the user fails to reconfirm, the reservation is forcibly canceled. Therefore, the user who has acquired the reservation ID through e-mail from the live casting server 150 must reconfirm the reservation using the user PC 106 to establish the reservation. The reservation procedure until the reservation ID above is received can be done using a PC different from the PC used for the live distribution, but it is obligatory to use the PC used for live distribution as the PC for reconfirmation. The following explanation assumes that a reconfirmation will be made using the user PC 106. The processing operations of the user PC 106 and live casting server 150 when a reconfirmation is made will be explained with reference to FIG. 25.

When making a reconfirmation, the user turns ON the power to the user PC 106 and starts the application program above (when power is OFF). Then, the user selects a live reservation mode and shows the screen in FIG. 8(*a*) on the display section 124. In this live reservation mode, the user operates the operation dial 126*b*, etc. to select/determine the reservation to be reconfirmed from the reservation list (there can be only one) displayed in the reservation list area 46. Then, the CPU 120 of the user PC 106 performs processing for connection to the Internet 103 and sends a request for browsing the Web page "My channel" corresponding to the user to the live casting server 150 (step Sb10). In this way, the user PC 106 can send a request for browsing the Web page to make a reservation for distribution using the function provided by the application program above. The request for browsing the Web page can also be sent by entering a URL as appropriate. More specifically, the request for browsing the Web page can be sent by entering a URL, sending a request for browsing the homepage shown in FIG. 13, entering the user ID and password to log in and clicking on the link button of "My channel".

Thus, when a request for browsing the "My channel" Web page is sent from the user PC 106 to the live casting server 150, the live casting server 150 sends the Web page to the user PC 106 over the Internet 103 (step Sb11). Upon reception of the Web page sent, the user PC 106 shows the Web page on the browser display screen 44 (step Sb12).

Here, FIG. 26 shows the "My channel" Web page displayed on the browser display screen 44. As shown in the same figure, this display screen shows a reservation list 250, which is a list of reservations currently made by the user to the live casting server 150, a link button 251 to jump to the Web page to check the number of audience of the program distributed by the user in the past, etc. and a link button 252 to jump to the Web page to modify the registration information file (see FIG. 20) of the user registered in the user database 152. This display screen also includes descriptions of the method of canceling or modifying a reservation and this personal casting service requires the user to cancel the reservation if the user changes the reservation content such as the channel or date/time and take necessary steps to make a distribution reservation again, and this is described here. On the other hand, the information other than that of the channel and date/time, such as a title name and outline can be modified without canceling the reservation.

The reservation list 250 shows for each reservation "reservation date/time", "channel", "title", a status item indicating the status whether this reservation is "waiting for a reconfirmation" or "reconfirmed" and "cancel" button to be clicked when cancellation of-the reservation is instructed (one reservation in the figure).

Here, if no reconfirmation of the reservation has been made yet, "waiting for reconfirmation" is displayed in the status item as shown in the figure and if this page is opened after a reconfirmation of the reservation has been made, "reconfirmed" is displayed. In the case of "waiting for reconfirmation", if this is clicked, the CPU 120 sends a request for browsing the reconfirmation screen to the live casting server 150 over the Internet 103. In response to this request, the live casting server 150 sends the reconfirmation Web page to the user PC 106 over the Internet 103 and the screen shown in FIG. 27 appears on the user PC 106.

As shown in the same figure, the reconfirmation screen displays contents of items about the relevant reservation such as "user ID", "channel", "reservation date/time", "disclosure level", "title", "genre", "e-mail disclosure", "Web disclosure", "password", "friend list", "outline" and "detail". This displayscreen further shows the field for entering a reservation ID and a message urging the user to enter a reservation ID and make a reconfirmation.

To reconfirm the reservation, the user enters the reservation ID included in the e-mail sent from the live casting server 150 in the reservation procedure described above and clicks on the reconfirmation button 261. On the other hand, to go back to the "my channel" screen containing the reservation list 250, etc. (see FIG. 26), the user clicks on the Return button 262.

Here, when the reconfirmation button 261 is clicked from the reconfirmation display screen in FIG. 27, setting information to establish communication/connection with the streaming server 102 in the live distribution is automatically set in the PC and a message is displayed prompting to make a reconfirmation on the corresponding PC, that is, the PC carrying out live distribution.

When the reconfirmation button 261 above is clicked, the CPU 120 of the user PC 106 sends the information that the user has instructed the execution of a reconfirmation to the live casting server 150 over the Internet 103 (step Sb13).

As described above, the live casting server 150 that has received the reconfirmation execution instruction sent from the user PC 106 references the reservation database 151 and user database 152 and creates a reservation setting information file shown in FIG. 28 on this reservation (step Sb14). Here, of the information about each reservation registered in the reservation database 151, the live casting server 150 erases the data about the reservation from the reservation database 151 at a point in time 6 hours before the distribution start time based on the reservation and cancels the reservation. That is, the reservation-related data is erased from the reservation database 151 after the point in time 6 hours before the distribution start time. Therefore, if the live casting server 150 receives the reconfirmation execution instruction above later than 6 hours before the distribution start time, the data about the reservation is no longer registered even if the reservation database 151 is referenced. In this case, the live casting server 150 sends a Web page posting a message "Reservation has been canceled because reconfirmation is not executed. To make a reservation, please redo the distribution reservation procedure", etc. to the user PC 106.

On the other hand, if the live casting server 150 receives the reconfirmation execution instruction above earlier than 6 hours before the distribution start time, the live casting server 150 creates reservation setting information. As shown in FIG. 28, the reservation setting information file created by the live casting server 150 includes "reservation ID", "live distribution reservation date/time", "server accessible time", "connection telephone number", "target server information", "distribution requester address information", "transmission band", "title", "outline", "disclosure level", "friend list address information" and "distribution request password".

"Reservation ID" describes the reservation ID created about the reservation, "live distribution reservation date/time" describes the reserved distribution start time and end time. "Server accessible time" describes the time zone during which access to the streaming server 102 is permitted to carry out a live distribution. This example describes information according to which access to the streaming server 102 is permitted from 3 minutes before the distribution start time to 3 minutes after the distribution end time.

"Connection telephone number" describes the telephone numbers of access ports of the dedicated server connection network 108 to connect to the streaming server 102 and this example describes the telephone numbers of access ports of a plurality (4 in this figure) carriers. In the procedure for actual connection to the streaming server 102, which will be described later, the user selects any one of carriers to carry out processing of making a call to the telephone number of the access port for the selected carrier.

"Target server information" describes items determined according to the channel selected in this reservation such as "type of server" connected when the channel is used, "server name", "connection port", "stream path for server", etc. When a communication/connection between the user PC 106 and the access port of the dedicated server connection network 108 is established, the connection processing to use the channel reserved by the streaming server 102 is carried out based on the description of this "target server information".

"Distribution requester address information" describes URL information used by the client PC 107 to connect to the streaming server 102 when the client PC 107 requests a stream distribution of the content to be sent by the user PC 106 to the streaming server 102. When a distribution of the content is requested, it is possible to allow the client PC 107 to connect to the streaming server 102 using the relevant URL over the Internet 103.

"Transmission band" describes information determined according to the reserved channel and describes information on the transmission band preset in the reserved channel such as 64 kbps and 28.8 kbps. "Title", "outline" and "disclosure level" each describe the contents registered at the time of reservation (see FIG. 22 and FIG. 23). "Friend list address information" describes e-mail addresses registered at the time of reservation.

"Distribution request password" also describes the password information registered at the time of reservation. If "disclosure level" is "Public", the distribution requesting side can request a distribution without entering a password and in this case, the information of "distribution request password" is not included in the reservation setting information file.

Thus, the reservation setting information file created by the live casting server 150 includes information such as the reservation ID used for authentication at the time of connection of the streaming server 102, which will be described later, the telephone number and connection port of the server, etc. to establish a communication/connection with the streaming server 102. The reservation setting information file is sent from the live casting server 150 to the user PC 106 over the Internet 103. In this case, the reservation setting information file contains command information for automatically writing and incorporating the reservation setting information file into a predetermined area created on the hard disk 123 of the user PC 106 and command information for instructing the display of a message notifying that the automatic incorporation has ended normally or failed. As the technology for automatically incorporating a file sent from the live casting server 150, the distributor, to the user PC 106, the receiver, the technology of "ActiveX" (registered trademark of Microsoft Corporation) can be used. When using this technology, the user PC 106 needs to use "Internet Explorer" (Microsoft Corporation) which can use "ActiveX" as the browser software.

The live casting server 150 that has created the reservation setting information file in text data, etc. including the various kinds of data and commands above encrypts this file using an encryption system such as DES (Data Encryption Standard), etc. and sends this encryption file together with the Web page that displays the reconfirmation completion screen to the user PC 106 over the Internet 103 (step Sb15).

As described above, when the live casting server 150 sends the encrypted reservation setting information file and Web page, the CPU 120 of the user PC 106 receives this and decrypts the reservation setting information file using the technology of "ActiveX", automatically incorporates it in a predetermined area of the hard disk 123 according to the command included in the file (step Sb16) and shows the reconfirmation completion screen on the browser display screen 44 (step Sb17). Therefore, the user PC 106 stores a program to decrypt the above encryption and executes this program when encrypting the reservation setting information file above. Furthermore, when the CPU 120 writes the reservation setting information file in a predetermined area, the user PC 106 has a program to encrypt and write the file according to a predetermined encryption system (DES, etc.) and by executing this program, the reservation setting information file is encrypted and saved. Therefore, normally, the user is not allowed to display and reference the content of the automatically incorporated reservation setting information file. This prevents the access port numbers of the dedicated server connection network 108 from being unnecessarily disclosed to many people and prevents illegal accesses to the access ports of the dedicated server connection network 108 with an intention of interfering with this service.

Here, FIG. 29 shows the reconfirmation completion screen displayed on the browser display screen 44 above. As shown in the same figure, this screen shows the current time of the service provider and the time of the user PC 106. Here, the time of the service provider is the time information acquired from the NTP server 153 when the live casting server 150 sends the Web page. On the other hand, the time of the user PC 106 shows the current time according to the clock of the user PC 106. Then, the CPU 120 of the user PC 106 calculates the difference between these times (in units of minutes) and if there is any difference, shows a message about the presence of the difference as shown in the figure. In this way, it is possible to notify the user of the user PC 106 of the time difference from the service provider to call attention, or it is also possible to store a time correction program to automatically correct the time of the user PC 106 based on the time information of the service provider sent together with the Web page above in the user PC 106 and when the user PC 106 receives the reconfirmation completion screen Web page as shown above, correct the time of the user PC 106 according to the time of the service provider by the CPU 120 executing the time correction program. This allows the service provider and the user PC 106 to share the same time, making it possible to smoothly carry forward the service of live distribution, which requires the accuracy in time.

Furthermore, the reconfirmation completion screen describes the special item to access the dedicated server connection network 108 using a dialup router. When executing processing of communication/connection with the streaming server 102 to execute a live distribution, the user PC-106 is set to automatically call the access telephone number to the access port of the dedicated server connection network 108 described in the reservation setting information file above (details will be given later). In this way, by the CPU 120 executing the program for automatic calling, the user can automatically carry out communication/connection processing without carrying out troublesome input operation such as entering telephone numbers. However, when the user PC 106 is connected to the network via a dialup router, it is necessary to set the information to be connected to the dedicated server connection network 108 via the dialup router. Thus, since it is not possible to perform processing of automatical calling based on the telephone number described in reservation setting information file, it is necessary for the user to manually set the telephone number, etc. of the access port. The special item above is a description taking into account the necessity of manual setting when this dialup router is used and in this case, the access port number, login ID (reservation ID in this case) and password to be manually set by the user are displayed. In the example illustrated above, connection using the dialup router is only permitted via ISDN (Integrated Services Digital Network), but the present invention is not limited to this.

When the user clicks on the "OK" button 291 by confirming the display of the confirmation screen above, the CPU 120 sends information that the "OK" button 291 has been clicked to the live casting server 150 over the Internet 103 (step Sb18) and the reconfirmation-related processing on the user side completes. On the other hand, the live casting server 150 that has received the information that the "OK" button 291 has been clicked references the reservation database 151 and sends e-mail notifying that there is a live distribution to the e-mail addresses registered in the "friend list" about the relevant reservation (step Sb19). Here, FIG. 30 shows the content displayed on the display screen of the PC when the e-mail above is opened. As shown in the same figure, this e-mail shows information such as "live distribution date/time", "title", "outline", "URL of distribution requester" (see "distribution requester address information" in FIG. 28), "password" to request a distribution when the disclosure level is "Password" or "Secret" (see "Distribution request password" in FIG. 28). If the user of the user PC 106 registers e-mail addresses of friends, etc. to whom the user wants live distribution to be presented at the time of reservation, this allows the user to notify the friends of the information to automatically receive the live distribution. Thus, this eliminates the necessity for the user who performs live distribution to carry out a troublesome operation such as transmitting the information to receive live distribution by telephone or creating e-mail including the relevant information.

In the above explanation, the processing of sending the e-mail above (see FIG. 30) to the e-mail addresses registered in the "friend list" is performed after the reconfirmation is completed, but transmission of the e-mail above can also be performed by the live casting server 150 when the processing of registering the reservation in the reservation database 151 based on the reservation request file from the user (step Sb8 in FIG. 21) is completed. If e-mail is sent at the time of completion of the reservation registration processing, those who have e-mail addresses can know earlier that there is a live distribution. In this case, it is also possible to perform similar e-mail transmission processing again at the time of completion of the reconfirmation.

In addition to sending e-mail as shown above, if the reconfirmation-related processing finishes, the live casting server 150 regards it to mean that the reservation has been established, rewrites the billing flag information of the reservation database 151 about this reservation to "enabled" and performs billing processing about the reservation. Here, the billing sum is calculated based on the service fee preset for every channel as shown above. For example, when a reservation of using 6 frames of a channel for which a service fee of ¥100 per 1 frame (10 minutes) is set is established, ¥600 is billed for the reservation. However, the actual billing processing is executed after confirming that the streaming server 102 is operating normally on the day of live distribution.

The explanation above describes the case where the user PC 106 is used which stores the program for encrypting and automatically storing the reservation setting information file sent from the live casting server 150, but the PC that does not store such a program cannot automatically incorporate the file. In such a case, the following technique is used to incorporate the reservation setting information file into the PC. First, in the case of a PC that does not store the program above and thus cannot automatically incorporate the file, the information that automatic incorporation has failed is displayed on the display screen of the PC. In addition to a message indicating the failure, another message appears on the same screen which instructs the user to return to the "my channel" (see FIG. 26) screen and click on "wait for reconfirmation" to request for browsing the reconfirmation screen again. On the other hand, the live casting server 150 that receives no reconfirmation "OK" from the user PC 106 but receives a request for a reconfirmation screen from the user PC 106 judges that the user PC 106 has failed to automatically read the reservation setting information file and sends a Web page for downloading the reservation setting information file to the user PC 106 over the Internet 103. As a result, the display screen on the PC side shows a button for downloading the reservation setting information file and clicking on this button starts downloading of the reservation setting information file.

This is the flow of the distribution reservation processing operation from the issuing of a reservation request to the establishment of the reservation by the completion of a reconfirmation. In this way, even after a reconfirmation is completed, the information such as genre and outline can be changed and the reservation can still be canceled even after the reconfirmation is completed (in this case, the billing processing is performed because the billing flag information above is "enabled"). The processing operation when such a change or cancellation is made will be explained below with reference to the display content of the browser display screen 44 displayed on the display section 124 of the user PC 106.

First, when a reconfirmed reservation is changed or canceled, an operation to request browsing of the Web page corresponding to "My channel" is performed in the same way as for when the reconfirmation above is made. Thus, the CPU 120 of the user PC 106 carries out processing for connecting to the Internet 103 and requests the live casting server 150 for browsing the Web page in "My channel" corresponding to the relevant user.

When the user PC 106 requests the live casting server 150 for browsing the "My channel" Web page, the live casting server 150 sends the Web page to the user PC 106 over the Internet 103. Upon reception of the Web page sent, the user PC 106 displays the Web page on the browser display screen 44.

Figure 31:
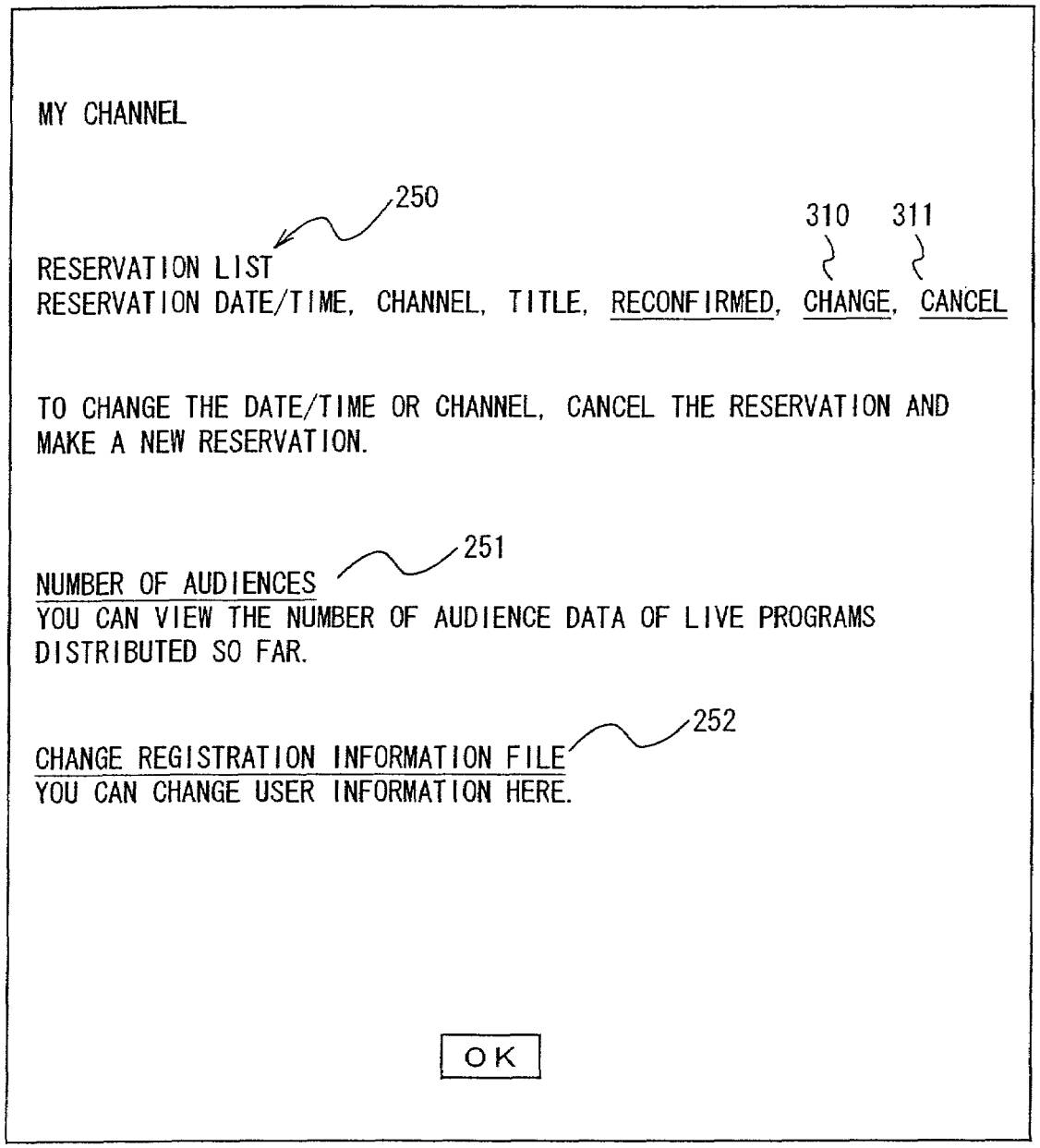
FIG. 31 is a drawing showing a display screen shown on the display section above of the user PC above when a reservation is changed.

Here, FIG. 31 shows the reconfirmed "My channel" Web page displayed on the browser display screen 44. When compared with the display screen (see FIG. 26) of "My channel" waiting for a reconfirmation, the reconfirmed "My channel" display screen differs in that "reconfirmed" is displayed in the status item of the reservation list 250 and a "change" link button 310 is displayed.

To make a change, this "change" link button 310 is clicked. When the "change" link button 310 is clicked, the CPU 120 of the user PC 106 sends information that the "change" link button has been clicked to the live casting server 150 over the Internet 103. In response to this, the live casting server 150 sends a Web page for the change to the user PC 106 over the Internet 103 and as a result, the browser display screen 44 of the user PC 106 displays the screen shown in FIG. 32.

As shown in the same figure, the change screen shows the currently set reservation content and the items "genre", "disclose e-mail", "disclose Web", "password", "outline" and "detail" of these display contents can be changed and when these are displayed, the display colors of the items that can be changed are different from the colors of items that cannot be changed (reservation date/time, etc.).

The user overwrites the currently displayed setting contents with new contents and clicks on the Update button 321. If the contents are not changed, the user clicks on the Return button 322.

Then, when the user clicks on the Update button 321, the CPU 120 of the user PC 106 creates an information file with the changed content and sends this to the live casting server 150 over the Internet 103. Thus, the live casting server 150 updates the registration content of the reservation database 151 based on the information file with the changed content and sends the Web page of the changed screen to the user PC 106 over the Internet 103. As a result, the browser display screen 44 displays the screen shown in FIG. 33.

As shown in the same figure, in addition to a message stating that the change has been accepted, the change completion screen shows the time on the service provider side, the time on the user PC 106 side and time difference between the two and special items when the dialup router is used, in the same way as for the reconfirmation completion screen above (see FIG. 30). Clicking on the "OK" button 331 here completes the change and returns to the "My channel" screen shown in FIG. 31.

When the reservation is changed in this way, the live casting server 150 sends e-mail including the information that the reservation has been changed and the change content, etc. to the e-mail addresses registered in the friend list above. Thus, it is possible to automatically inform those who have the e-mail addresses of the friend list of the reservation change content of live distribution without the need for the user of the user PC 106 to inform by telephone that the reservation content of live distribution has been changed or create e-mail including such a message.

Then, the case where a reservation is canceled will be explained. As in the case of changing a reconfirmation as described above, the operation for requesting browsing of a Web page corresponding to "My channel" is performed. Thus, the browser display screen 44 shows the reconfirmed "My channel" screen shown in FIG. 31.

To cancel a reservation, the user clicks on the "Cancel" link button 311. When the "Cancel" link button 311 is clicked, the CPU 120 of the user PC 106 sends the information that the "Cancel" link button has been clicked to the live casting server 150 over the Internet 103. In response to this, the live casting server 150 sends a Web page for the cancellation to the user PC 106 over the Internet 103 and as a result, the browser display screen 44 of the user PC 106 displays the cancellation screen shown in FIG. 34.

As shown in the same figure, the cancellation screen shows the currently set reservation content and a "reservation cancellation" button 341 and "Return" button 342. Here, the user clicks on the "Reservation cancellation" button 341 to cancel the reservation and clicks on the "Return" button 342 otherwise.

Figure 35:
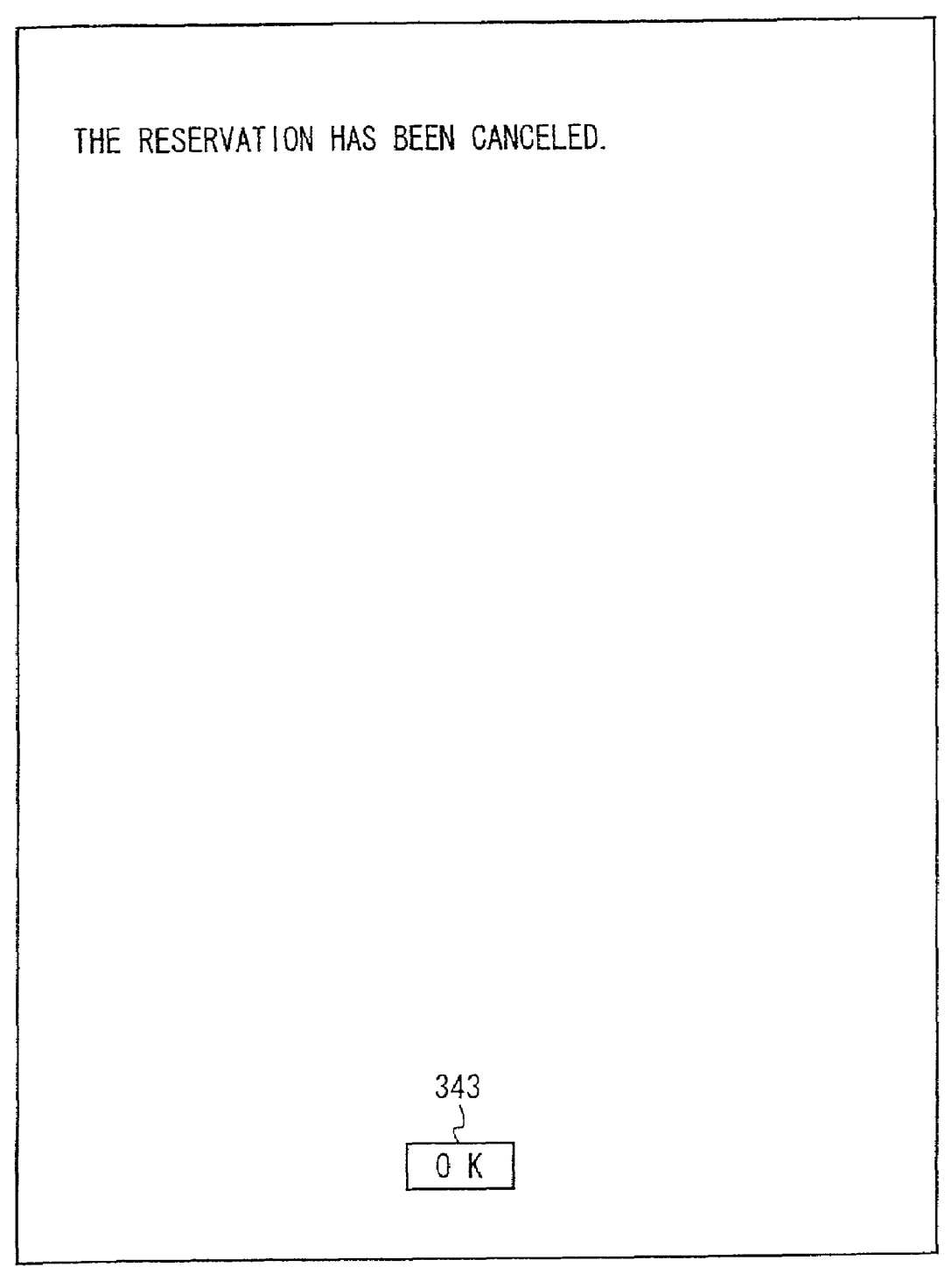

Then, when the user clicks on the "Reservation cancel" button 341, the CPU 120 of the user PC 106 sends the information that the reservation will be canceled to the live casting server 150 over the Internet 103. Thus, the live casting server 150 erases the registration content of the reservation database 151 and sends the Web page of the cancellation completion screen to the user PC 106 over the Internet 103. As a result, the browser display screen 44 of the user PC 106 displays a message shown in FIG. 35 notifying that the reservation has been canceled. When the user clicks on the "OK" button 343 here, cancellation is completed and the "My channel" screen in FIG. 31 is returned to.

When the reservation is canceled in this way, the live casting server 150 sends e-mail including information that the reservation has been canceled and live distribution has been stopped to the e-mail addresses registered in the friend list above. Thus, it is possible to automatically inform people who have the e-mail addresses that live distribution has been stopped without the need for the user of the user PC 106 to inform by telephone that live distribution has been stopped or create e-mail including such a message.

Furthermore, if the user wants to confirm the reservation content after the reconfirmation above has been made, the user clicks on the "Reconfirmed" button shown on the screen in FIG. 31. When the "Reconfirmed" button is clicked, the CPU 120 of the user PC 106 sends the information to the live casting server 150 over the Internet 103. In response to this, the live casting server 150 sends the Web page for confirming the reconfirmed reservation to the user PC 106 over the Internet 103. As a result, the browser display screen 44 of the user PC 106 shows the currently set reservation content, special item when the dialup router is used, a "Reenter PC connection setting" button 361 and a "Return" button 362 instructing a return to the "My channel" screen.

If the "Reenter PC connection setting" button 361 is clicked, the CPU 120 of the user PC 106 sends the information to the live casting server 150 over the Internet 103. In response to this, the live casting server 150 sends the reservation setting information file (see FIG. 29) to the user PC 106 over the Internet 103 again. As a result, the user PC 106 automatically incorporates the reservation setting information file. Retransmission of this reservation setting information file can be performed when a PC different from the PC used to make a reconfirmation is used to perform live distribution, etc.

B-3. Live Distribution

When the distribution reservation including the above reconfirmation is completed and the time for starting the reserved live distribution comes, the user of the user PC 106 connects to the streaming server 102 via the dedicated server connection network 108 and performs a live distribution of the content. Then, the client PC 107 receives the supply of the content by requesting the stream distribution of the content.

B-3-1. Content Transmission from User PC to Streaming Server

Figure 37:
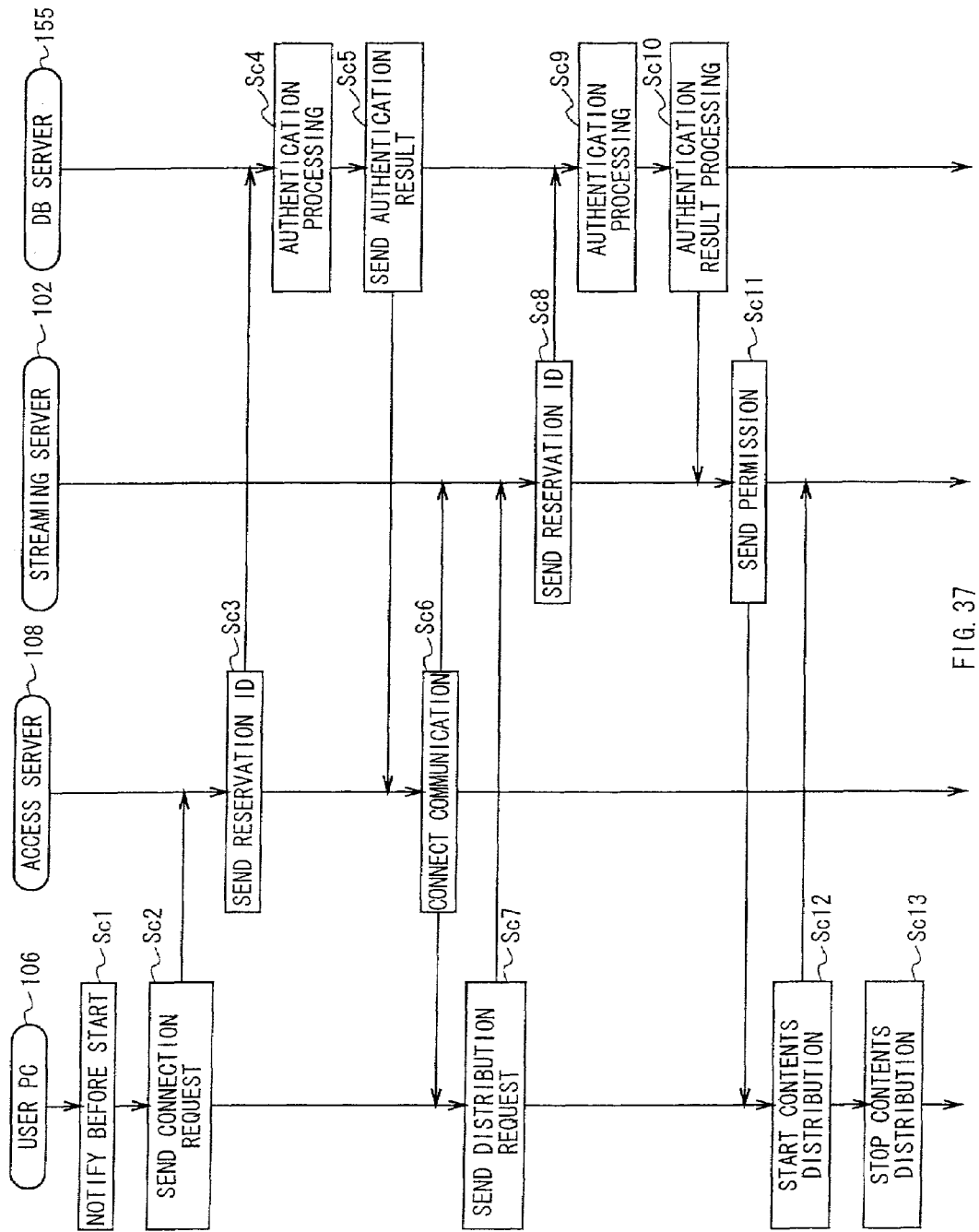
FIG. 37 is a sequence flow chart showing the processing operation of the content supply system above during live distribution.

The processing operations of the user PC 106, the dedicated server connection network 108, the database server 155 (see FIG. 12) and the streaming server 102 when the user PC 106 sends content to the streaming server 102 during live distribution will be explained with reference to FIG. 37 showing a sequence flow chart of the processing operation.

When a live distribution is performed, connection to the streaming server 102 is permitted from 5 minutes before the time of starting the reserved live distribution, and so the processing to establish communication/connection between the user PC 106 and the streaming server 102 will be started from this time on. The user prepares content distribution before the time of starting the live distribution. Here, the preparation for the content distribution includes the determination of the picture taking position of the digital video camera 129 (see FIG. 3), effect setting processing in live distribution mode based on the concept of the content to be distributed (see FIG. 10 and FIG. 11), etc.

The user PC 106 of this embodiment stores a program to display a message "Live distribution will start soon" to the user a predetermined time before the reserved live distribution start time (e.g., 10 minutes before) and as shown in FIG. 37, when the time a predetermined time ahead comes, the CPU 120 of the user PC 106 executes this program to display the message "Live distribution will start soon" on the display section 124 (step Sc1). This prevents the user from forgetting the live distribution start time. Here, if the user PC 106 is not set to live distribution mode in the above application, the CPU 120 automatically executes this application program, automatically selects the live distribution mode in the application and displays the "Live distribution mode" screen on the display section 124 (see FIG. 9(a)).

After this, when the time at which the start of connection to the streaming server 102 is permitted (5 minutes before the start time) comes, the CPU 120 of the user PC 106 executes the connection processing program to automatically start the processing of communication/connection with the streaming server 102. Here, the communication/connection processing started can be fully automated or the user can only enter an instruction for the final connection start and automatically execute the communication/connection processing using this input as a trigger.

Here, the processing by the CPU 120 according to the communication/connection processing program above decrypts the reservation setting information file encrypted and stored in a predetermined registry (see FIG. 29) and carries out the following communication/connection processing based on the information described in the items "reservation ID" of this file, "server accessible time", "connection telephone number" and "connection server information".

When the accessible start time indicated by "server accessible time" comes, the CPU 120 starts communication/connection processing, acquires the access port telephone number of the carrier preset by the user by referencing the "connection telephone number" of the reservation setting information file and carries out processing for calling the relevant telephone number. The CPU 120 then sends the reservation ID to the access server of the dedicated server connection network 108 and requests for communication/ connection (step Sc2). Since the automatic calling processing is carried out in this way, the user need not enter the telephone number, etc. In the case of live distribution in particular as described above, using the user PC 106 in the modes shown in FIG. 3(*b*) or FIG. 3(*c*) by entering information, etc. using the keyboard 126*a* is a very complicated operation, and therefore the processing of automatic calling provides the user with a more comfortable content creation environment.

In order to authenticate whether the user PC 106 that has requested connection to the access port as described above belongs to a user who has a valid reservation or not, the access server of the dedicated server connection network 108 sends the reservation ID sent to the database server 155 of the server reservation control center 101 (step Sc3). Thus, the database server 155 that has received the reservation ID sent from the dedicated server connection network 108 carries out authentication processing by checking whether this reservation ID is registered in the reservation database 151 in the time zone that starts from the current time (step Sc4). Here, if the reservation ID sent is registered in the reservation database 151, the access server judges that the user PC 106 that has sent this reservation ID has a valid reservation and if the reservation ID sent is not registered in the reservation database 151, the access server judges that the user PC 106 that has sent this reservation ID does not have a valid reservation in that time zone.

In the authentication processing here, only the reservation ID described above is used. This has the following effect. For example, when the reservation is authenticated using the user ID and password of a member of this service, even if it is confirmed that the user ID and password are valid and it is the member who has accessed, it is not possible to distinguish whether the member has a reservation in that time zone or not. Therefore, in the authentication processing, it is necessary to authenticate whether the user is a member or not, then check the registration content of the reservation and check whether the member identified with the user ID has a reservation in the time zone or not, which makes the authentication processing very complicated. In contrast, if the reservation ID used only for authentication for the reservation described above is used, this reservation ID is the information that only the user can know, and therefore there is no need to authenticate the user ID and it is possible to distinguish whether the user has a valid reservation or not through simple authentication processing of checking whether the reservation ID is registered as the reservation for the time zone corresponding to the accessed time.

The database server 155 that has performed authentication processing using the reservation ID as described above sends this authentication result to the access server of the dedicated server connection network 108 (step Sc5).

When the authentication result from the database server 155 above belongs to a user with a valid reservation, the access server of the dedicated server connection network 108 permits the connection between the user PC 106 and the streaming server 102, which establishes a PPP connection and communication/connection between the two (step Sc6). On the other hand, in the case where the authentication result above does not belong to a user with a valid reservation, the access server of the dedicated server connection network 108 does not permit the connection between the user PC 106 and the streaming server 102 and immediately cuts the call from the user PC 106. Thus, by immediately cutting the call when it is judged that the call is from an illegal user, the line is secured for users with a valid reservation.

When connected to the streaming server 102 via the dedicated server connection network 108 as described above, the CPU 120 of the user PC 106 sends a reservation ID to the streaming server 102 to request for a live distribution (step Sc7).

The streaming server 102 that has received the live distribution request from the user PC 106 sends the reservation ID sent to the database server 155 of the server reservation control center 101 to authenticate whether the user PC 106 that has requested for the live distribution belongs to a user with a valid reservation or not (step Sc8). Thus, the database server 155 that has received the reservation ID sent from the streaming server 102 carries out authentication processing by checking whether this reservation ID is registered in the reservation database 151 in the time zone that starts from the current time or not (step Sc9). The authentication processing here is similar to that when a reservation ID is sent from the access server of the dedicated server connection network 108 above.

The database server 155 that has carried out authentication processing using the reservation ID as shown above sends this authentication result to the streaming server 102 (step Sc10).

In the case where the authentication result from the database server 155 above belongs to a user with a valid reservation, the streaming server 102 permits a live distribution by the user PC 106 and sends an order of permission to the user PC 106 (step Sc11), acquires information about the reservation from the reservation database 151 (reservation time zone, channel, etc.) and controls live distribution based on this information. Doing so, the CPU 120 of the user PC 106 displays a message, etc. to notify the user that the live distribution has been permitted and urges the user to start distribution of the content. Upon reception of this notification, the user states picture taking of the digital video camera 129 by operating the operation dial 126*b* and operation buttons 126*c* as appropriate, creates moving image data obtained by applying real-time effect processing to the video captured, instructs the start of live distribution and sends the created moving image data to the streaming server 102 in real time via the dedicated server connection network 108 (step Sc12).

Thus, the streaming server 102 that has received the moving image data, which is the content sent from the user PC 106 performs stream-distribution of this to the client PC 107 that has requested. In this case, if the "disclosure level" of the live distribution (see FIG. 22, etc.) is "Public", the streaming server 102 performs stream-distribution unconditionally according to the distribution request if it is within the capacity of the channel through which the live distribution is carried out. On the other hand, if the "disclosure level" is "Password" or "Secret", the streaming server 102 urges the client PC 107 that has requested the distribution to enter a password and performs stream-distribution only for the client PC 107 that has entered a valid password. The distribution request between the streaming server 102 and the client PC 107 and the stream distribution processing operation will be described later.

Once the live distribution is started in this way, the streaming server 102 sends the time information on the service provider side acquired from the NTP server 153 and information on the number of the client PCs 107 that receive the live distribution, that is, the client PCs 107 that have requested distribution of the content, to the user PC 106. Then, the status window SW (see FIG. 9(*a*)) displayed on the display section 124 of the user PC 106 shows information that the content is on the air, information on elapsed time of distribution, time information on the service provider side, time information on the user PC 106 side, information on the number of audience, reservation start/end time, residual time information indicating the residual time of distribution, image size information and information on the distribution data transmission rate, etc. With reference to the display of this status window SW, the user can know various kinds of information on the live distribution currently in progress. Especially, it is a matter of concern for the transmitter of content how many people are viewing or listening to the content and this also serves as a reference in selecting a channel (selecting the capacity) when live distribution is performed the next time. Thus, the display of the number of audience described above can be significant to the user.

In this way, when content is sent from the user PC 106 to the streaming server 102 and the user of the user PC 106 finishes live distribution before the reservation end time (time on the service provider side), the user operates the operation dial 126b (see FIG. 3) etc. to select/determine "distribution start/end" of the GUI (see FIG. 9(*b*)) in the live distribution mode. Thus, the CPU 120 of the user PC 106 finishes the transmission of content and cuts the connection with the streaming server 102 (step Sc13).

On the other hand, if the user personally finishes the content transmission before the reservation end time, the above processing is performed, but if the content transmission from the user PC 106 to the streaming server 102 is in progress when the reservation end time is reached, the streaming server 102 finishes stream distribution processing of the content sent from the user PC 106 for the client PC 107 when the reservation end time is reached. The streaming server 102 further forcibly cuts the communication/connection with the user PC 106 when the time to finish the connection with the user PC 106 indicated by "server accessible time" (see FIG. 29) above.

B-3-2. Stream Distribution of Content from Streaming Server to Client PC

What has been explained above is the detail of the content transmission processing from the user PC 106, which is the transmitter terminal during live distribution to the streaming server 102 and the streaming server 102 receives content transmission from the user PC 106 and performs a stream distribution of the content to the client PC 107 that has sent a request. This processing operation of content stream distribution will be explained with reference to the display screen, etc. of the client PC 107 that sends a distribution request. In the following explanation, suppose the "disclosure level" of the content distribution (see FIG. 22) is "Password" or "Secret" and this user of the client PC 107 knows the password to receive content supply.

When the client user of the client PC 107 sends a content distribution request, the client user turns on power to the client PC 107 and starts the browser software. Then, the client user enters a URL to identify the top page of the Web page of the live casting server 150 on the client PC 107 and the CPU of the client PC 107 sends a request for browsing of the Web page to the live casting server 150 over the Internet 103. Thus, the live casting server 150 sends the top page of the Web page over the Internet 103 and as a result, the display screen of the client PC 107 displays the screen shown in FIG. 13.

To receive a content distribution, the client user clicks on link buttons such as "Today's live" (see FIG. 15) or "program guide" (see FIG. 17). If the client user clicks on "program guide", the client user further clicks on the current date on the calendar shown on the screen in FIG. 17. Thus, the program distributed on the day is displayed as shown in FIG. 15. Then, the client user clicks on the "title" link button of the program whose distribution is requested from the program displayed.

When the "title" link button is clicked in this way, the CPU of the client PC 107 sends a request for browsing the Web page that displays detailed information of the "title" to the live casting server 150 over the Internet 103. Then, the live casting server 150 sends the Web page that displays detailed information of the specified live program to the client PC 107 over the Internet 103. As a result, the display screen of the client PC 107 displays the screen shown in FIG. 16.

If the client user requests the distribution of the program with the detailed information, the client user enters a password to obtain a distribution permission on the display screen shown in FIG. 16 and clicks on the "Replay" button 175. In the case where the client PC 107 does not have real-time replay software, the client user clicks on the "Replay software" button 176 before clicking on the "Replay" button 175 to download the replay software beforehand.

Then, when the password is entered and the "Replay" button 175 is clicked, the CPU of the client PC 107 sends the password entered and distribution request to the streaming server 102 over the Internet 103. The streaming server 102 sends the password sent to the database server 155 and the database server 155 executes authentication processing whether the password sent is valid or not with reference to the reservation database 151 and sends the authentication result to the streaming server 102.

When the authentication result above shows that the password sent is a valid password, the streaming server 102 judges whether or not to perform a distribution to the client PC 107 based on the capacity preset in the channel used for the content distribution. More specifically, the streaming server 102 compares the number of the client PCs 107 carrying out distribution of the content with the capacity above and if content distribution is already being carried out to the same number of client PCs 107 as the capacity, the streaming server 102 will perform no further distribution. That is, when content distribution is being carried out to the capacity of client PCs 107 at the time of a distribution request, the streaming server 102 will not respond to the distribution request.

Figure 38:
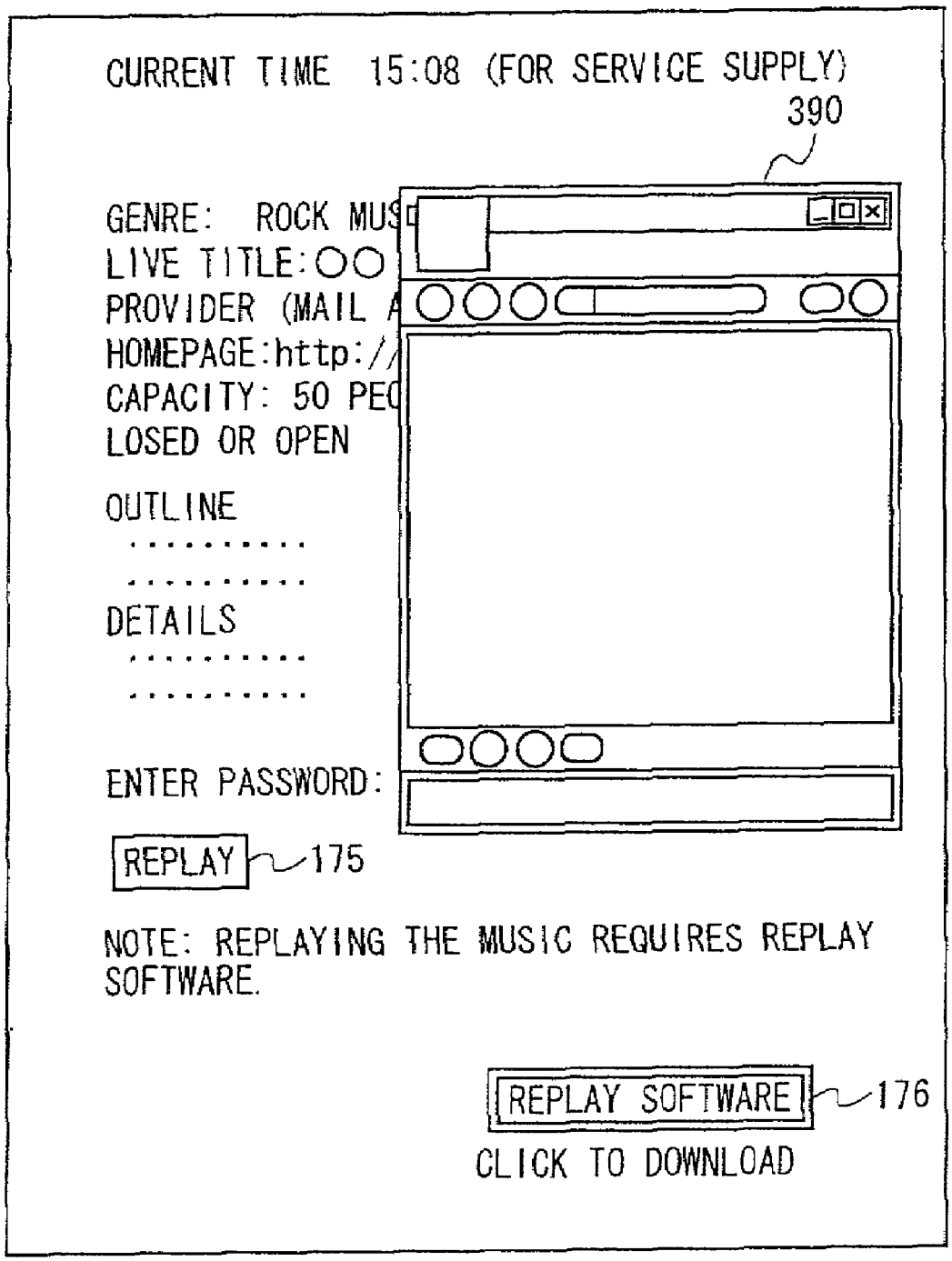
FIG. 38 is a drawing showing a display screen of a client PC that receives a content supply during the live distribution above.

On the other hand, if the number of client PCs 107 that receive the content is smaller than the capacity at the time of the distribution request, the streaming server 102 permits the distribution to the requesting client PCs 107 and the streaming server 102 performs stream distribution of the content to the client PCs 107. In this way, once stream distribution is started, the display screen of the client PC 107 displays the replay display screen 390 of the replay software on the program detailed information display screen as shown in FIG. 38 and the stream-distributed content is reproduced in real time on the replay display screen 390. In this way, the users of the client PCs 107 can reproduce and view and listen to the live-distributed content in real time.

Furthermore, the streaming server 102 counts the number of the client PCs 107 that sent a request for distribution of the program and are actually receiving the distribution one by one and sends this count result, that is, information of the number of audience to the content transmission terminal (the user PC 106 in the above explanation).

In the explanation above, the client PCs 107 send a distribution request to the streaming server 102 via the Web page of the live casting server 150, but when a user who has an e-mail address set in the "Friend list" (see FIG. 22) sends a distribution request using the client PC 107, it is also possible to configure the system so that the user enters a URL displayed in "Distribution requester address information" of the e-mail sent from the live casting server 150 as described above (see FIG. 30) or clicks on a URL displayed. Carrying out such an operation, the CPU of the client PC 107 starts processing of connection to the destination specified by the URL, that is, the streaming server 102 and can thereby request the streaming server 102 for distribution.

C. Modification

By the way, the present invention is not limited to the embodiment described above, but can be modified in various manners as shown in the following examples.

(Modification 1)

In the embodiment above, the streaming server 102 stream-distributes to a requesting client PC 107 the content sent from the user PC 106. The streaming server 102 can also be configured so as to carry out a rebroadcast service consisting of carrying out the stream distribution processing, storing the content sent from the user PC 106 in a medium such as a hard disk and distributing this as an on-demand program. In this case, it is possible to post the rebroadcast program on the "Today's program" Web page above (see FIG. 15) and distribute the content to the requesting client PC 107.

Furthermore, the embodiment above performs content distribution by sending moving image data taken by the digital video camera 129 of the user PC 106 in real time as content to the streaming server 102, but it is also possible to configure the system so that the user performs content distribution by storing content created beforehand using the user PC 106, etc. in the hard disk 123 and sending the content to the streaming server 102 at a reserved distribution time. In order to send content in real time using the user PC 106 as described in the embodiment above, when sending content such as the moving image data, etc. captured to the streaming server 102, it is also possible to store the content data in the hard disk 123 of the user PC 106. Then, content distribution may be performed by making a reservation for live distribution again and distributing the stored content as a rebroadcast program from the user PC 106 to the streaming server 102.

(Modification 2)

In the embodiment above, the streaming server 102 performs processing of stream distribution of the content sent from the user PC 106 to a requesting client PC 107. However, it is also possible to configure the system so as to perform a service consisting of not only performing the stream distribution processing but also storing the content sent from the user PC 106 in a medium such as a hard disk, writing the content to various publicly known package medium such as CD-ROM (Compact Disc-Read Only Memory) and DVD-ROM (Digital Versatile Disc-Read Only Memory) and distributing the content to the requesting user. Such a service allows the client user of the client PC 107 to view and listen to the live-distributed content and request favorite content written in a package medium to be distributed. Here, as described above, since the dedicated server connection network 108 is used as the communication path between the user PC 106, which is the terminal for transmitting the content, and the streaming server 102, it is possible to secure a sufficient transmission band. On the other hand, the communication path between the streaming server 102 and the client PC 107 is the one using the Internet 103, and therefore it is not always possible to secure a sufficient transmission band, and the communication path is likely to be subject to restrictions on the transmission band. Due to such restrictions on the transmission band, it is necessary to reduce the transmission rate of stream data distributed to the client PC 107 and in this case, the quality of reproduced image of the content may deteriorate at the client PC 107. The above-described service can respond to the request for viewing and listening to favorite content with high-quality video reproduced. That is, using the service above, it is possible to write content sent from the user PC 106 to the streaming server 102 directly into a package medium and reproduce the written content data using the client PC 107, allowing the client user to view and listen to the content with the same quality as that of the content sent from the user PC 106 to the streaming server 102. It is also possible to configure the system so that the client who receives a supply of content recorded in such a package medium views and listens to the content reproduced or displayed on a TV screen using a player (can be other than a PC) provided with a function of reproducing/displaying the content stored in the package medium.

(Modification 3)

The embodiment above permits the user to perform live distribution only in a time zone reserved beforehand. However, it is also possible to configure the system so that while live distribution based on the reservation is in progress, the streaming server 102 references the reservation database 151, checks the reservation situation after the reservation time of the channel currently in use is completed and if there is any free space, sends a message such as "Reservation can be extended to oo" to the user PC 106 a predetermined time before the reservation end time (e.g., 10 minutes before). The status window SW (see FIG. $9(a)$) of the user PC 106 that has received this message, etc. can display this message. In this case, an extension button is displayed on the status window SW, and when this extension button is clicked, the CPU 120 of the user PC 106 sends the information that an extension will be made to the streaming server 102. The streaming server 102 that has received this permits the extension. Carrying out such an extension service provides effects such as making it possible to respond to an extension request of the user of the user PC 106 who is the distributor and also allowing the service provider to make effective use of the channel of the streaming server 102.

(Modification 4)

Furthermore, the embodiment above describes the case where the program to execute distribution reservation processing is pre-installed in the hard disk of the live casting server 150 or the program to execute various kinds of processing for making a reservation for distribution or various kinds of processing for live distribution is pre-installed in the hard disk 123 of the user PC 106. However, the present invention is not limited to this and it is also possible to install the various kinds of programs above by reproducing a program storage medium consisting of a package medium such as CD-ROM (Compact Disc-Read Only Memory) and DVD-ROM (Digital Versatile Disc-Read Only Memory) or install the various kinds of programs above by reproducing a program storage medium such as semiconductor memory or magneto-optical disk in which such a program is stored temporarily or permanently.

As the means for storing the various kinds of programs above in these program storage media, it is also possible to use wired or wireless communication media such as a local area network, digital satellite broadcasting or store those programs via various communication interfaces such as a router and modem.

(Modification 5)

Furthermore, the embodiment above describes the case where the Internet 103 is used as the network to make a reservation for distribution between the user PC 106 and the live casting server 150, but the present invention is not limited to this and it is also possible to use other types of wired or wireless network.

Furthermore, the embodiment above is provided with the dedicated server connection network 108 to connect the user PC 106 and the streaming server 102, but the present invention is not limited to this and it is also possible to connect the two using the Internet 103.

(Modification 6)

Furthermore, the embodiment above uses the user PC 106 with a built-in digital video camera 129 as the transmitter terminal for live distribution, but it is also possible to use a normal PC with a digital video camera connected via the IEEE (Institute of Electrical and Electronics Engineers) 1394 interface, etc. using cables or a PC with a digital video camera connected by radio. It is also possible to use a cellular phone with a digital video camera connected using a cable, etc. or a cellular phone with a built-in digital video camera instead of the user PC 106.

The case where a cellular phone using a built-in digital video camera instead of the user PC 106 will be explained below.

Figure 39:
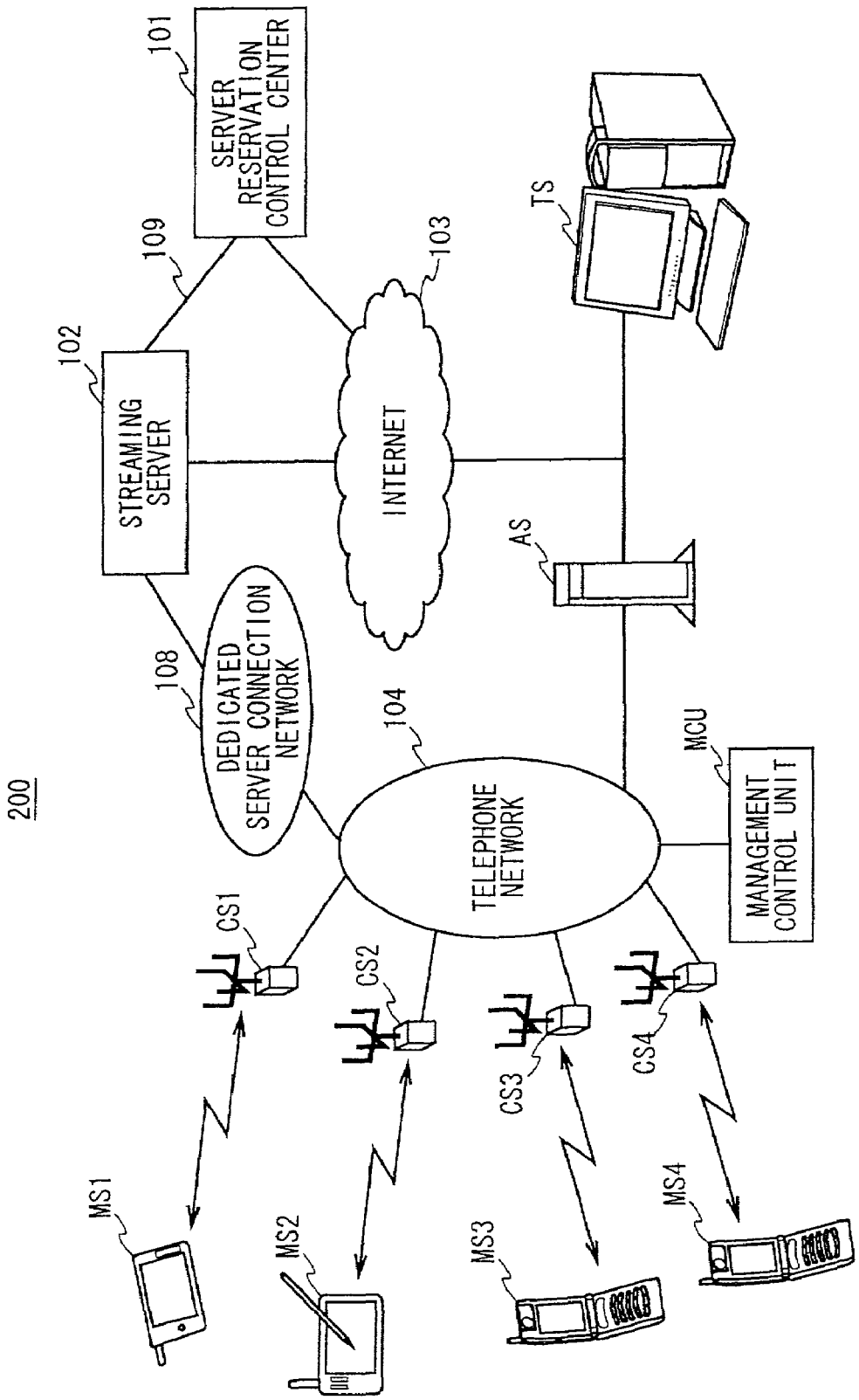
FIG. 39 is a schematic drawing showing an overall configuration of a network system according to a modification of the embodiment above.

In FIG. 39, reference numeral 200 denotes a network system to which a cellular phone MS3 applying the present invention is connected and base stations CS1 to CS4, which are fixed radio stations, are located in their respective cells resulting from dividing the communication service supply area into desired sizes.

These base stations CS1 to CS4 are connected to portable information terminals MS1 and MS2, which are mobile radio stations, and camera-integrated digital cellular phones MS3 and MS4 by radio according to a W-CDMA (Wideband-Code Division Multiple Access) system and are capable of high-speed data communication of large-volume data at a data transfer rate of up to 2 [Mbps] using a 2 [GHz] frequency band.

In this way, the portable information terminals MS1 and MS2 and camera-integrated digital cellular phones MS3 and MS4 can perform high-speed data communication of a large volume of data according to the W-CDMA system, and can thereby perform not only voice communication but also various kinds of data communication such as transmission/reception of e-mail, browsing of simple homepages, transmission/reception of images.

Furthermore, the base stations CS1 to CS4 are connected to the telephone network 104 via a wired line, and this telephone network 104 is connected to the Internet 103 and many subscribers wired terminals (not shown), computer networks and in-house networks, etc.

The telephone network 104 is also connected to the access server AS of the Internet service provider and the access server AS is connected to a content server TS owned by the relevant Internet service provider.

This content server TS provides content such as simple homepage as a file in a compact HTML (Hyper Text Markup Language) format, for example according to the request from the subscriber wired terminal, portable information terminals MS1 and MS2 and camera-integrated digital cellular phones MS3 and MS4. This compact HTML is an HTML subset obtained by keeping only tags that can be reflected and leaving out the rest of a limit-sized display apparatus. For example, iMode (registered trademark) of NTT DoCoMo uses an i-mode HTML which focuses functions necessary for a cellular phone and uses 30 types of tags and has restrictions such that it is not possible to specify character attributes and colors of text and a two-gradation GIF file is recommended for images. It is possible to create a simple homepage file that is browsed by portable terminals with a limited display area and display capability by using this compact HTML, HDML (Handheld Device Markup Language) and WML (Wireless Markup Language) which are descriptive languages used for mobile communication protocol WAP (Wireless Application Protocol), etc.

In this network system 200, the Internet 103 is connected to the server reservation control center 101, streaming server 102 same as in the embodiment above, and the subscriber wired terminals, portable information terminals MS1 and MS2 and camera-integrated digital cellular phones MS3 and MS4 can access the server reservation control center 101 and streaming server 102 according to a protocol such as TCP/IP (Transmission Control Protocol/Internet Protocol). In the example illustrated, when a content distribution is performed using the streaming server 102, the camera-integrated digital cellular phones MS3 and MS4 send content to the streaming server 102 over the dedicated server connection network 108 as in the embodiment above, but it is also possible to configure the system so that content is sent over the Internet 103.

By the way, the portable information terminals MS1 and MS2, and the camera-integrated digital cellular phones MS3 and MS4 communicate with base stations CS1 to CS4 using a simple transport protocol of 2 [Mbps] (not shown) and the base stations CS1 to CS4 communicate with WWW server WS1 to "WSn over the Internet ITN using a TCP/IP protocol.

By the way, the management control unit MCU is connected to the subscriber wired terminal, portable information terminals MS1 and MS2 and camera-integrated digital cellular phones MS3 and MS4 via the telephone network 104 and is responsible for authentication processing and billing processing on the subscriber wired terminal, portable information terminals MS1 and MS2 and camera-integrated digital cellular phones MS3 and MS4.

Figure 40:
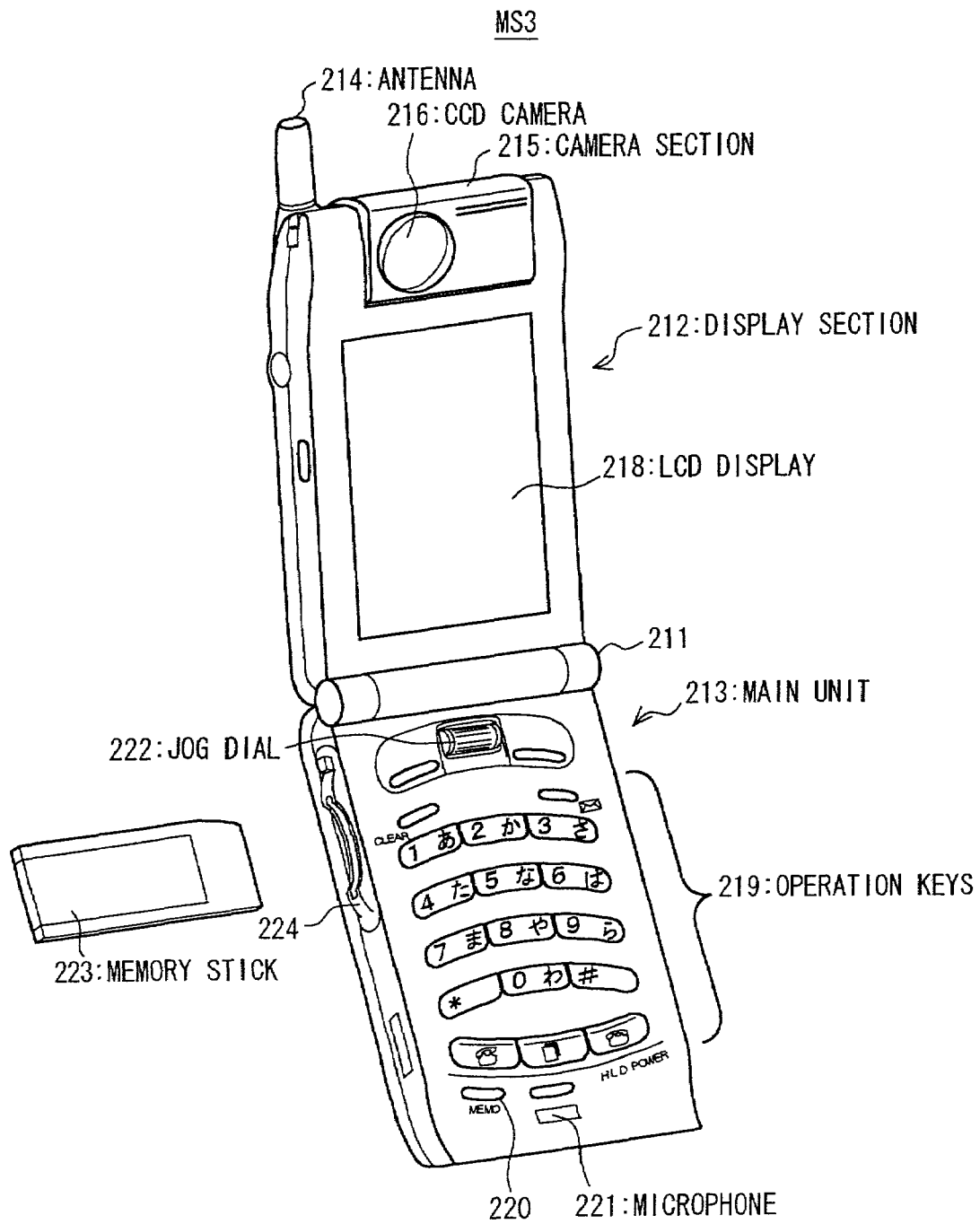
FIG. 40 is a schematic perspective view showing an external configuration of a camera-integrated digital cellular phone.
Figure 41:
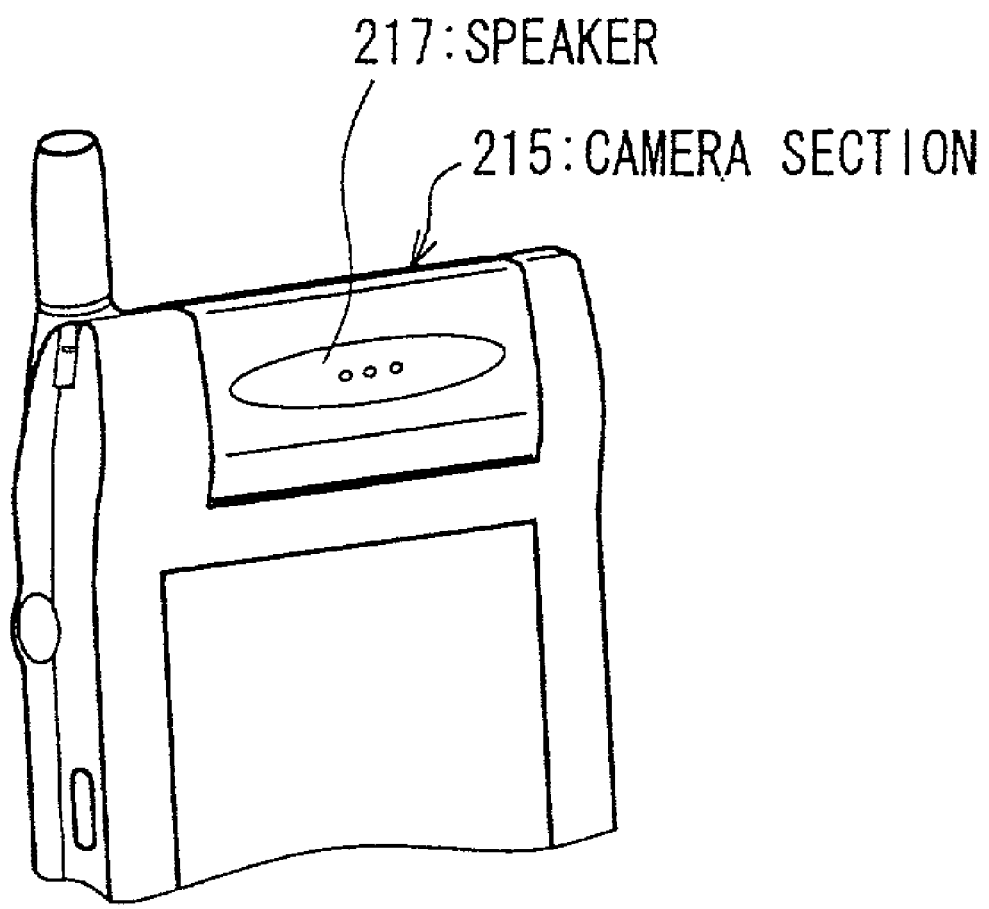
FIG. 41 is a schematic perspective view showing a display section of the camera-integrated digital cellular phone above when the camera is rotated.

Then, a configuration example of the appearance of the camera-integrated digital cellular phone MS3 that can be used instead of the user PC 106 above will be explained. As shown in FIG. 40, the camera-integrated digital cellular phone MS3 is divided into the display section 212 and main unit 213 with the hinge section 211 in the center as the boundary and is foldable via the hinge section 211.

The display section 212 has a transmission/reception antenna 214 at the top left set in a telescopic manner and signals are transmitted/received to/from the base station CS3 via the antenna 214.

Furthermore, the display section 212 is provided with a camera section 215 at the top center which is pivotable at an angle of nearly 180 degrees and a CCD camera 216 mounted in the camera section 215 allows the image of a desired object to be captured.

Here, in the display section 212 when the user rotates the camera section 215 nearly 180 degrees, a speaker 217 provided in the center on the back of the camera section 215 faces toward the front, which provides a normal voice conversation state.

The display section 212 is further provided with an LCD display 218 on the front showing the reception status of a radio wave, residual amount of the battery, names and telephone numbers registered as a telephone directory, transmission history, content of e-mail, simple homepage and images taken by the CCD camera 216 of the camera section 215.

On the other hand, the main unit 213 is provided with operation keys 219 such as numeral keys "0" to "9", calling key, redial key, end key and power key, clear key and e-main key and it is possible to enter various commands using these operation keys 219.

The main unit 213 is also provided with a memo button 220 and a microphone 221 below the operation keys 219 and it is possible to record voice during a call using the memo button 220 and collect the user's voice during conversation by the microphone 221.

The main unit 213 is also provided with a jog dial 222 above the operation keys 219, which is pivotable and slightly protrudes from the surface of the main unit 213, and executes various operations such as scrolling of the telephone directory and e-mail displayed on the LCD display 218 according to the rotation operation to the jog dial 222, rolling-up of the simple homepage and image feeding operations, etc.

For example, when the user selects a desired telephone number from among a plurality of telephone numbers in the telephone directory displayed on the LCD display 218 according to the rotation operation of the jog dial 222 and presses the jog dial 222 toward inside the main unit 213, the main unit 213 confirms the selected telephone number and executes automatic calling processing on the relevant telephone number.

By the way, the main unit 213 is provided with a battery pack (not shown) on the back and when a call end key or power key is turned ON, the battery supplies power to the respective sections making them ready to operate.

On the other hand, the main unit 213 is also provided with a memory stick slot 224 to insert a removable memory stick (trademark of Sony Corporation) on the top left side of the main unit 213 and when the memo button 220 is pressed, it is possible to record the voice of the other party in communication in this memory stick or record e-mail, simple homepage or images taken by the CCD camera 216 according to the operations of the user.

Here, the memory stick 223 is a type of flash memory card developed by Sony Corporation, the present applicant. This memory stick 223 is a flash memory element, which is a kind of electrically erasable and programmable non-volatile memory EEPROM (Electrically Erasable and Programmable Read Only Memory) stored in a small, thin plastic case of 21.5 (H)×50 (W)×2.8 (D) [mm] and allows write/read of various kinds of data such as images, voice and music through 10 pins.

Furthermore, the memory stick 223 uses an independent serial protocol that can secure compatibility with apparatuses used even if the specification of an internal flash memory is changed due to introduction of a large-volume memory, implements high-speed performance with a maximum writing speed of 1.5 [MB/S] and maximum read speed of 2.45 [MB/S] and secures high reliability by providing a erroneous erasure prevention switch.

Constructed with the capability of inserting such a memory stick 223, the camera-integrated digital cellular phone MS3 can share data with other electronic devices via this memory stick 223.

Figure 42:
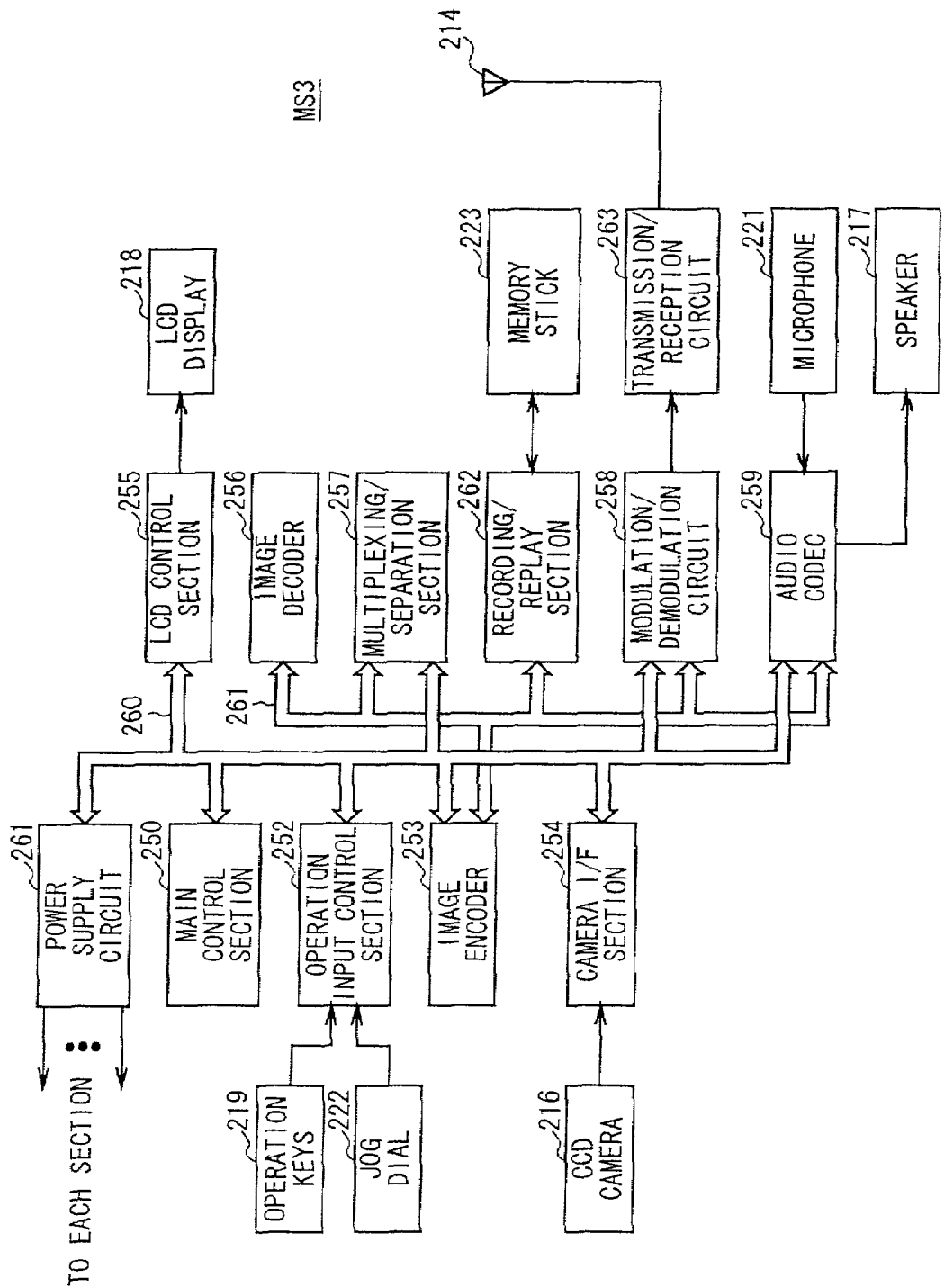
FIG. 42 is a block diagram showing a circuit configuration of the camera-integrated digital cellular phone above.

As illustrated in FIG. 42, the camera-integrated digital cellular phone MS3 is constructed of a main control section 250 that controls the display section 212 and main unit 213 in a concentrated manner, a power supply circuit 251, an operation input control section 252, an image encoder 253, a camera interface section 254, an LCD (Liquid Crystal Display) control section 255, an image decoder 256, a multiplexing/separation section 257, a record/replay section 262, a modulation/demodulation circuit 258 and a voice CODEC 259, all of which are mutually connected via a main bus 260, and the image encoder 253, the image decoder 256, the multiplexing/separation section 257, the modulation/demodulation circuit 258 and the voice CODEC 259 are mutually connected via a synchronous bus 261.

The power supply circuit 251, when the user turns ON the call end/power key, supplies power from the battery pack to the different sections and thereby makes the camera-integrated digital cellular phone MS3 ready to operate.

The camera-integrated digital cellular phone MS3 converts the voice signal collected by the microphone 221 to digital voice data by the voice CODEC 259 in voice conversation mode, subjects this to spread spectrum processing at the modulation/demodulation circuit 258, subjects this to digital/analog conversion processing and frequency conversion processing at the transmission/reception circuit 262 and transmits from the antenna 214 under the control by the main control section 250 made up of a CPU, ROM and RAM, etc.

The camera-integrated digital cellular phone MS3 amplifies the reception signal received from the antenna 214 in the voice/conversation mode, subjects this to frequency conversion processing and analog/digital conversion processing, subjects this to despread spectrum processing at the modulation/demodulation circuit 258, converts to an analog voice signal at the voice CODEC 259 and outputs this via the speaker 217.

Furthermore, when transmitting e-mail in the data communication mode, the camera-integrated digital cellular phone MS3 sends text data of the e-mail which has been entered by operating the operation keys 219 and jog dial 222 to the main control section 250 via the operation input control section 252.

The main control section 250 subjects the text data to spread spectrum processing at the modulation/demodulation circuit 258, subjects to digital/analog conversion processing and frequency conversion processing at the transmission/reception circuit 262 and then transmits to the base station CS3 (see FIG. 39) via the antenna 214.

In response to this, when receiving e-mail in the data communication mode, the camera-integrated digital cellular phone MS3 subjects the reception signal received from the base station CS3 via the antenna 214 to despread spectrum processing at the modulation/demodulation circuit 258, reconstructs the original text data and then displays the text data as e-mail on the LCD display 218 via the LCD control section 255.

Then, the camera-integrated digital cellular phone MS3 can also record the e-mail, which has been received according to the operation of the user, in the memory stick 223 via the record/replay section 262.

On the other hand, when sending image data in the data communication mode, the camera-integrated digital cellular phone MS3 supplies the image data taken by the CCD camera 216 to the image encoder 253 via the camera interface section 254.

By the way, when no image data is sent, the camera-integrated digital cellular phone MS3 can also directly display the image data taken by the CCD camera 216 on the LCD display 218 via the camera interface section 254 and LCD control section 255.

The image encoder 253 converts the image data supplied from the CCD camera 216 to encoded image data by compressing/encoding according to a predetermined encoding system such as MPEG (Moving Picture Experts Group) 2 or MPEG4 and sends this to the multiplexing/separation section 257.

At this time, the camera-integrated digital cellular phone MS3 sends the voice collected by the microphone 221 during picture taking by the CCD camera 216 as digital voice data to the multiplexing/separation section 257 via the voice CODEC 259.

The multiplexing/separation section 257 multiplexes the encoded image data supplied from the image encoder 253 and the voice data supplied from the voice CODEC 259 according to a predetermined system, subjects the resultant multiplexed data to spread spectrum processing at the modulation/demodulation circuit 258, subjects this to digital/analog conversion processing and frequency conversion processing at the transmission/reception section 262 and transmits via the antenna 214.

On the other hand, in data communication mode, when receiving, for example, data of a moving image file linked to a simple homepage, etc., the camera-integrated digital cellular phone MS3 subjects the reception signal received via the antenna 214 from the base station CS3 to despread spectrum processing at the modulation/demodulation circuit 258 and sends the resultant multiplexed data to the multiplexing/separation section 257.

The multiplexing/separation section 257 separates the multiplexed data into encoded image data and voice data, supplies the encoded image data to the image decoder 256 via the synchronous bus 261 and supplies the voice data to the voice CODEC 259.

The image decoder 256 decodes the encoded image data according to a decoding system corresponding to a predetermined encoding system such as MPEG2 or MPEG4 to create reproduced moving image data, supplies this to the LCD display 218 via the LCD control section 255, and in this way, for example, moving image data contained in the moving image file linked to the simple homepage is displayed.

At the same time, the voice CODEC 259 converts voice data to an analog voice signal, then supplies this to the speaker 217 and in this way, reproduces voice data included in the moving image file linked to the simple homepage, for example.

In this case, as in the case of e-mail, the camera-integrated digital cellular phone MS3 can record the data linked to the received simple homepage, etc. in the memory stick 223 via the recording/replay section 262 through operations by the user.

In addition to such a configuration, the camera-integrated digital cellular phone MS3 stores an application program, etc. similar to that in the embodiment above in the ROM of the main control section 250, accesses the live casting server 150 (see FIG. 12) of the reservation control center 101 based on this application program, can thereby perform live distribution reservation processing including member registration and reconfirmation with the live casting server 150, and when a reservation is made, receives the reservation setting information file (see FIG. 28) and automatically encrypts and saves the file. At this time, the camera-integrated digital cellular phone MS3 can perform processing similar to live distribution processing based on a reservation carried out by the user PC 106 in the embodiment above. Thus, during a live distribution, the camera-integrated digital cellular phone MS3 automatically reads the reservation setting information file saved during the reservation processing above and establishes a communication/connection with the streaming server 102 and sends the content taken by the CCD camera 216 to the streaming server 102 and performs a live distribution of the content.

As described above, when making a reservation for live distribution of content, the present invention allows the distributor to make a reservation taking into account the capacity of content distribution targets or service fee.

INDUSTRIAL APPLICABILITY

The present invention is applicable to a distribution system which perform live distribution, reservation distribution of content such as music, motion images and still images, via a computer network such as the Internet.

The invention claimed is:

1. A content distribution reservation method whereby in order to perform live distribution of content using a distribution server, which is capable of carrying out, with a plurality of systems, processing of receiving content sent from a distributor terminal apparatus via a network and carrying out stream distribution of said content to a client terminal apparatus via the network, said distributor terminal apparatus makes a reservation for a use of said distribution server via the network to a reservation control apparatus that controls a reservation situation of said distribution server, said content distribution reservation method comprising:

displaying reservation situation information at said distributor terminal apparatus, said reservation situation information being sent from said reservation control apparatus via the network when said distributor terminal apparatus sends a request for browsing the reservation situation to said reservation control apparatus via the network, and said reservation situation information including information about (i) a plurality of channels configured to connect said distribution server to said plurality of channels, and (ii) a capacity and a service fee preset for each of said plurality of channels of said distribution server;

requesting a reservation by sending reservation request information including a desired channel indicating which of said plurality of channels of said distribution server is requested to be used and a desired service time to distribute content using said distribution server from said distributor terminal apparatus to said reservation control apparatus via the network; and billing said distributor terminal apparatus for the service fee for the use of said distribution server by carrying out billing processing related to said reservation based on the service fee of said distribution server preset in said desired channel when the reservation for the use of said distribution server using said desired channel and during said desired service time included in said reservation request information is accepted and said reservation is established.

2. The content distribution reservation method according to claim 1, wherein, in the billing, only said distributor terminal apparatus is billed for the service fee.

3. The content distribution reservation method according to claim 1, wherein the service fee is determined based on a capacity in a number of distribution targets which are preset in each of said plurality of systems of said distribution server and to which said distribution server distributes said content via the network.

4. A content distribution method for making a reservation to a reservation control apparatus for a use of a distribution server capable of carrying out, with a plurality of systems, processing of receiving content sent from a distributor terminal apparatus via a network and carrying out stream distribution of said content to a client terminal apparatus via the network, and sending said content from said distributor terminal apparatus to said distribution server based on said reservation and thereby carrying out content distribution, said content distribution method comprising:

displaying reservation situation information at said distributor terminal apparatus, said reservation situation information being sent from said reservation control apparatus via the network when said distributor terminal apparatus sends a request for browsing a reservation situation information including information about (i) a plurality of channels configured to connect said distribution server to said plurality of systems, and (ii) a capacity and a service fee preset for each of said plurality of channels of said distribution server;

requesting a reservation by sending reservation request information including a desired channel indicating which of said plurality of channels of said distribution server is requested to be used and a desired service time to distribute content using said distribution server from said distributor terminal apparatus to said reservation control apparatus via the network;

transmitting, when the reservation for the use of said distribution server using said desired channel and during said desired service time included in said reservation request information is accepted, said content from said distributor terminal apparatus to said distribution server via the network to carry out content distribution based on said accepted reservation;

judging, when said client terminal apparatus sends a request for distributing content to said distribution server via the network, whether or not to permit the distribution request of said client terminal apparatus based on a capacity in a number of distribution targets preset in said desired channel;

distributing said content by carrying out streaming distribution of the content sent from said distributor terminal apparatus from said distribution server to said client-terminal apparatus via the network when the distribution request of said client terminal apparatus is accepted; and billing said distributor terminal apparatus for the service fee for the use of said distribution server.

5. A reservation control apparatus that controls reservations of live distributions of content using a distribution server capable of carrying out processing of stream distributions of said content to a client terminal apparatus via a network using a plurality of systems, said reservation control apparatus comprising:

a reservation situation transmitting unit configured to transmit reservation situation information to a distributor terminal apparatus via the network when a request for browsing a reservation situation is sent from said distributor terminal apparatus, said reservation situation information including information about (i) a plurality of channels configured to connect said distribution server to said plurality of systems, and (ii) a capacity and a service fee preset for each of said plurality of channels of said distribution server;

a receiving unit configured to receive reservation request information including a desired channel indicating which of said plurality of channels of said distribution server is requested by said distributor terminal apparatus to be used for a live distribution of content via the network and a desired service time for requesting a content distribution using said distribution server; and a billing unit configured to carry out billing processing related to said reservation based on the service fee of said distribution server preset in said desired channel and to bill said distributor terminal apparatus for the service fee when the reservation for the use of said distribution server using said desired channel and during said desired service time included in said reservation request information is accepted and established.

6. A reservation control apparatus that controls reservations of live distributions of content using a distribution server capable of carrying out processing of stream distributions of said content to a client terminal apparatus via a network using a plurality of systems, said reservation control apparatus comprising:

a reservation situation transmitting unit configured to transmit reservation situation information to a distributor terminal apparatus via the network when a request for browsing a reservation situation is sent from said distributor terminal apparatus, said reservation situation information including information about (i) a plurality of channels configured to connect said distribution server to said plurality of systems and (ii) a capacity and a service fee preset for each of said plurality of channels of said distribution server;

a receiving unit configured to receive reservation request information including a desired channel indicating which of said plurality of channels of said distribution server is requested by said distributor terminal apparatus to be used for a live distribution of content via the network and a desired service time for requesting a content distribution using said distribution server;

a judging unit configured to judge, when said client terminal apparatus sends a request for distribution of content to said distribution server via the network, whether the distribution request from said client terminal apparatus should be accepted or not based on a capacity in a number of distribution targets preset in said desired channel; and a billing unit configured to bill said distributor terminal apparatus for the service fee for a use of said distribution server.

7. A program storage medium storing a program to be executed by a reservation control apparatus that controls reservations for a live distribution of content using a distribution server capable of carrying out processing of stream distribution of said content to a client terminal apparatus via a network using a plurality of systems, said program comprising:

transmission processing that transmits reservation situation information to a distributor terminal apparatus via the network when a request for browsing a reservation situation is sent from said distributor terminal apparatus, said reservation situation information including information about (i) a plurality of channels configured to connect said distribution server to said plurality of systems and (ii) a capacity and a service fee preset for each of said plurality of stems channels of said distribution server;

reception processing that receives reservation request information including a desired channel indicating which of said plurality of channels of said distribution server is requested by said distributor terminal apparatus to be used for a live distribution of content via a network and a desired service time for requesting a content distribution using said distribution server; and billing processing that carries out billing processing related to said reservation based on said service fee of said distribution server preset in said desired channel and that bills said distributor terminal apparatus for the service fee when the reservation for the use of said distribution server using said desired channel and during said desired service time included in said reservation request information is accepted and established.

8. A program storage medium storing a program to be executed by a reservation control apparatus that controls reservations for a live distribution of content using a distribution server capable of carrying out processing of stream distributions of said content to a client terminal apparatus via a network using a plurality of systems, said program comprising:

transmission processing that transmits reservation situation information to a distributor terminal apparatus via the network when a request for browsing a reservation situation is sent from said distributor terminal apparatus, said reservation situation information including information about (i) a plurality of channels configured to connect said distribution server to said plurality of systems, and (ii) a capacity and a service fee preset for each of said plurality of channels of said distribution server;

reception processing that receives reservation request information including a desired channel indicating which of said plurality of channels of said distribution server is requested by said distributor terminal apparatus to be used for a live distribution of content via the network and a desired service time for requesting a content distribution using said distribution server;

judging processing that judges, when said client terminal apparatus sends a request for distribution of content to said distribution server via the network, whether the distribution request from said client terminal apparatus should be accepted or not based on a capacity in a number of distribution targets preset in said desired channel; and billing processing that bills said distributor terminal apparatus for the service fee for a use of said distribution server.

* * * * *